United States Patent [19]
Vorgitch et al.

[11] Patent Number: 5,182,715
[45] Date of Patent: Jan. 26, 1993

[54] RAPID AND ACCURATE PRODUCTION OF STEREOLIGHOGRAPHIC PARTS

[75] Inventors: Thomas J. Vorgitch, Simi Valley; Raymond A. Bradford, Los Angeles; Grady O. Floyd, Newhall; Harry L. Tarnoff, Van Nuys; Wayne A. Vinson, Valencia; Frank F. Little, Lakeview; Richard A. Harlow, Marina Del Rey; Wolfgang Schwarzinger, Moorpark; Paul H. Marygold, Monrovia; Mark A. Lewis, Valencia; Yehoram Uziel, Northridge; Borzo Modrek, Montebello; Robert T. Pitlak, Westlake Village; Thomas P. Chen, Saugus, all of Calif.

[73] Assignee: 3D Systems, Inc., Valencia, Calif.

[21] Appl. No.: 824,819

[22] Filed: Jan. 22, 1992

Related U.S. Application Data

[63] Continuation of Ser. No. 428,492, Oct. 27, 1989, abandoned.

[51] Int. Cl.⁵ .............................................. G06F 15/20
[52] U.S. Cl. .............................. 364/474.24; 425/174.4
[58] Field of Search .................. 364/474.24, 477, 522; 425/174.4

[56] References Cited

U.S. PATENT DOCUMENTS

| | | | |
|---|---|---|---|
| 4,575,330 | 3/1986 | Hull | 364/474.24 X |
| 4,912,657 | 3/1990 | Saxton et al. | 364/518 |
| 4,943,928 | 7/1990 | Campbell et al. | 364/477 |
| 4,961,154 | 10/1990 | Pomerantz et al. | 364/522 |
| 5,014,207 | 5/1991 | Lawton | 364/468 |

Primary Examiner—Robert W. Beausoliel
Assistant Examiner—Allen M. Lo
Attorney, Agent, or Firm—Lyon & Lyon

[57] ABSTRACT

A stereolithography system employing a more powerful laser and faster dynamic mirrors to speed up part building without sacrificing accuracy is described, especially large or complex parts. A controllable shutter is placed in the beam path of the laser to selectably block the passage of the beam and prevent unwanted solidification. A suitable servo controlled feedback loop is provided to accurately position the mirrors at the higher velocity.

Also described is a means to reduce data flow by distributing tasks in a multiple processor environment, and to improve user interaction by the use of a spreadsheet model. These also improve the speed of part building, especially for large or complex parts.

13 Claims, 44 Drawing Sheets

FIG. 17.

| Part Manager, Version 1.08 (1.08) | | Part : NewPart | |
|---|---|---|---|
| Part Component View Prepare Config FileMan Help ||||
| Z Space | 3dlogo | cyl | cyl |
| 2.8200 in | | **TOP | |
| 1.6200 in | | | **TOP |
| 1.4626 in | **TOP | | |
| 0.0000 in | **Std_10 | **Default | |
| 0.0000 in | | | **Default |

| File Selection | Results of Preparation: |
|---|---|
| Choose Message File to Display<br><br>File:<br><br>3dlogo.msg<br>CGeoGrid.msg<br>CNewPart.msg<br>Cgradmart.msg<br>cyl.msg<br>cyll.msg<br>grady.msg<br>testbox.msg<br><br>[select] | 3dlogo sliced properly.<br>cyl sliced properly.<br>cyll sliced properly.<br>NewPart converged properly. |

FIG. 36.

Message File  /usr/people/gordon/3dlogo.msg

Slice Message File for '3dlogo.sli'
 Started Mon Aug 28 11:18:01 1989

```
      0 flat triangles loaded     (    0 up facing,      0 down facing
     61 near flat triangles loaded (   33 up facing,     28 down facing
    113 steep triangles loaded    (   17 up facing,     96 down facing
```

Layer 0.88 (8800) Warning: Incomplete Border Segments Detected
Layer 0.9 (9000) Warning: Incomplete Border Segments Detected
Layer 0.92 (9200) Warning: Incomplete Border Segments Detected
Layer 0.94 (9400) Warning: Incomplete Border Segments Detected
Layer 0.96 (9600) Warning: Incomplete Border Segments Detected
Layer 0.98 (9800) Warning: Incomplete Border Segments Detected
Layer 0.98 (9800) Warning: Incomplete Border Segments Detected
Layer 1 (10000) Warning: Incomplete Border Segments Detected
Layer 1 (10000) Warning: Incomplete Border Segments Detected
Layer 1.02 (10200) Warning: Incomplete Border Segments Detected

[Done]

```
┌─────────────────────────────────────────────────────────────┐
│  3D Systems              BUILD SLA-500        SLA-500       │
│  Valencia, California    Copyright (C) 1987/88/89  Version WOLF │
│                                                TEST   WOLF  │
├─────────────────────────────────────────────────────────────┤
│ PART C: 3DSYS\WOLF\FABNEW\BANJO BFF                         │
├─────────────────────────────────────────────────────────────┤
│ LAYER 29                  ACTION            FILE VER: 1     │
├─────────────────────────────────────────────────────────────┤
│ ┌──────────────────────────────────┐  ┌──────────────────┐  │
│ │ START TIME: Wed 6/21/89 10:12 AM │  │                  │  │
│ │ END TIME:   Wed 6/21/89 10:12 AM │  │  ┌────────────┐  │  │
│ ├──────────────────────┬───────────┤  │  │            │  │  │
│ │ START LAYER: 1000.000│ BLOCK     │  │  │            │  │  │
│ │   ON LAYER:  1980.000│ NFDBC     │  │  │            │  │  │
│ │  END LAYER:  1980.000│           │  │  │            │  │  │
│ ├──────────────────────┴───────────┤  │  │            │  │  │
│ │ GRAPH/ZOOM                       │  │  │            │  │  │
│ │ LASER OFF/ZSTAGE OFF/NOSWEEP (PREVIEW)│ │            │  │  │
│ │ NOHATCH                          │  │  └────────────┘  │  │
│ │                                  │  │                  │  │
│ │ MEM: 290376              100%    │  │                  │  │
├─────────────────────────────────────────────────────────────┤
│ <any key> to build new part, <R> to repeat, <Q> to abort    │
└─────────────────────────────────────────────────────────────┘
```

*FIG. 65.*

RAPID AND ACCURATE PRODUCTION OF STEREOLIGHOGRAPHIC PARTS

This is a continuation of U.S. patent application Ser. No. 428,492, filed Oct. 27, 1989, now abandoned.

BACKGROUND OF THE INVENTION

This invention relates generally to improvements in a stereolithography method and apparatus for the production of three-dimensional objects, and more specifically, to improvements which increase the speed of and remove bottlenecks in the production of the three-dimensional objects, especially large or complex objects, without sacrificing accuracy.

Stereolithography is a process for building up a reproduction of an object layer by layer such that the layers are sequentially formed on top of one another until the overall reproduction is complete. The stereolithographic reproduction is commonly referred to as a stereolithographic object or part, or more simply, part. The process is described in more detail in U.S. Pat. No. 4,575,330, entitled "APPARATUS FOR PRODUCTION OF THREE-DIMENSIONAL OBJECTS BY STEREOLITHOGRAPHY," by Charles W. Hull, which issued Mar. 11, 1986, which is hereby fully incorporated by reference herein as though set forth in full. As described in U.S. Pat. No. 4,575,330, a stereolithographic apparatus ("SLA") is an apparatus for reproducing an object through the process of stereolithography. One embodiment of an SLA comprises synergistic stimulating means such as a UV laser beam or the like, photocurable liquid resin placed in a vat, and elevator means. The SLA forms each layer of a part by tracing the cross sectional pattern on the surface of the liquid resin with the UV laser beam at an exposure sufficient to cure the liquid resin to a predetermined thickness beyond the surface.

The elevator means supports the part as it is being built up, with the first layer adhering to and being supported by cured resin in the shape of webs or the like, known as a base or support, which base or support, in turn, directly adheres to the elevator means. Subsequently formed layers are then stacked on top of the first layer. As the part is being built up, the elevator means progressively lowers itself into the vat of liquid resin. At each step of the way, after a layer has been formed, the elevator means lowers that layer (along with all the other formed layers) into the vat of liquid resin so that fresh liquid resin that will be used to form the next layer flows over the previous layer. Typically, the elevator means is lowered into the liquid resin by more than the desired thickness of the next layer so that the liquid resin will flow over the previous layer rapidly. This results in excess resin (resin of greater thickness than the next layer thickness) coating over a substantial portion of the previous cross section. The elevator means is then raised and one or more techniques of decreasing the excess resin thickness is implemented so that a coating thickness of depth equal to the next desired layer thickness is achieved. At some point during the process, the upper surface of the previously cured cross section is positioned to be a depth below the liquid surface equal to the next desired layer thickness. This prepares the surface of the resin and position of the previous layer for exposing the next cross section and adhering it to the previous layer. The various methods of decreasing the thickness of the excess resin are disclosed in several of the following co-pending patent applications.

For further details on stereolithography, reference is made to U.S. Pat. No. 4,575,330 and the following pending U.S. and international patent applications, which are incorporated herein by reference in their entirety, including appendices attached thereto or material incorporated therein by reference, as if fully set forth:

U.S patent application Ser. No. 339,246, filed Apr. 17, 1989, entitled "STEREOLITHOGRAPHIC CURL REDUCTION";

U.S. patent application Ser. No. 331,644, filed Mar. 31, 1989, entitled "METHOD AND APPARATUS FOR PRODUCTION OF HIGH RESOLUTION THREE-DIMENSIONAL OBJECTS BY STEREOLITHOGRAPHY";

U.S. patent application Ser. No. 183,015, FILED Apr. 18, 1988, entitled "METHOD AND APPARATUS FOR PRODUCTION OF THREE-DIMENSIONAL OBJECTS BY STEREOLITHOGRAPHY", now U.S. Pat. No. 5,015,424;

U.S. patent application Ser. No. 182,801, filed Apr. 18, 1988, entitled "METHOD AND APPARATUS FOR PRODUCTION OF THREE-DIMENSIONAL OBJECTS BY STEREOLITHOGRAPHY", now U.S. Pat. No. 4,999,143;

U.S. patent application Ser. No. 268,429, filed Nov. 8, 1988, entitled "METHOD FOR CURING PARTIALLY POLYMERIZED PARTS";

U.S. patent application Ser. No. 268,428, filed Nov. 8, 1988, entitled "METHOD FOR FINISHING PARTIALLY POLYMERIZED PARTS", now abandoned;

U.S. patent application Ser. No. 268,408, filed Nov. 8, 1988, entitled "METHOD FOR DRAINING PARTIALLY POLYMERIZED PARTS", now abandoned;

U.S. patent application Ser. No. 268,816, filed Nov. 8, 1988, entitled "APPARATUS AND METHOD FOR PROFILING A BEAM";

U.S. patent application Ser. No. 268,907, filed Nov. 8, 1988, entitled "APPARATUS AND METHOD FOR CORRECTING FOR DRIFT IN PRODUCTION OF OBJECTS BY STEREOLITHOGRAPHY";

U.S. patent application Ser. No. 268,837, FILED Nov. 8, 1988, entitled "APPARATUS AND METHOD FOR CALIBRATING AND NORMALIZING A STEREOLITHOGRAPHIC APPARATUS";

U.S. patent application Ser. No. 365,444, filed Jun. 12, 1989, entitled "INTEGRATED STEREOLITHOGRAPHY";

International Patent Application No. PCT/US89/04096, filed Sep. 26, 1989, entitled "RECOATING OF STEREOLITHOGRAPHIC LAYERS", U.S. patent application Ser. No. 265,039, filed Oct. 31, 1988, entitled "APPARATUS AND METHOD FOR MEASURING AND CONTROLLING THE LEVEL OF A FLUID", now abandoned;

U.S. patent application Ser. No. 249,399, filed Sep. 26, 1988, entitled "METHOD AND APPARATUS FOR PRODUCTION OF THREE-DIMENSIONAL OBJECTS BY STEREOLITHOGRAPHY"; and U.S. patent application Ser. No. 427,885, filed concurrently herewith, entitled "STEREOLITHOGRAPHIC APPARATUS", In this embodiment of the SLA, the UV laser beam is typically produced by a HeCd laser having a maximum power of 50 mW, and a wavelength of about 325 nm. Higher power lasers were not thought possible because of the problem of curing spurious liquid resin when the laser beam was being positioned (crossing over regions that should remain unpolymerized) between vectors (it is intended that curing only occur at locations corresponding to vector data). The laser is also typically kept stationary with respect to the vat, and the beam from the laser directed by means of an optical system, including a pair of rotatable dynamic mirrors, to follow an optical path to the surface of the resin, and thereafter trace out part layers on the surface of the liquid resin through the controlled rotation of the dynamic mirrors. In this embodiment, the dynamic mirrors are normally 2-mirror, 2-axis galvanometer scan heads which operate along two substantially perpendicular axes to generate a tracing of the laser beam in a horizontal plane along the X and Y axis of the resin surface which is situated a substantially fixed distance from the mirrors.

The cure depth of the resin at a particular area on the resin surface will depend logarithmically on the exposure of that area by the laser beam, which, in turn, will depend on the power and intensity distribution of the laser beam as well as the scanning velocity of the dynamic mirrors as the beam passes over that area. The more powerful the laser (the higher the intensity), or the slower the mirrors, the greater the exposure. At present, as mentioned earlier, the maximum power of the HeCd lasers used in an SLA is 50 mW, and the velocity of the dynamic mirrors can range from between about 0 to 30 in/sec., while controllably exposing a surface.

In the course of building up a cross-section of a part, it is sometimes necessary to position the laser beam by causing the laser beam to jump over certain areas of the resin surface, such as hollow areas, without polymerizing any appreciable amount of resin (enough to gel). This is accomplished in the embodiment described above by limiting the power of the laser so that at the maximum velocity of the mirrors, the exposure will not be sufficient to cure any appreciably amount of resin. This is one reason why the maximum laser power was limited to 50 mW.

This previous limitation to laser power was based on the scanning mirror's ability to jump the beam over regions that were not supposed to be cured. Another reason for a limited laser power was based on the maximum controllable speed of the scanning mirrors that could be effectively utilized to expose a given region. For example, if a very thin film of uniformly exposed and cured material is desired, this film will be created from a series of closely spaced effectively overlapping vectors. The intensity profile of the beam will determine how closely the vectors must be spaced. A combination of the beam power, the desired cure depth (amount of exposure required to get the cure depth), and the spacing of the vectors will determine the necessary scanning speed. If the laser power gets too high, the scanning speed required in this exemplified situation can easily exceed the maximum allowed scanning speed, thereby setting a limit on the maximum allowable laser power.

In this description, maximum laser power refers to the limiting factor when, in actuality, maximum intensity may be the limiting factor. Power and intensity are used interchangeably in this discussion since as small a beam spot size as possible is especially used in order to maintain high resolution in the X-Y dimensions. Therefore, for a small, relatively fixed spot size, intensity (power/unit area) and power cannot be easily decoupled.

Additionally, the HeCd laser discussed above for use in stereolithography are not adjustable. That is, they were either off or on thereby producing either no radiation or the maximum amount that they were capable of. Therefore, when using these lasers, it was not considered feasible to vary the beam power depending on exposure constraints.

A problem with limiting the laser power, however, is that it will substantially slow down the building of parts compared to the use of a more powerful laser. This problem becomes even more severe when the building of larger parts, typically greater than about 5 in.×7 in.×6 in., is attempted since these parts already take a fair amount of time to build because of their size. Using a less powerful laser will only make the problem worse. As mentioned earlier, however, a more powerful laser was not possible with this embodiment because of spurious resin solidification, the maximum scanning speed possible, and the fixed nature of the output power of the radiation. Another problem with a more powerful laser is that, at current mirror velocities, it may not be possible to form thin cross-sections, i.e., below about 5 mil. Faster dynamic mirrors are not a general solution to this problem since the accuracy of these mirrors typically degrades tremendously at velocities above about 30 in/sec.

For these and other reasons, part building with the SLA described above is now typically excessively time-consuming, especially for large or complex parts. A small but complex part, nominally 5"×7"×6", may take 10 to 48 hours to build with the SLA embodiment above, while a larger part, up to 20"×20"×24", may take even longer, up to 2 to 10 days.

Another problem with the SLA embodiment described above is that there are several bottlenecks to data flow in the overall system, which bottlenecks can become quite severe when a large or complex part is being built. This is because is these instances, quite a bit of data is required to represent the part, and this data, typically about 3 GB (gigabytes) for a large part, and dozens of megabytes for a small but complex part, must be managed and transported to various parts of the SLA throughout part building. The bottlenecks referred to above can slow down this process, and thereby further increase the time required for part building.

For example, one bottleneck is due to the need to control the dynamic mirrors, the loading of additional vectors to be drawn, the elevator, and other associated devices, in realtime, with the result that a control computer which is required to perform all these tasks will not be available to perform other important data management tasks such as CAD/CAM data conversion, which tasks may not have to be performed in real time.

Simply adding another computer to perform these background tasks, however, will not be effective, especially for large or complex parts. For example, a storage device will have to be added in order to buffer the data flow between the two computers, but the storage requirements for large or complex parts, typically 3 GB, will make this device prohibitively large and expensive.

Another bottleneck in the SLA embodiment described above is the method of interacting with the user. Before the control computer can begin building the part, it must interact with the user in order to obtain parameters for controlling part building, such as desired cure depths (which will differ from layer thickness depending on several factors), as well as parameters for controlling the physical movement of the elevator and associated devices. Collectively, these parameters are known simply as build parameters.

Various approaches to interacting with the user have been attempted. In one approach, a user is required to provide build parameters for the part as a whole. This can be very unwielding, especially for large or complex parts.

In another approach, the user is allowed to break up a part into ranges of layers, and specify different build parameters for each range. For a large or complex parts, however, it may be desirable to emphasize different qualities such as strength, aesthetics, speed, or accuracy, at different areas within a range. Requiring that the build parameters be the same for the entire range, and also requiring that the layers in these areas be grouped into the same ranges, prevents this. Thus, these approaches have not always proven successful, especially for large or complex parts.

A final bottleneck is that the SLA requires a fair amount of sophistication on the part of a user. For example, a user, to specify build parameters, must now be aware of the physical characteristics of, and implementation details of, the dynamic mirror, elevator, laser, etc. As a result, novice users cannot effectively run the system without substantial and time-consuming instruction, especially for large or complex parts. This can further slow down part building.

Thus, an object of the present invention is to provide means for rapidly building stereolithographic parts without sacrificing accuracy, especially large or complex parts.

SUMMARY OF THE INVENTION

The present invention is directed to a system for rapidly and accurately creating three-dimensional objects by stereolithography, especially large or complex objects. To this end, a more powerful laser and faster dynamic mirrors are employed to generate a beam which can solidify polymerizable material and trace out patterns thereon in a shorter amount of time. Frequently, however, the laser beam must be positioned across the surface of the polymerizable material without solidifying it to an appreciable degree, and the use of a more powerful laser increases the risks that such unwanted solidification will occur. In addition, faster dynamic mirrors have the attendant risk that mirror positioning may be less accurate, causing errors in beam tracing. Therefore, it is incumbent upon the system to reduce or eliminate these risks. The subject invention accomplishes this by means of a controllable shutter placed in the beam path of the laser which is directed to block the passage of the beam over selected areas of the material surface, and by means of a suitable feedback control loop to accurately position the mirrors, based on a known deviation from a desired location. Because of shutter response time limitations, shutter commands are timed to be issued in advance of the desired response so that the shutter response will coincide with the passage of the beam over the selected areas.

Bottlenecks in data flow and user interactivity can also limit the speed of part building, especially for large or complex parts. To this end, a multi-processor architecture is employed whereby real-time device management tasks, such as dynamic mirror positioning and control, are allocated to certain dedicated processors, while background tasks, such as the receipt and transformation of external CAD/CAM data into data more suitable for stereolithography, are allocated to other more general purpose processors coupled to the dedicated processors for the passage of the stereolithography data thereto.

For large or complex parts, however, data flow between the processors can become prohibitively time-consuming or expensive. Therefore, to reduce the data flow, a method of CAD/CAM stereolithographic data conversion is employed whereby only part of the stereolithography data which is necessary to accurately represent the part is generated by the general purpose processors, the rest being generated by the dedicated processors. To this end, in the subject invention, only layer by layer border data suitable for stereolithography is generated by the general purpose processors; the remaining stereolithography data, which is required to represent the areas enclosed by the borders, is generated by the dedicated processors.

The system of the subject invention also provides a model for the organization, display, and input of data related to a stereolithography part. For large or complex parts, a user might wish to conceptually divide up the part into components, and then each component into ranges of layers, which layers are spaced along a particular axis in the order in which the layers will ultimately be built on a stereolithography system. The user may also wish to build each range of layers of a component emphasizing different desired characteristics such as strength or aesthetics, and then to indicate to the stereolithography system that each of the ranges of the component should be built according to these characteristics, without requiring detailed knowledge of the underlying physical devices, such as the dynamic mirrors and the elevator, making up the stereolithography system. To this end, the system provides a spreadsheet model of the part having a grid format of cells at the intersection of rows and columns, and a capability for associating external CAD/CAM data files descriptive of each component of the part with the columns and for associating the rows with contiguous ranges of component layers spaced along a particular axis in the order in which the layers will be cured at the surface of a material. Once this has been accomplished, the system provides the capability for associating a selected one of a library of pre-defined style data files, each file associated with a desired set of part characteristics, and already containing implementation-specific process data used to direct the stereolithography system, with each cell of the spreadsheet. The system then builds the part, layer by layer, on the surface of a solidifiable material, and within a layer, component by component, using the implementation specific process data in the style file associated with that layer of the component.

BRIEF DESCRIPTION OF THE DRAWINGS

FIGS. 8-41 are illustrations of screen displays generated by Part Manager.

FIGS. 53-65 are illustrations of screen displays generated by CFAB.

DESCRIPTION OF PREFERRED EMBODIMENTS

SYSTEM OVERVIEW

Figure 1:
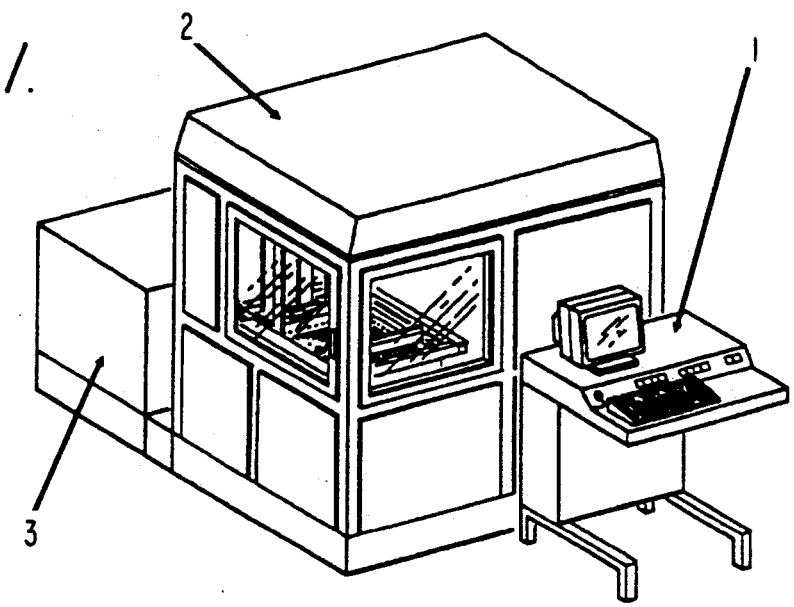
FIG. 1 is a perspective view of a stereolithography system.

Turning to FIG. 1, an embodiment of an SLA embodying aspects of the subject invention is illustrated. As illustrated, the major components of the SLA include control module 1, process module 2, service module 3, and a workstation configurations (not shown). The service module contains an AC power input, a laser power supply, a vat heating unit, and a blower. These parts are placed in a separate module to minimize the possibility of vibration and electromagnetic noise from reaching the process module. The blower circulates air through ducts in the process module. The air is heated by electric elements in the duct close to the blower. The vat heating unit heats the liquid resin under computer control to maintain the liquid resin at an optimum, user-specified temperature.

The process module contains an electronic assembly, process chamber, and drawing subsystem. The electronic assembly comprises a standard 19-inch rack which houses the control computer configuration, driver electronics, and power supplies. The control computer configuration communicates to the workstation configuration by means of an Ethernet local area network or the like. The control computer configuration includes the following:
- a 80386 microprocessor
- a 80387 numeric coprocessor
- 2 megabytes of RAM
- a 40-megabyte hard disk
- a 1.2-megabyte floppy disk drive
- a standard keyboard (101-key)
  - a VGA driver board and color monitor
  - an elevator control board
  - an Ethernet communications board
  - a disk controller board
  - a printer driver board
  - a modem board
  - two Digital Signal Processors (DSPs)

Figure 2:
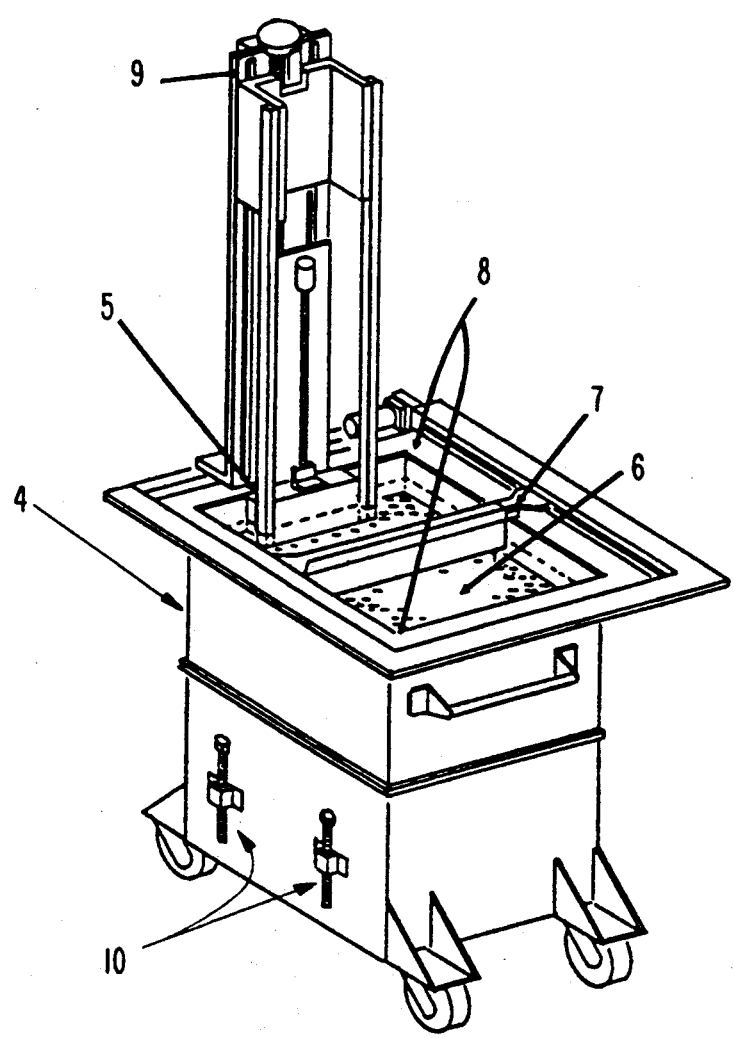
FIG. 2 is a perspective view of a process chamber of a stereolithography/system.

The process chamber is illustrated in FIG. 2. As illustrated, the chamber includes removable vat 4, plunger 5, platform 6, recoater blade 7, surface level detector (not shown), beam profilers 8, elevator 9, and levelling jacks 10. The vat holds approximately 67 gallons (254 liters) of liquid resin, and the interior of the vat is large enough to build parts up to 20 inches (508 mm) square and 24 inches (609 mm) high.

The level of liquid resin in the vat is monitored by the surface level detector which may include a float or the like, located at the rear of the vat. The surface level detector detects and compares the resin level with a predetermined level. The plunger, under the control of the control computer, is controlled by a stepper-motor-driven lead screw, and is used to maintain the surface at the predetermined level, which is preferably the focus plane of the UV laser. Based on the comparison performed by the detector, the control computer, if the level is too low, dips the plunger further into the resin, displacing some resin, until the level is correct. If the level is too high, the control computer raises the plunger out of the resin until the resin level is correct. An alternate embodiment for maintaining the proper liquid level relative to the fixed frame is by having a computer controlled elevator system that is used to raise and lower the vat, thereby raising and lowering the liquid level. This alternate approach allows more adjustment than does the plunger.

While a part is being built, it is attached to and supported by the platform. The platform, in turn, is attached to a vertical elevator which is controlled by a precision lead screw driven by a stepper motor controlled by the control computer.

After each layer of a part is formed, the elevator typically dips that layer (and the platform) into the liquid resin by more than the anticipated thickness of the next layer to ensure that liquid resin will rapidly flow over the layer. Then, since the recoater blade typically sweeps over a horizontal plane parallel to and spaced above the resin surface, after liquid resin has flowed over the previous layer, the platform is raised until the previous layer is situated below the recoater blade by an amount greater than or equal to the anticipated thickness of the next layer. The liquid resin remains on the previous layer by means of the surface tension of the resin. At this point, the recoater blade is caused to sweep over the previous layer until the surface of the liquid resin is substantially smooth, and the coating is of proper thickness. Then, the platform is lowered until the top surface of the liquid resin on the part is level with the surface of the resin in the vat.

The position, speed, and number of sweeps of the recoater blade is determined by a stepper motor under the control of the control computer. The blade to part distance is controlled by the elevator. The speed and number of sweeps of the blade can be accurately controlled in order to minimize the time required to form a smooth layer of liquid resin while not introducing bubbles. Additional information about blade recoating and surface levelling is set forth in International Patent Applications Ser. No. PCT/US89/04096, and U.S. patent applications Ser Nos. 265,039, now abandoned, and 249,399, referenced earlier.

Preferably, the elevator, recoater blade, and plunger are not mechanically coupled to the vat. This enables the vat to be easily replaced throughout part building with vats containing resins with different characteristics, including color, conductivity, etc. This enables different layers of a part to be built with these different materials throughout part building. If the above devices were mechanically coupled to the vat, then the vat would be difficult or impossible to change throughout part building. This is due to the requirement to clean off residual resin from the vat before filling it with new resin as well as the need to re-calibrate the various positions of each component before proceeding with part building.

The two beam profilers are accurately placed at diagonal corners of the vat. Each profiler consists of a very small hole covering an ultraviolet detector. After each layer is built, the control computer moves the laser beam until it is detected by first one profiler, and then the other. Then, the control computer registers the angular positioning of the dynamic mirrors at which the laser beam is detected by each profiler, and compares these values with those obtained during a most recent calibration. Any difference is considered to be due to "drift" of the dynamic mirrors. In a process known as drift correction, the control computer subsequently compensates for any drift of the dynamic mirrors. Drift correction, calibration, and beam profiling are described in more detail in U.S. patent application Ser. Nos. 268,907; 268,837; and 268,816, referenced earlier.

Figure 3:
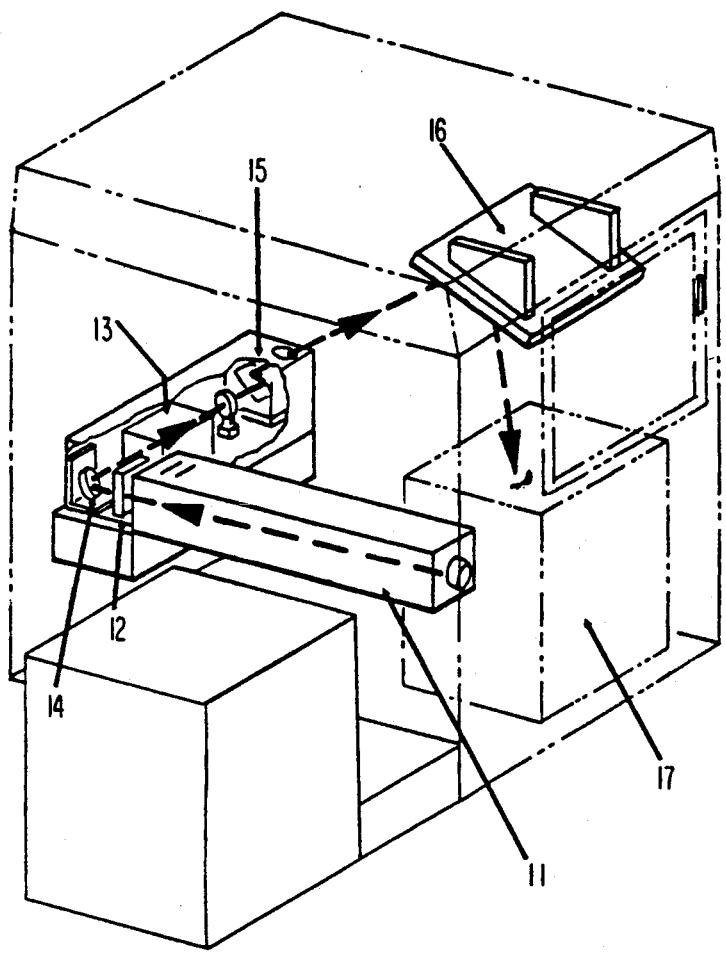
FIGS. 3–4 are perspective views of embodiments of the drawing subsystem of a stereolithography system.

The drawing subsystem is illustrated in FIG. 3. As illustrated, the subsystem comprises laser 11, safety shutter 12, focusing system 13, fixed mirror 14, dynamic mirrors 15, main mirror 16, and vat 17. The laser is mounted behind the vat, and produces a laser beam from an aperture. Lasers from either of two manufacturers, Spectra-Physics or Coherent, are possible. The laser is water-cooled and capable of producing a maximum power of 400 milliwatts of ultraviolet light in the wavelength range of 351.1 to 363.8 nm. The actual power is subject to computer control. Compared to the laser used in the previously described SLA embodiment, the subject laser has a much greater intensity as well as more than one lasing wavelength. For example, a laser used in the previous SLA embodiment typically provides a 20-25 mW beam having about a 10 mil diameter, which combines to provide an intensity of about 50 W/cm$^2$. The laser of the subject invention, on the other hand, provides a maximum 400 mW beam having a 5-10 mil diameter. This is equivalent to an intensity of about 32 W/mm$^2$. When the laser operates at less than maximum power, i.e., 250 mW, a 5-10 mil beam provides about 20 W/mm$^2$ of intensity.

The heavy dashed line in FIG. 3 shows the path of the laser beam. As shown, the beam is directed by fixed mirror 14, dynamic mirrors 15, and main mirror 16 to follow an optical path to the surface of the resin in the vat.

Also placed along the optical path is safety shutter 12 and focusing system 13. The safety shutter is solenoid-operated, and is placed immediately in front of the aperture of the laser to block the beam under computer control.

After leaving the aperture and passing through the safety shutter, the beam is directed by the fixed mirror to the focusing system. The focusing system expands and focuses the beam at the horizontal plane at which the resin surface is maintained.

An attenuator and fast shutter (not shown in FIG. 3) are integral parts of the focusing system. The attenuator is used to vary the laser power rapidly under computer control in order to cure thin layers which otherwise would not be possible with the 400 mW laser. Since the laser power is under computer control, it is theoretically possible to vary the laser. Changes in laser power, by adjusting laser control parameters typically require about 20-30 minutes to become effective, which may not be fast enough.

The fast shutter is a high performance programmable shutter of the LS Series line by nm Laser Products, Inc. (Sunnyvale, Calif.). Alternatively, a Microblitz Model 12X Programmable Shutter from Vincent Associates (Rochester, N.Y.) is possible.

The fast shutter, when closed, is used to block the laser beam when it is positioned over areas of the resin surface which are not intended to be cured, such as areas representing hollow portions of a part. If the shutter did not block the beam, the beam might cure unwanted plastic in these areas, even when the dynamic mirrors are caused to move at the fastest velocity possible. At present, the dynamic mirrors used are the Greyhawk Systems (Milpitas, Calif.) scanning mirror system 11331-001, which are capable of operating at a velocity in the range of 0-100 in/sec. Accuracy is not sacrificed at these higher speeds, however, since a servo control system is added (to be described later) to accurately control the positioning of the mirrors. In fact, the use of a high-power laser, in conjunction with fast servo-controlled mirrors, combine to dramatically increase the speed of part production without sacrificing accuracy, typically by a factor of 20 or more.

The fast shutter does require a finite time to open or close. Thus, to insure that the shutter opens or closes at the correct time, means are provided to anticipate when the shutter should be opened or closed so that an appropriate command will be sent to the shutter at the appropriate time. This aspect of the shutter is discussed farther on.

Figure 4:
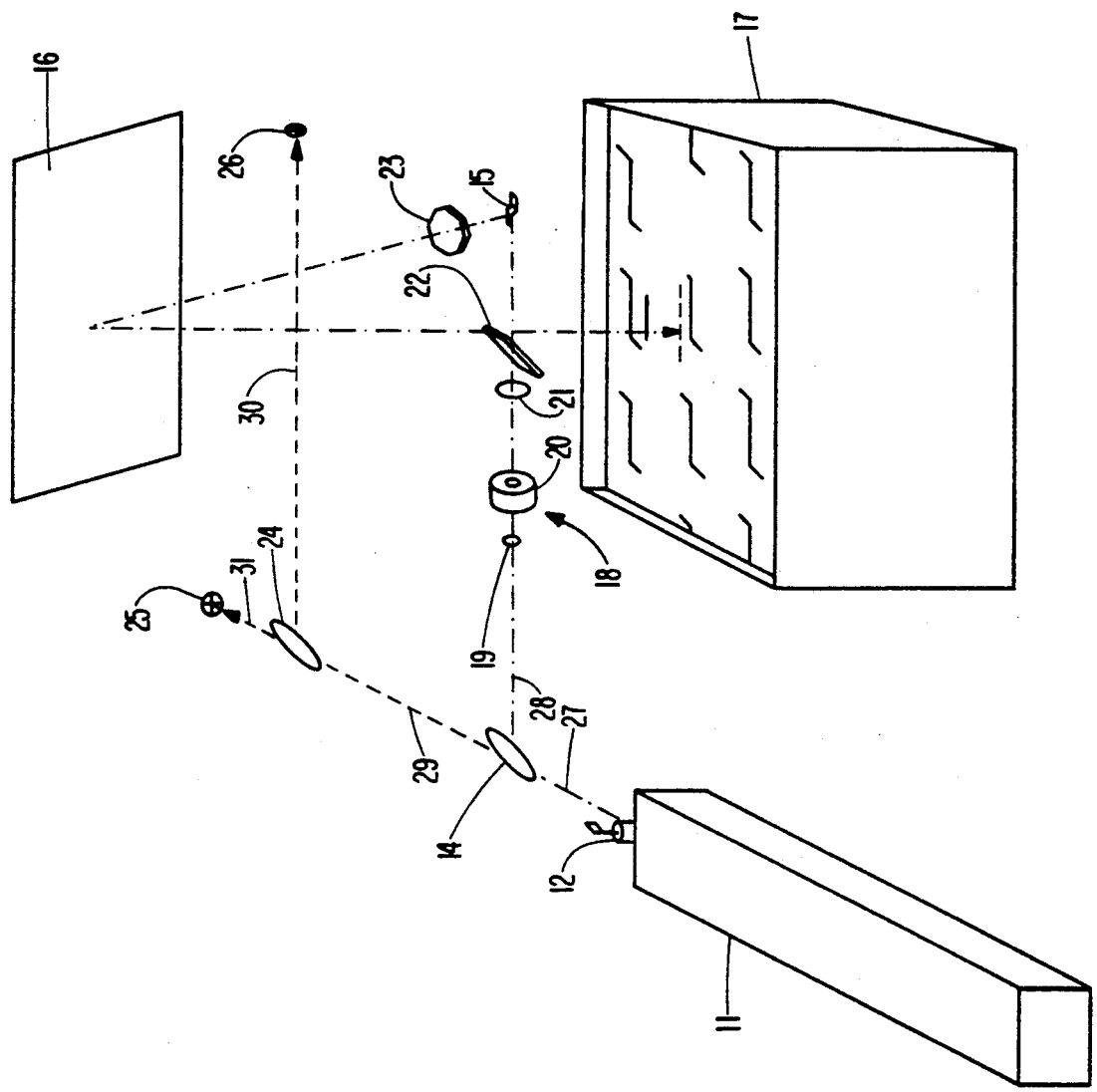

The workstation is nominally a Personal Iris computer, manufactured by Silicon Graphics, Inc., and is typically interfaced to an external CAD/CAM system by means of a local area network. The CAD/CAM system provides a surface description of an object, and the workstation processes this data in preparation for passing it to the control computer to begin building the part. The workstation configuration comprises:

- 8 megabytes of RAM
- a 170 - megabyte hard disk
- a cartridge tape unit
- a high-definition color monitor
- a keyboard
- a mouse
- an Ethernet board Turning to FIG. 4, the optics of the drawing subsystem are illustrated in more detail. As illustrated, the optics comprise laser 11, safety shutter 12, folding mirror beam splitter 14, beam expander 18, beam expander first lens 19, beam expander second lens 21, fast shutter 20, attenuator 22, dynamic mirrors 15, window 23, overhead mirror 16, beam splitter 24, and quad cells 25 and 26.

The laser emits beam 27 which first encounters safety shutter 12. The safety shutter is normally open to allow the beam to pass unattenuated, but when an emergency condition occurs, the shutter will close, thereby blocking the beam. The beam then encounters turning mirror 14, which doubles as a beam splitter.

As a beam splitter, the folding mirror divides beam 27 up into beams 28 and 29, beam 28 being almost 99% of the incident beam, and beam 29 being the remainder, typically about 1%. The turning or folding mirror 14 also redirects beam 28 so that it is at about 90° to the incident beam. Beam 28 then encounters beam expander 18, comprising first expander lens 19, and second expander lens 21. The first lens focuses then expands the beam, and the second lens focuses it such that the beam will have a desired spot size on the resin surface. Fast shutter 20 is placed at the focal point of first lens 19, and as discussed earlier, is used to selectively block the beam under control of the control computer configuration. After passing through second lens 21, the beam next encounters attenuator 22. The attenuator operates in two modes: a substantially transparent mode, and a 95% blocking mode, the particular mode at a given moment being selectable by the control computer. In the substantially transparent mode, which is the normal mode, the beam passes through the attenuator substantially unattenuated. In the 95% blocking mode, which is employed when the desired cure depth is low and exposure will be based on vectors which substantially overlap each other, such as, for example, for shallow skin fill vectors, the attenuator attenuates the beam by about 95%, so the attenuated beam will be about 5% of the incident beam.

After passing through the attenuator, the beam next encounters the dynamic mirrors 15 which in turn reflect the beam through window 23 which acts as an environmental seal for the optics. The beam then encounters overhead or main mirror 16, whereupon it is directed to the surface of the photocurable resin placed in vat 17.

The above provided a description of the path of beam 28. Beam 29, on the other hand, first encounters beam splitter 24, which splits beam 29 up into beams 30 and 31, both about 50% of beam 29. The beam splitter also redirects beam 30 so that it is about 90° to the direction of the incident beam, whereupon it encounters quad cell 26. Beam 31, on the other hand, encounters quad cell 25.

The quad cells are similar to the bi-cells disclosed in U.S. patent application Ser. No. 265,039, except that four cells are provided to allow two-dimensional alignment, instead of just two cells as with the bi-cell, which only allows alignment in one dimension.

The quad cells detect the location of an incident beam, and compare it to a predetermined location. Their utility lies in enabling the fast alignment of laser 11 by aligning beams 31 and 30 substantially at the predetermined locations, without requiring alignment of the rest of the optics. As a result, the laser can easily be replaced, and a new laser repositioned until the beam is in substantial alignment with its predecessor. Therefore, when the laser is replaced, only the laser beam need be realigned, and none of the other optical components will need to be aligned.

OVERVIEW OF COMPUTER ARCHITECTURE

Figure 5:
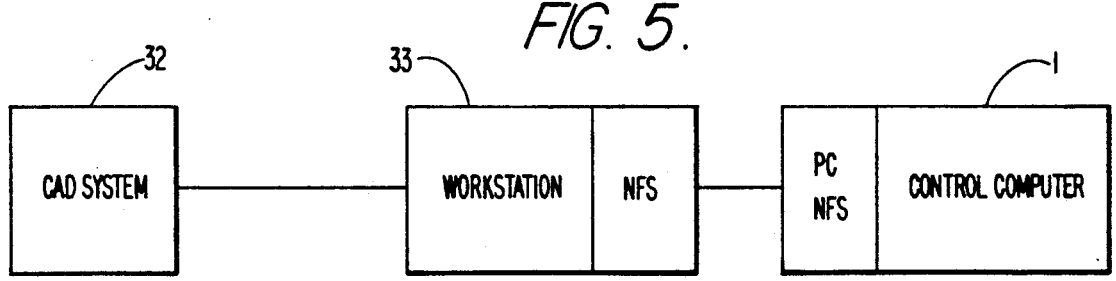
FIG. 5 is a diagram of the overall processor architecture of a stereolithography system.

The overall computer architecture associated with the SLA is illustrated in FIG. 5. As illustrated, three distinct computers are involved: external CAD/CAM system 32, workstation 33, and control computer 251. The workstation and control computer 251 have been described previously and are provided as part of the SLA. The CAD/CAM system is external to the SLA, and is responsible for converting a CAD/CAM file into a file appropriately formatted for use on the SLA. This file is known as a stereolithography file or more simply .stl file. Each CAD/CAM file represents either a single part, or in the case of a complex or large part, only a component of that part. A separate .stl file is created by the CAD/CAM system for each CAD/CAM file. Therefore, a complex or large part can be broken up into components, with each component represented by its own CAD/CAM file and thereafter .stl file.

It may be necessary to break up a CAD/CAM file for a single part into many component files for several reasons. For a large part, it may be necessary to do so simply because a large part file might be unmanageable within the CAD/CAM system. In addition, it may be desirable to be able to specify different build parameters for the different components of a part, emphasizing strength and speed of part building for some components, aesthetics, and accuracy for others. Breaking up the part file into components will pave the way for this to occur.

The CAD/CAM system may be connected to the workstation via a local area network for the transfer of the .stl files to the workstation. Alternately, the workstation can accept data from the CAD/CAM system via cartridge tape or floppy disk.

Each .stl file consists of a series of interconnected surface triangles, known as facets, which are assumed to completely span the entire surface of a component, and whose vertices are assumed to intersect only vertices from adjacent triangles. More information on .stl file formats is provided in U.S. patent application Ser. No. 331,644, referenced earlier. Also provided is a unit normal vector for the triangle which is assumed to point away from the interior of the object the triangle is spanning. A sample .stl file is as follows

| Sample .STL File | | | |
|---|---|---|---|
| SOLID | | | |
| cylinder | | | |
| FACET NORMAL | 0.000000e+00 | 0.000000e+00 | −1.000000e+00 |
| OUTER LOOP | | | |
| VERTEX | 3.231126e+00 | 1.450664e+00 | 1.000000e+00 |
| VERTEX | 2.709002e+00 | 1.505541e+00 | 1.000000e+00 |
| VERTEX | 2.715000e+00 | 1.620000e+00 | 1.000000e+00 |
| ENDLOOP | | | |
| ENDFACET | | | |
| FACET NORMAL | 0.000000e+00 | 0.000000e+00 | −1.000000e+00 |
| OUTER LOOP | | | |
| VERTEX | 2.715000e+00 | 1.620000e+00 | 1.000000e+00 |
| VERTEX | 3.240000e+00 | 1.620000e+00 | 1.000000e+00 |
| VERTEX | 3.231126e+00 | 1.450664e+00 | 1.000000e+00 |
| ENDLOOP | | | |
| ENDFACET | | | |
| FACET NORMAL | 9.986297e−01 | −5.233253e−02 | 0.000000e+00 |
| OUTER LOOP | | | |
| VERTEX | 3.231126e+00 | 1.450664e+00 | 3.820000e+00 |
| VERTEX | 3.231126e+00 | 1.450664e+00 | 1.000000e+00 |
| VERTEX | 3.240000e+00 | 1.620000e+00 | 1.000000e+00 |
| ENDLOOP | | | |
| ENDFACET | | | |
| FACET NORMAL | 9.986297e−01 | −5.233253e−02 | 0.000000e+00 |
| OUTER LOOP | | | |
| VERTEX | 3.240000e+00 | 1.620000e+00 | 1.000000e+00 |
| VERTEX | 3.240000e+00 | 1.620000e+00 | 3.820000e+00 |
| VERTEX | 3.231126e+00 | 1.450664e+00 | 3.820000e+00 |
| ENDLOOP | | | |
| ENDFACET | | | |
| FACET NORMAL | 0.000000e+00 | 0.000000e+00 | 1.000000e+00 |
| OUTER LOOP | | | |
| VERTEX | 2.768672e+00 | 1.499270e+00 | 3.820000e+00 |
| VERTEX | 3.231126e+00 | 1.450664e+00 | 3.820000e+00 |
| VERTEX | 3.240000e+00 | 1.620000e+00 | 3.820000e+00 |
| ENDLOOP | | | |
| ENDFACET | | | |
| FACET NORMAL | 9.876887e−01 | −1.564320e−01 | 0.000000e+00 |
| OUTER LOOP | | | |
| VERTEX | 3.204600e+00 | 1.283183e+00 | 3.820000e+00 |
| VERTEX | 3.204600e+00 | 1.283183e+00 | 1.000000e+00 |
| VERTEX | 3.231126e+00 | 1.4506643+00 | 1.000000e+00 |

| Sample .STL File -continued | | | |
|---|---|---|---|
| ENDLOOP | | | |
| ENDFACET | | | |
| FACET NORMAL | 9.876887e−01 | −1.564320e−01 | 0.000000e+00 |
| OUTER LOOP | | | |
| VERTEX | 3.231126e+00 | 1.450664e+00 | 1.000000e+00 |
| VERTEX | 3.231126e+00 | 1.450664e+00 | 3.820000e+00 |
| VERTEX | 3.204600e+00 | 1.283183e+00 | 3.820000e+00 |
| ENDLOOP | | | |
| ENDFACET | | | |
| END SOLID | | | |

As indicated, each facet is represented by three vertices, and one unit normal, and each vertice is represented by an X, Y, and Z coordinate. Once the component .stl files have been transferred to the workstation, software executing on the workstation then, after a series of steps, converts the .stl files to a single file associated with the part known as the build file, or more simply, .bff file, which is then passed to the control computer to orchestrate building of the actual part. The software which executed on the workstation is known as the SLA Part Manager, or more simply, Part Manager.

To convert an .stl file to a .bff file, Part Manager performs five primary functions. First, it prompts the user to divide up each .stl component file into layers, and then to group the layers into ranges. Second, it requests the user to provide certain build parameters for each range. Third, it slices up each .stl file into layers to produce a file known as the .sli file, which contains data in vector format descriptive of the borders of each layer. (See U.S. patent application Ser. No. 331,644 for more information regarding slicing up an .stl file into a .sli file containing vectors.) Fourth, the border vector data and build parameters for all the components are combined to form the .bff file for the part, with the Part Manager resolving any conflicts between the build parameters of different components for the same layer. Fifth, the build file is passed to the control computer.

Figure 6:
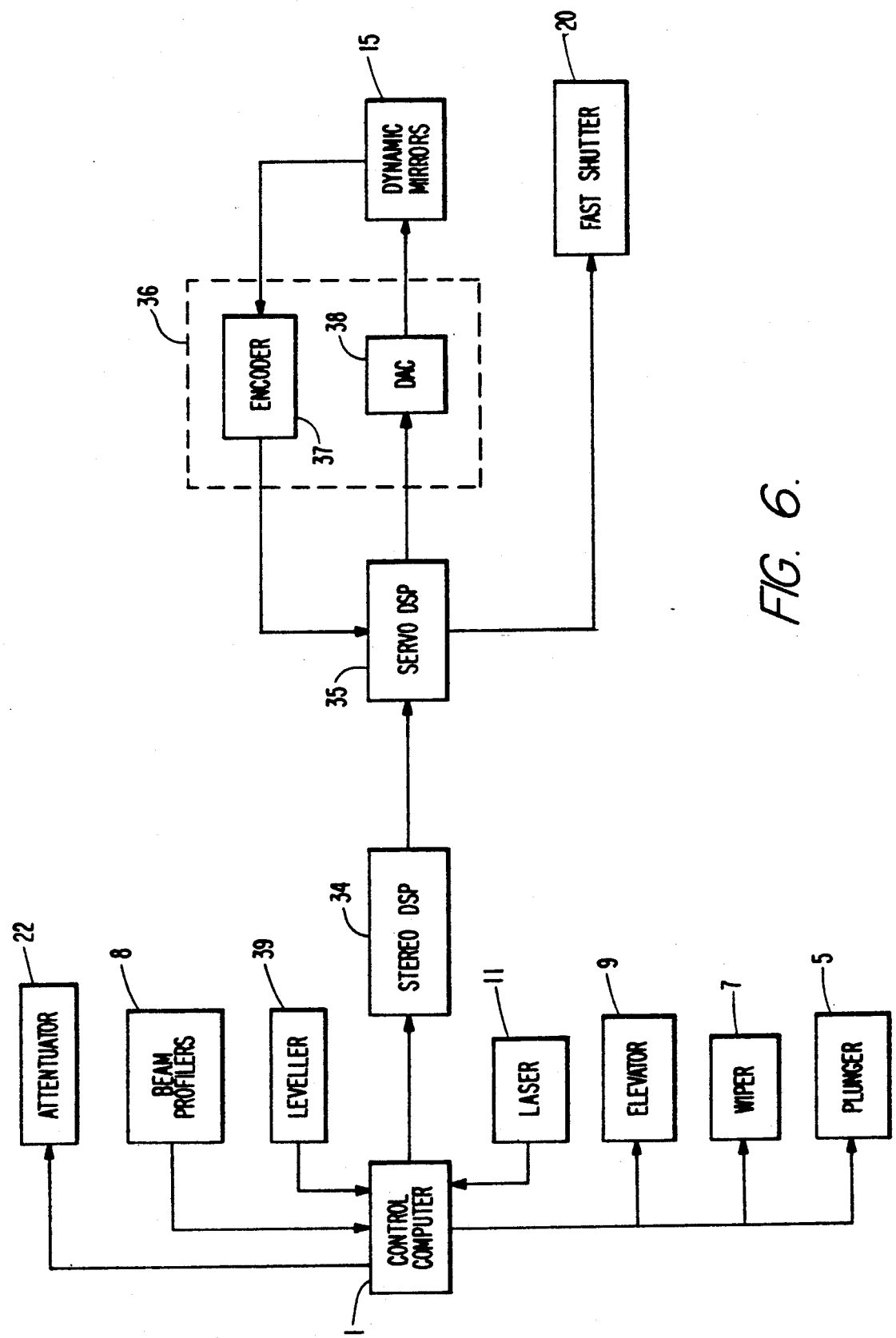
FIG. 6 is a diagram of the control computer configuration of a stereolithography system.

Turning to FIG. 6, more detail about the control computer configuration is provided. As illustrated, the configuration comprises control computer 251, stereo-DSP 34, servo-DSP 35, and dynamic mirror interface 36 comprising encoder 37 and DAC 38. The control computer is electrically coupled to the stereo-DSP, which in turn is coupled to the servo-DSP. The servo-DSP, in turn, is coupled to the DAC, which is coupled to the dynamic mirrors. Data flows from the control computer to the stereo-DSP 34 then to the servo-DSP, the servo-DSP to the DAC, and ultimately to the dynamic mirrors. The dynamic mirrors are also coupled to the servo-DSP, the servo-DSP to the DAC, and ultimately to the encoders which, in turn, are coupled back to the servo-DSP, thereby completing the servo control feedback loop. As will be discussed in more detail later, the servo control feedback loop provides for accurate mirror positioning even at higher velocities.

Each DSP is an AT&T WE DSP32C Digital Signal Processor high-speed, programmable integrated circuit comprising a 32-bit floating-point unit, a 16-/24- bit fixed-point unit, on-chip memory, and flexible serial and parallel input/output ports. Thus, the DSP32C can be programmed to support a wide variety of computation intensive applications. Additional information about the DSPs is available from AT&T WE DSP32C. Digital Signal Processor Information Manual, December 1988, and related manuals, which are hereby fully incorporated by reference herein as though set forth in full. The X-Y encoder is a Canon laser rotary encoder such as the K-1 super high resolution (81,000 pulses/rev) for ultra-precision rotation angle sensor.

As illustrated, the control computer is also coupled to, and responsible for controlling, and in some cases monitoring, elevator 9, wiper or recoater beade 7, plunger 5, laser 11, attenuator 22, leveller 39, and beam profilers 8.

As shown, positioning of the dynamic mirrors is directly controlled by the servo-DSP. Moreover, to position the mirrors to a particular location, the servo-DSP will first determine their current location by means of the encoder, then it compares that value with the desired location, and issues a command accordingly. The mirrors will then, in a manner to be described subsequently, move the beam 28 (as depicted in FIG. 5) to the desired location.

Also shown in FIG. 6 is a fast shutter coupled to and controlled by the servo-DSP. As will be discussed, the servo-DSP issues commands to open or close the shutter at the same time that it is issuing commands to position the dynamic mirrors (and ultimately the laser beam). The shutter, however, has a finite response time. Therefore, if the beam is about to enter a hollow region of a layer from a solid region, the servo-DSP will command the shutter to close, which command is timed so that the closing of the shutter happens at the same time as the entry into the hollow region. Conversely, if the beam is about to enter a solid region from a hollow region, the shutter will be commanded to open, and the issuance of the command will be timed to take account of the response time of the shutter.

The control computer takes the build file associated with a part, and generates hatch and fill vectors from the border vectors therein. These vector types,are, described in more detail in U.S. patent application Ser. No. 331,664, referenced earlier, but a summary is provided here. Vectors describe the movement of the laser beam along the resin surface, and each vector has a beginning point and an ending point. For each vector, the laser beam traverses the resin surface starting at the beginning point of the vector and stopping at the ending point. Vectors are generated on a layer by layer basis. Border vectors describe the borders of each layer, hatch vectors describe the internal portion of each layer, and skin vectors describe any outward surface of the part which happens to fall on the layer. The border, hatch, and fill vectors are then passed to the stereo-DSP, which generates laser jump and move commands therefrom. Each command specifies a desired X,Y position of the laser beam. Move and jump commands will be described in more detail subsequently.

The stereo-DSP also performs geometrical and thereafter drift correction on the desired X,Y positions associated with the move commands (drift correction is not performed on the X,Y coordinates of the jump vectors, and geometric correction is only performed on the endpoints). The commands with the corrected X,Y positions are then sent to the servo-DSP, which in turn, positions the mirrors at the desired locations after first determining the current location. The servo-DSP also issues appropriate commands to the fast shutter which are timed with respect to the mirror commands to take account of the finite response time of the shutter.

The software which executes on the workstation, the control computer, and each of the DSP's will now be discussed in turn.

DESCRIPTION OF THE PART MANAGER

The SLA Part Manager, or more simply Part Manager, is the software executing on the workstation. The Part Manager takes as input all the component files associated with a part, and generates a single build file associated with the part. The build file is then transformed to and used by the control computer to build the part, layer by layer. In the course of creating the build file, Part Manager creates a number of other files, including style files, slice files, and a part file. For each component file of a part, Part Manager prompts the user to divide the file into a range of layers, and then prompts the user to define build parameters for each range. The build parameters are predefined and stored in a file known as a style file, and the build parameters for each style file can be chosen to emphasize different attributes, such as strength, aesthetics, speed of part building, or accuracy to build up a library of different styles. Then, in Part Manager, a user can simply associate a style file with each component range. Since the style files can be predefined, the user need not have detailed knowledge about the implementation details of the SLA. As a result, novice users can use Part Manager without requiring a significant amount of training beforehand.

Part Manager accomplishes the aforementioned functions with a spreadsheet screen display, to be discussed subsequently. After all the style files for all the ranges for each component of a part have been specified, Part Manager combines the data from the style and component files for the part to produce a part file. The spreadsheet provides a matrix visual display of the relationship between the component files, the ranges, and the styles. The part file is basically a data representation of the spreadsheet at a given moment, the spreadsheet being the visual display of the data. Therefore, if a user decides to stop part preparation at an intermediate point of completion, the part file will provide a means to recreate the intermediate spreadsheet at a later time.

After a build file is created, Part Manager then slices each component file into a slice file of border vector data descriptive of the border of each layer of the component, and then combines all the slice files into a build file with build parameters from the style files. The build file is organized layer by layer, and the data for each layer is the combination of the vector data from all the slice files for each component which happens to fall on the layer and the build parameters from the style files associated with each component. Part Manager also resolves any conflicts between the build parameters in a given layer from the various components which happen to fall on the layer.

Figure 7:
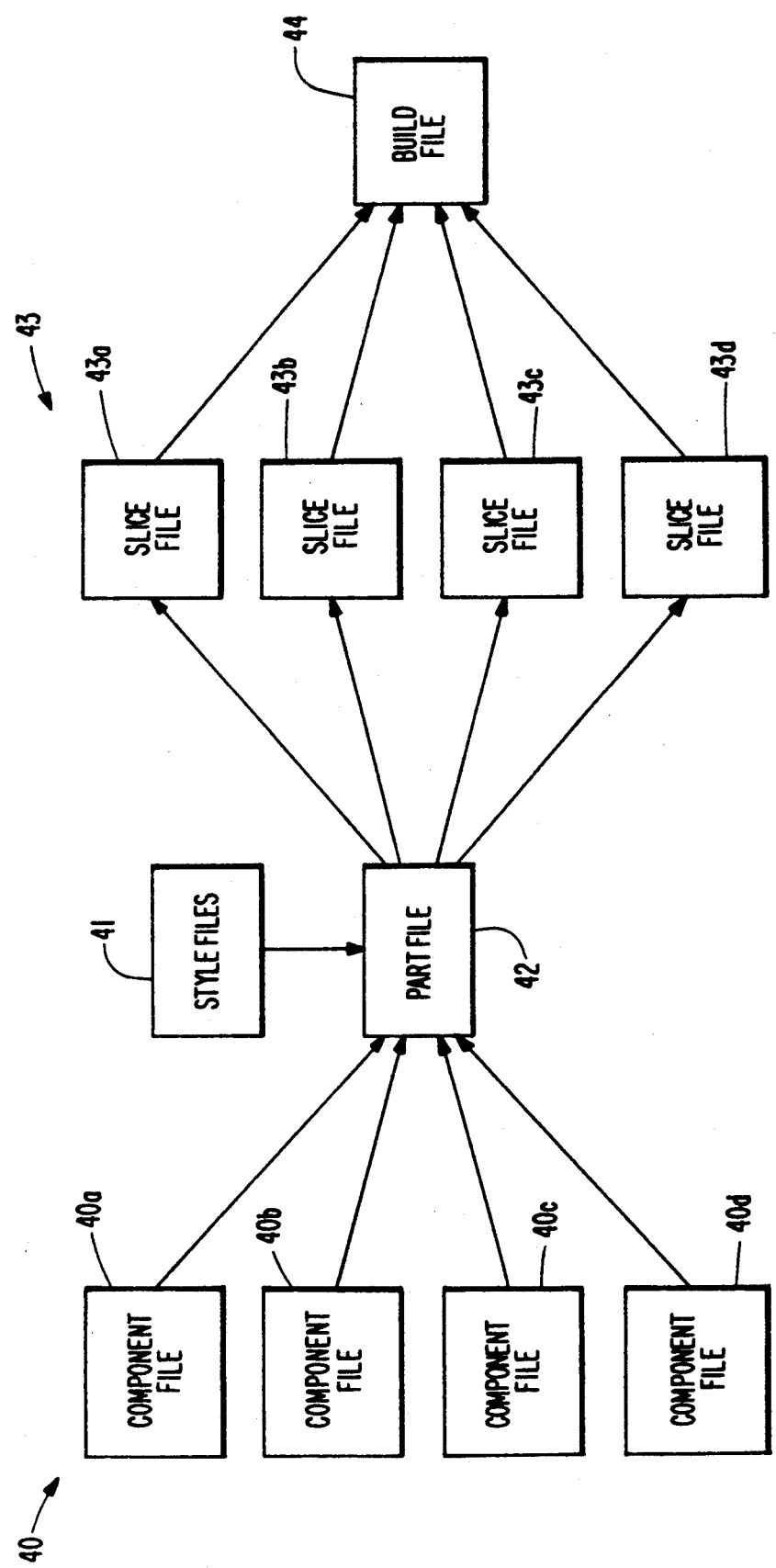
FIG. 7 is a diagram showing the sequence in which files are generated in a stereolithography system.

The overall file management process is illustrated in FIG. 7. As shown, after individual component files, 40a, 40b, 40c, etc. are directed up into ranges, a corresponding style file 41 is selected for each range. The component and style files are then combined to produce part file 42. The individual component files from the part are then sliced by Part Manager to generate slice files 43a, 43b, 43c and 43d. The slice files are then combined with the build parameters from the style files to produce build file 47.

Each slice file (also known as a .sli file) is organized layer by layer. For each layer, all the border vectors are represented, grouped by border vector type. At present, the border vector types and their associated mnemonics are as follows:

| MNEMONIC | DESCRIPTION |
| --- | --- |
| LB | Layer border |
| FDB | Flat down facing border |
| FUB | Flat up facing border |
| NFDB | Near flat down facing border |
| NFUB | Near flat up facing border |

Each vector is represented by four data points, the first two representing the X and Y coordinates of the vector origin, and the next two representing the X and Y coordinates of the end of the vector. A sample .sli file is as follows:

| | Sample .SLI File | | | |
| --- | --- | --- | --- | --- |
| L | 8000 | | | |
| LB | | | | |
| | 12032 | 4129 | 12960 | 4089 |
| | 12960 | 4080 | 13888 | 4129 |
| | 13888 | 4129 | 14806 | 4274 |
| | 14806 | 4274 | 15704 | 4515 |
| | 15704 | 4515 | 16572 | 4848 |
| | 16572 | 4848 | 17400 | 5270 |
| | 17400 | 5270 | 18180 | 5776 |
| | 18180 | 5776 | 18902 | 6361 |
| | 18902 | 6361 | 19559 | 7018 |
| | 19559 | 7018 | 20144 | 7740 |
| | 20144 | 7740 | 20650 | 8520 |
| | 20650 | 8520 | 21072 | 9348 |
| | 21072 | 9348 | 21405 | 10216 |
| FDB | | | | |
| | 18822 | 6450 | 19470 | 7098 |
| | 19470 | 7098 | 20047 | 7811 |
| | 20047 | 7811 | 20546 | 8580 |
| | 20546 | 8580 | 20963 | 9397 |
| | 20963 | 9397 | 21291 | 10253 |
| | 21291 | 10253 | 21529 | 11139 |
| | 21529 | 11139 | 21672 | 12044 |
| | 21672 | 12044 | 21720 | 12960 |
| | 21720 | 12960 | 21672 | 13876 |
| L | 8160 | | | |
| LB | | | | |
| | 16567 | 21077 | 15705 | 21407 |
| | 15705 | 21407 | 14807 | 21649 |
| | 14807 | 21649 | 13888 | 21794 |
| | 13888 | 21794 | 12960 | 21843 |
| | 12960 | 21843 | 12953 | 21842 |
| | 12953 | 21842 | 12032 | 21794 |
| | 12032 | 21794 | 12025 | 21792 |
| | 12025 | 21792 | 11113 | 21649 |
| | 11113 | 21649 | 10209 | 21405 |
| | 10209 | 21405 | 9347 | 21074 |
| | | ••• | | |

The format of the other files, such as the part file, style file, and build file, will be discussed in subsequent sections. Each component file follows the format of a .stl file, discussed previously.

Figure 8:
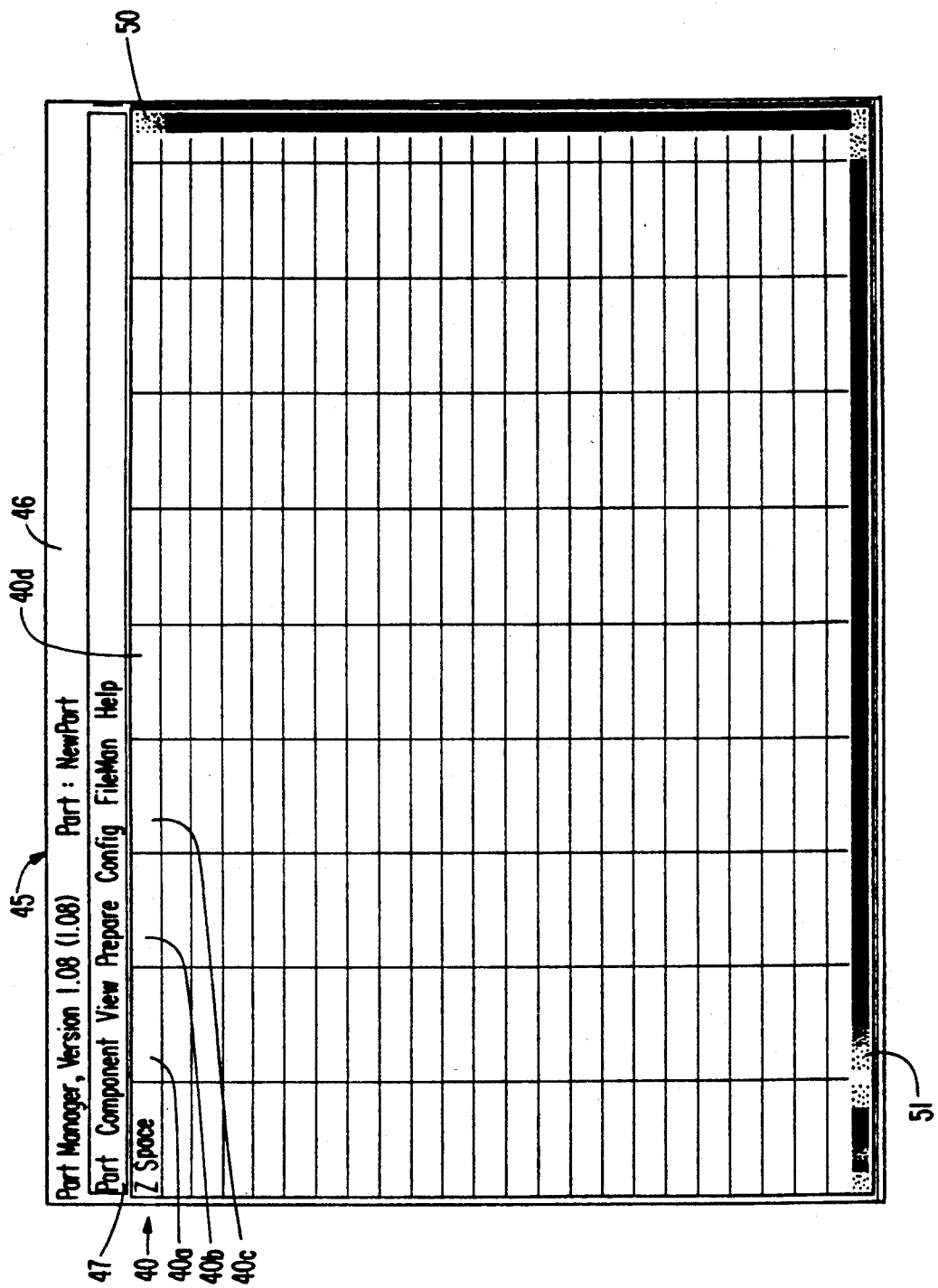

For each component file, the user specifies range information and a style file for the range by means of a spreadsheet as illustrated in FIG. 8. Each spreadsheet is associated with a part, and the columns of the spreadsheet represent components of the part, while the rows represent ranges of layers. With respect to FIG. 8, the spreadsheet contains six regions:

A header bar 46 across the top of the spreadsheet shows the program name and version number, followed by the filename of the part represented by the current spreadsheet. The name NewPart is displayed if no filename has been assigned.

A menu bar 47 immediately under the header contains the names of Part Manager functions including Part, Component, View, Prepare, Config, FileMan, and Help.

The left column 45 of spreadsheet cells is for range values. Apart from the top cell in this column, which contains the word Z Space, this column is blank when a new spreadsheet is first displayed.

The top row 40 of spreadsheet cells, with the exception of the leftmost cell, is for component names. These cells are blank when a new spreadsheet is first displayed.

The remaining cells of the spreadsheet are for data, typical examples of which are described subsequently.

The horizontal scroll bar 51 at the bottom of the spreadsheet and the vertical cross bar 50 at the right of the spreadsheet are used to access cells which are not currently displayed.

Thus, with respect to FIG. 8, the second, third, fourth, and fifth columns, 40$a'$, 40$b'$, 40$c'$, and 40$d'$, would be associated with component files (the first or left column 45 is reserved for the displaying of range information).

The spreadsheet may be much larger than the eight columns and twenty-two rows shown on the screen. The area covered by these rows and columns is, in fact, just a window into a potentially much larger spreadsheet.

An optical mouse controls the position of a red arrow-shaped cursor which cursor can be made to point anywhere on the screen by moving the mouse on the mouse pad. The user controls the action of Part Manager by moving the mouse until the red arrow cursor points to a menu name or menu item, and then operating one of the three buttons on the top of the mouse.

There are three ways in which a mouse button can be operated, referred to as clicking, pressing, and dragging, respectively.

The expression "clicking the button" means to press and immediately release the button. "Pressing the button" means to press and hold the button down until some response is seen on the screen. "Dragging" means to press and hold down a mouse button while moving the mouse.

The mouse has three buttons. The three buttons on the mouse are used for the following purposes:

Left Button

The left mouse button is used to select menu items. In most cases, a menu item is selected by pointing at a menu name in the menu bar, and then, while holding down the left mouse button, dragging down until the desired menu item is highlighted as red characters on a white background. At this time, the menu item is activated by releasing the mouse button.

Figure 9:
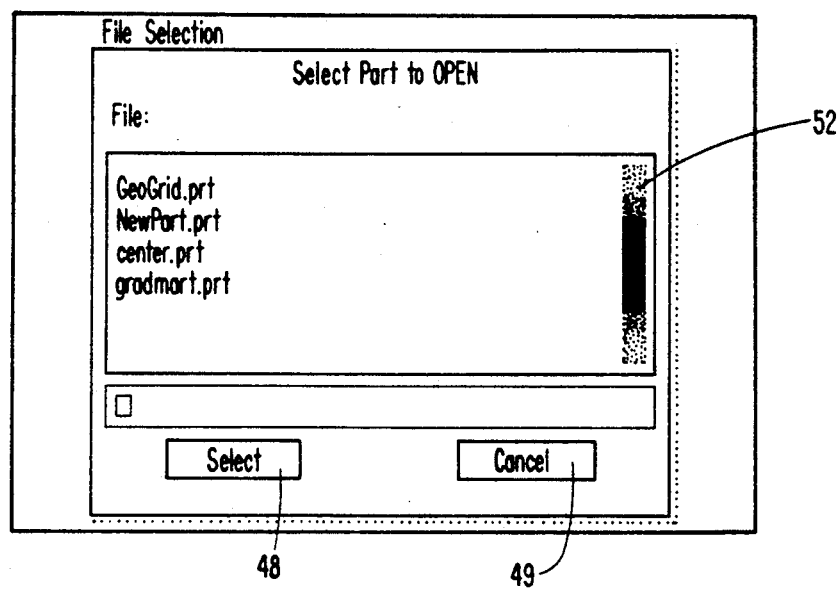

Another use of the left mouse button is to make a choice by selecting a simulated button on the screen. In many cases, selection of a menu item results in a dialog box appearing on the screen. As shown in FIG. 9, many dialog boxes have simulated buttons such as the Select and Cancel buttons 48 and 49, respectively. The user chooses a button by moving the mouse so that the tip of the red arrow pointer is within the outline of the button, and then clicking the left mouse button. Note that the button must be released while the tip of the pointer is within the outline of the button.

Yet another use of the left mouse button is in conjunction with the scroll bars on the right, and along the bottom, of the main screen. In FIG. 8, the right and bottom scroll bars are identified with reference numerals 50 and 51, respectively. If data occupies more of the spreadsheet than can be seen on the screen, the scroll bars can be used to move the displayed view to another part of the spreadsheet. To move the view right or left, the red arrow pointer is moved to point into a red rectangle in the horizontal scroll bar at the bottom of the spreadsheet. By pressing the left button and dragging the mouse to the left or right, the view of the spreadsheet also moves horizontally. Similarly, by pointing to a red rectangle in the vertical scroll bar at the right of the spreadsheet, the screen view of the spreadsheet can be moved up or down. At any time, the positions of the red rectangles in the scroll bars indicate the positions of the first row and column of the spreadsheet that is in view.

Some dialog boxes (FIG. 9) display a list of file names. There may be so many names in the list that they all cannot be displayed in the available space. In this case, vertical scroll bar 52 at the right side of the dialog box is used to scroll the list of names up or down, using the method already described for moving the spreadsheet up or down on the screen.

Middle Button

One use for the middle button of the mouse is to move an entire window on the screen. A Part Manager main window is initially placed at the center of the workstation screen. It is possible to move the window to another part of the screen by moving the red arrow pointer into the white title bar across the top of the spreadsheet, then pressing the middle button while dragging the mouse. A magenta rectangle moves on the screen to show the new position of the window. The window moves to its new position when the mouse button is released. Another example of moving windows is when using the View function to display images of components or parts on the screen, to be described subsequently. In some cases, dialog boxes are superimposed on the spreadsheet or an image of a part or component. Using the technique described above, a superimposed dialog box can be moved to reveal the spreadsheet or an image it covers.

The middle button of the mouse is also used to move spreadsheet columns. With a spreadsheet displayed, the red arrow pointer is moved into the column to be moved. When the middle button is pressed, the selected column is outlined in magenta. The red arrow is then dragged to the left or right to move the column into the new position. When the button is released, the column appears in its new position, and the remaining columns move to occupy the vacated column space.

Right Button

In some situations, two or more windows can be displayed simultaneously. In many cases, all windows except the first have a small window-close box at the top right corner. Windows that have a window-close box can be closed by pointing into the box with the red-arrow pointer, and then clicking the right mouse button.

Figure 10:
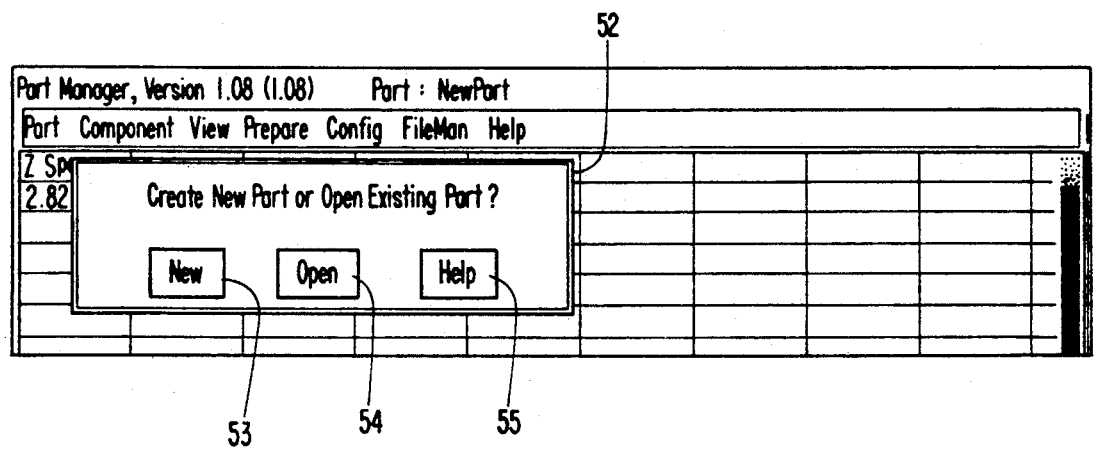

When a user first accesses Part Manager, a main spreadsheet screen appears. When the spreadsheet appears as shown in FIG. 10, dialog box 252 is superimposed on the spreadsheet. Three simulated buttons, 53, 54, and 55, in the dialog box, give the user the choice of creating a new part, opening an existing part, or requesting help.

Figure 11:
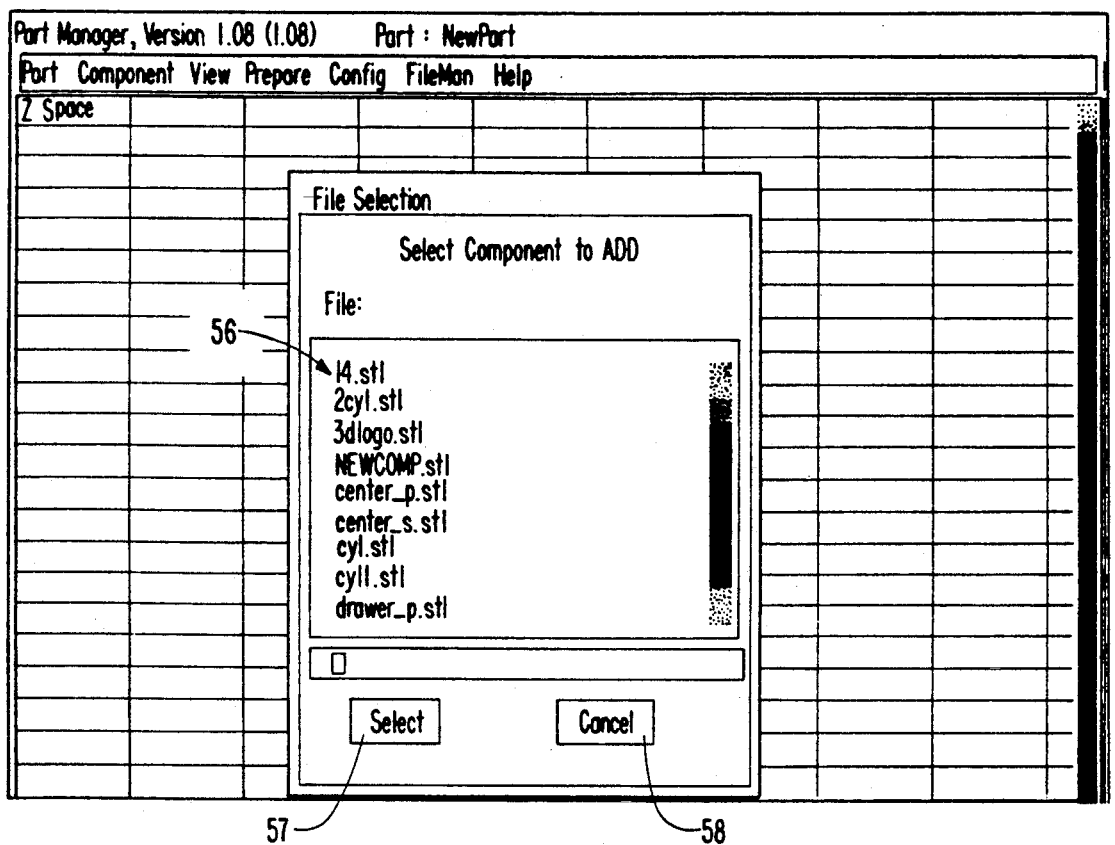

To create a new part, the user points to New button 53 and clicks the left mouse button. The workstation responds by displaying a blank spreadsheet with a dialog box superimposed over it. As shown in FIG. 11, the dialog box contains a list 56 of all component files (those files with names having a .stl extension) in a current directory.

The dialog box shows a list of available components and two buttons, 57 and 58, the Select and Cancel buttons, respectively.

If there are more component file names than can be displayed in the available space, the scroll bar on the right of the screen can be used to scroll the names.

A file name is selected by pointing to it and pressing the left mouse button. This causes the file name to change from black to red and a copy of the file name to appear in the rectangle just above the buttons. The selected file is then moved into the spreadsheet by pointing to the Select button and clicking the left mouse button. Multiple components can be selected.

A previous spreadsheet (one with no component file names in the cells) can be displayed without change by pointing to the Cancel button and clicking the left mouse button.

Components

Components of a part are selected from the file selection dialog box (FIG. 11) by pointing to one file name at a time and clicking the left mouse button. The file name changes from black to red to show that it is selected. Any number of file names can be selected in this way. If a file is selected in error, it can be deselected by again pointing at it and clicking the mouse button, after which the color of the name changes back to black. After all the required file names have been selected in this manner, a user can point to the Select button at the bottom of the dialog box and click the left mouse button. This loads the selected component files into the spreadsheet.

Figure 12:
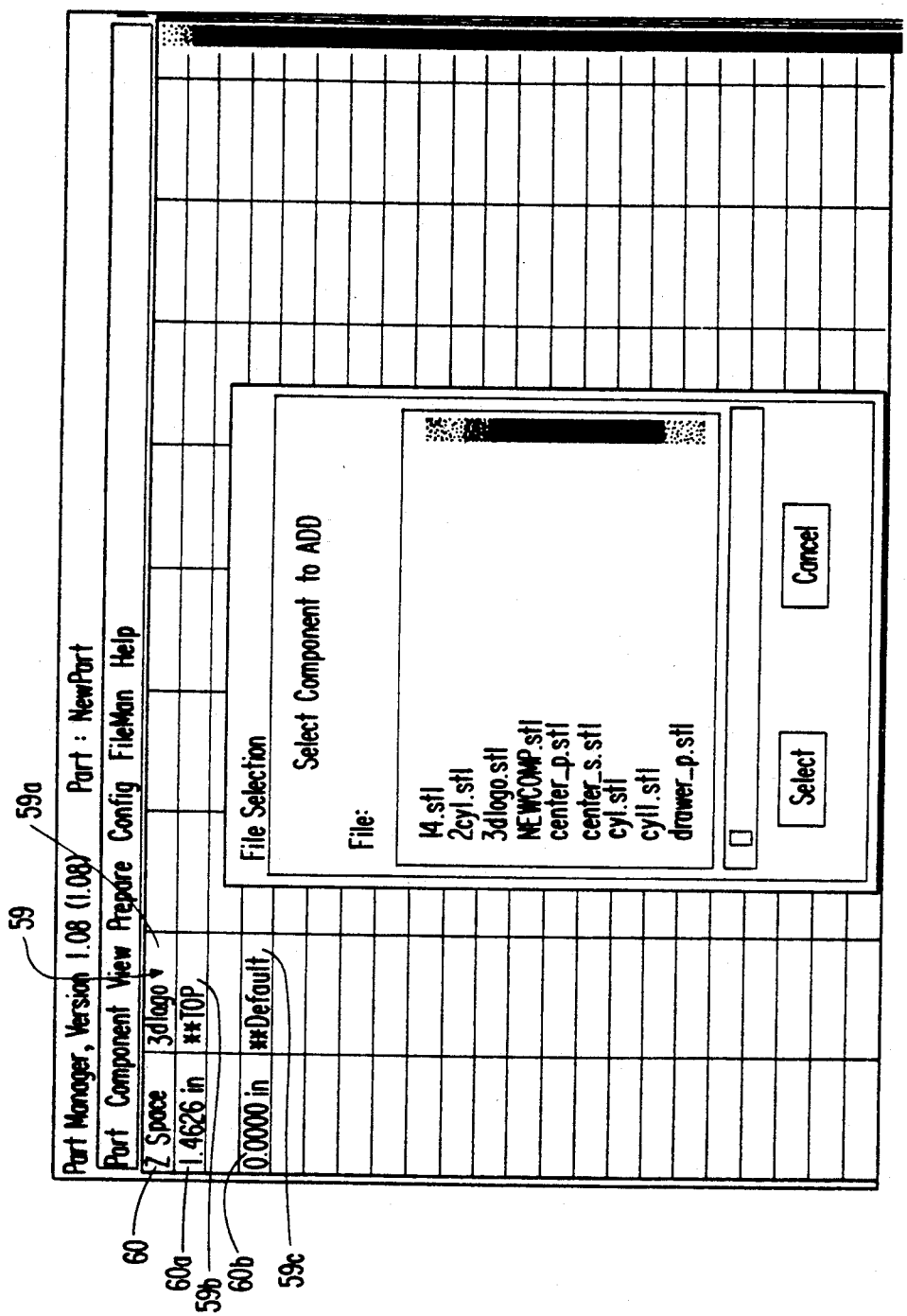

Assuming a previously empty spreadsheet, if the component file 3dlogo.stl in FIG. 11 is selected, a column 59 for that file is created in the spreadsheet, as shown in Figure 12. The top cell of the column shows the component file name. Left column 60 shows the vertical position of the top and bottom layers of the component. Initially, only three cells of the component column are used:

top cell 59a shows the component name,
second cell 59b contains **TOP, indicating the top layer of the component
the remaining cell 59c contains **Default, indicating the bottom layer of the component, and also showing that a default style file named Default is applied to all layers of the component (to be discussed subsequently).

The concept of styles and style files is described in detail subsequently. For the present, as noted previously, note that a style defines the build parameters, such as layer thickness of a layer and the details of how it is created.

Figure 13:
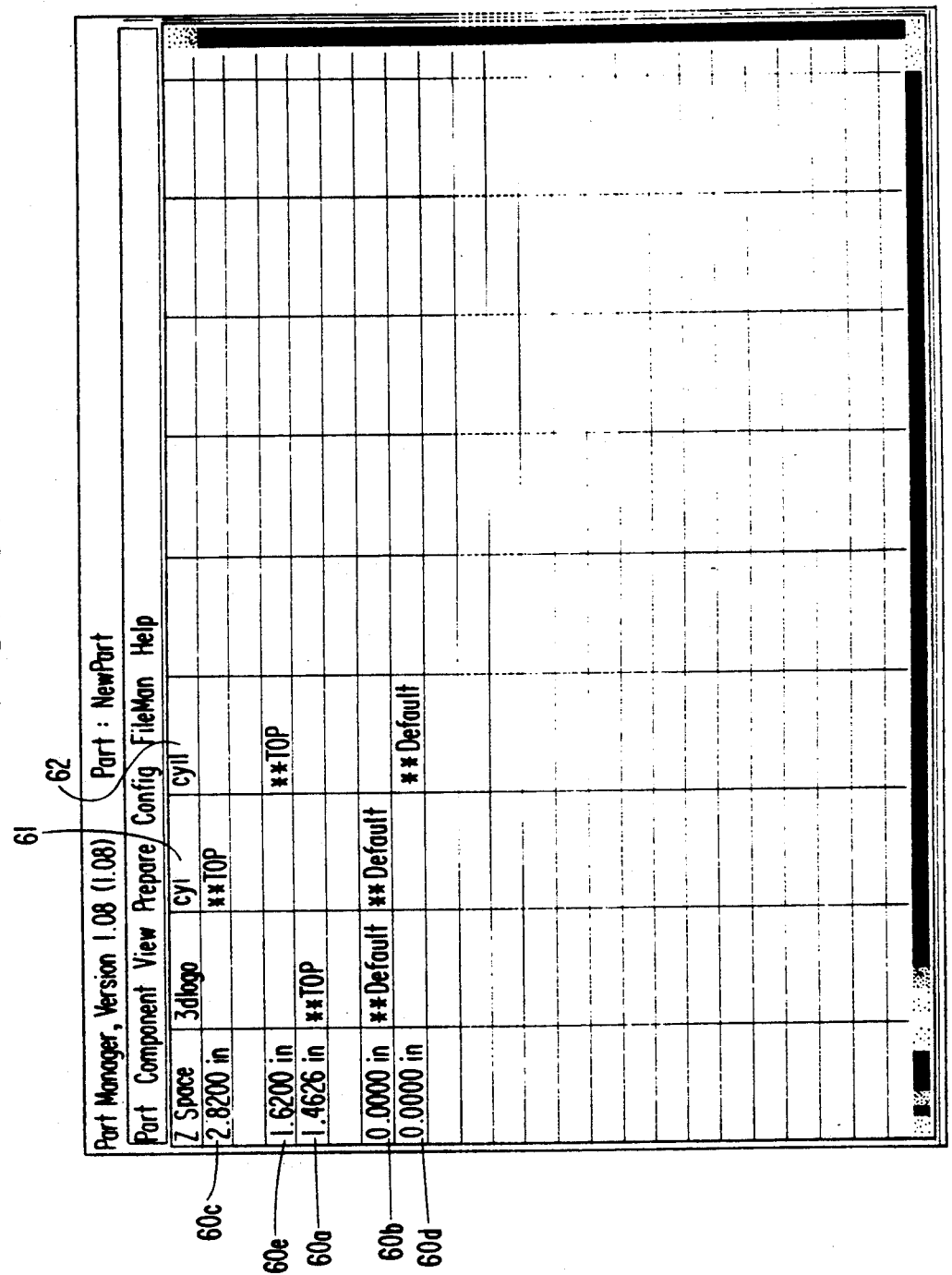

As successive components are selected from the dialog box and added to the spreadsheet, an additional column is created for each component. In FIG. 13, for example, as component files cyl.stl and cyll.stl are selected, columns 61 and 62, respectively, are created for these components. New rows are also created for the top and bottom layer of each component. As shown in FIG. 12, for example, initially, after 3dlogo.stl is selected, only rows 60a and 60b were created. With the addition of two other components, rows 60c and 60e were created, corresponding to cyl.stl and cyll.stl, respectively. Row 60d was created for the bottom of cyll.stl. Note that the bottom of cyl.stl coincided with the bottom of 3dlogo.stl, so that a separate row for this layer did not need to be created. As shown, these rows are placed in order according to their vertical position.

After a number of components have been added to the spreadsheet, it is often convenient to change the positions of the columns so that related components are adjacent. As previously explained, any column can be moved by pointing to it, pressing the middle mouse button, and dragging the column to a new position.

After the components of a part have been assembled on a spreadsheet, the View function can be used to examine the part. The View function is described subsequently.

Style Files

When a component is selected, a default style file, or more simply a default style is initially allocated to it. In FIG. 13, this is indicated by the word **Default being placed in the cell corresponding to the bottom of each component. However, it is possible to change to another pre-existing style or create a new style for the component if the default style is not appropriate.

Figures 14, 15:
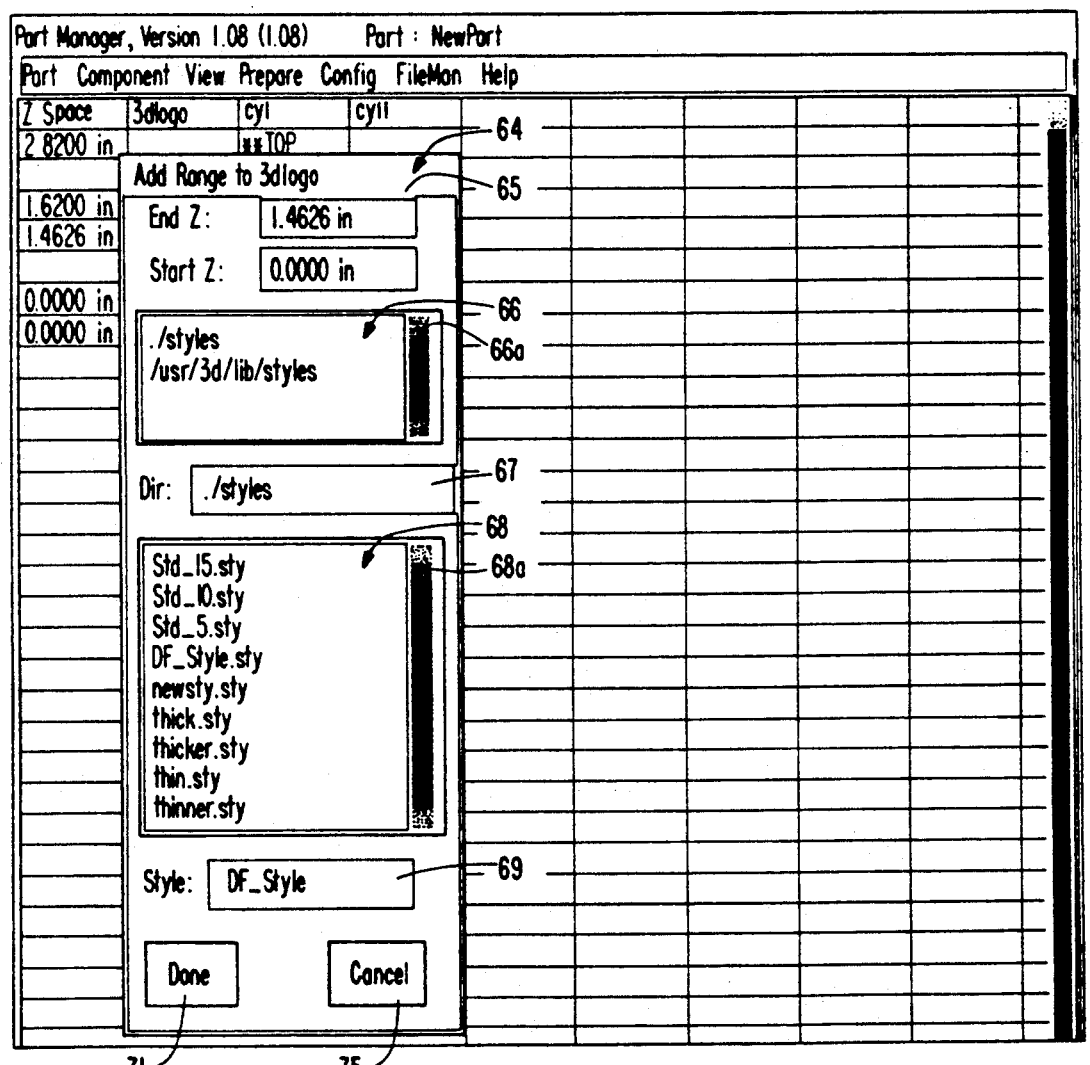

A pre-existing style file can be changed by pointing to the cell in which the style is currently defined, and clicking the left mouse button. For example, to change the style file for the 3dlogo component, a user points to the cell that contains **Default in the 3dlogo column and clicks the mouse button. Then, as illustrated in FIG. 14, range pop-up menu 63 appears. When the range pop-up menu appears, a user may point to Add and click the mouse button to superimpose a style dialog box on the spreadsheet. Style dialog box 64 is illustrated in FIG. 15.

The top right corner 65 of this dialog box shows the positions of the top and bottom layers of the component. Below this is a list of the directories 66 which contain style files. As shown in the Figure, Part Manager is initially configured with two style file directories. The directory ./styles contains style files created by the system user. The directory ./usr/3d/lib/styles contains style files supplied with Part Manager.

When the dialog box first appears, the directory containing the user's style files is selected, and the names 68 of the style files in that directory are displayed. The current style name is displayed in the box 67 close to the bottom of the dialog box.

The window 66 that shows style directory names, and also the window 68 that displays file names, can accommodate more names that can be displayed at any one time. Scroll bars on the right of both windows, 66a and 68a, respectively, are used to view directory and file names not currently displayed.

To change the displayed directory from one to another, a user points to the name of the desired directory and clicks the left mouse button. Similarly, to select a style, a user points to the style name and clicks the mouse button. The name of the selected style appears in the box 69 near the bottom of the dialog box.

Figure 16:
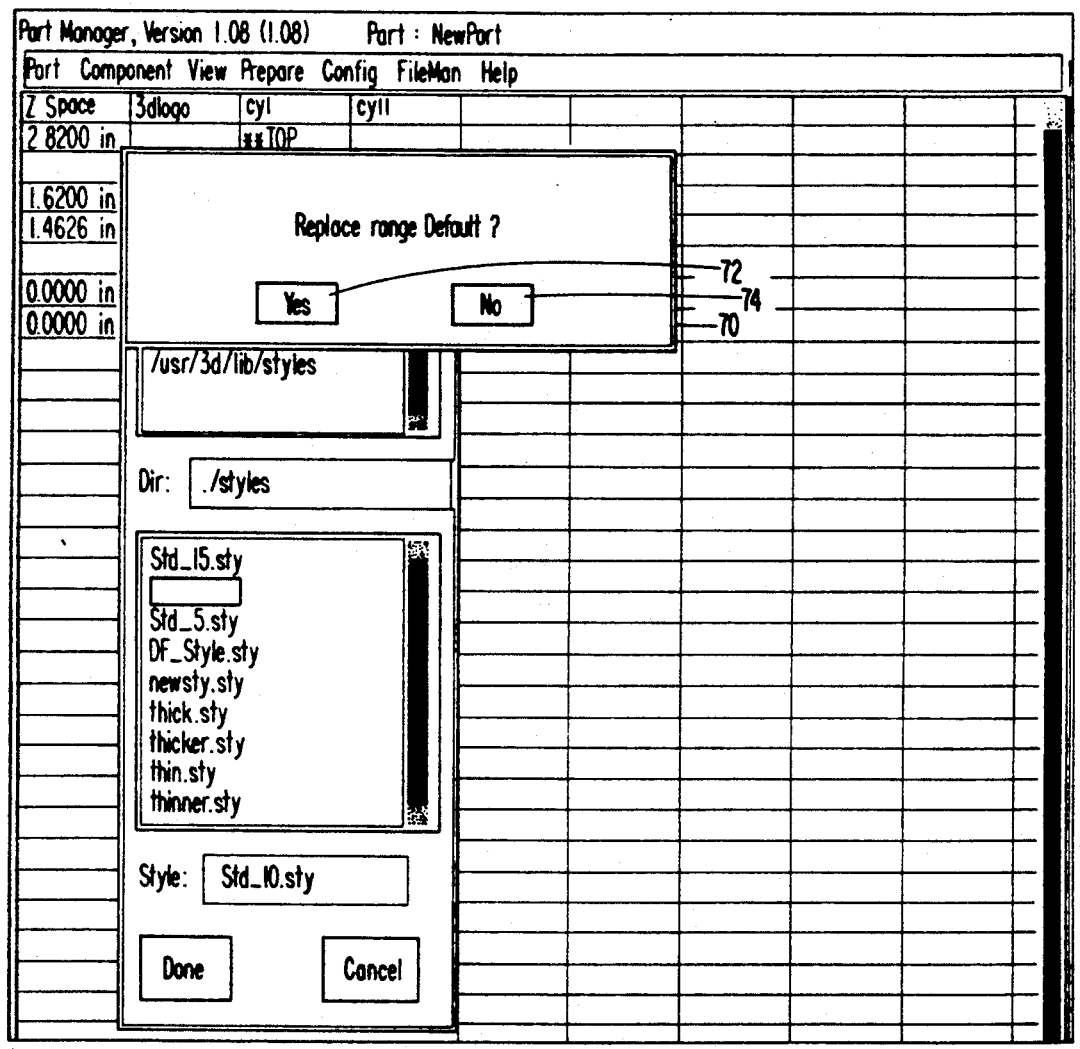

To accept the selected style, a user points to the Done button 71 at the bottom of the dialog box and clicks the left mouse button. As shown in FIG. 16, another dialog box, the Replace Range box 70, appears at the top of the screen. This provides the opportunity to delete the current style, Default in the example, and replace it with the newly selected style. Normally, a user accepts the delete choice by pointing at the Yes button and clicking the mouse button. This causes both dialog boxes to clear from the screen. The style for the selected component then changes to the newly selected one. As shown in FIG. 17, in cell 73, the style was changed from Default to **Std_10.

In FIG. 16, while the Replace Range dialog box 70 is being displayed, the process of selecting a new style can be aborted by pointing to the No button 74 in that dialog box and clicking the left mouse button. If the Replace Range dialog box is not displayed, selecting a new style is cancelled by pointing at the Cancel button 75 at the bottom of the Add Range dialog box shown in FIG. 15.

A style is a set of build parameters that defines how a range of layers is to be built. Frequently used styles may be kept in style files on disk. Part Manager allows all the parameters in a style file to be associated with each layer of a range of layers to control how each layer of the range will be built. If necessary, a range style can be edited and selected parameters changed as described below. After a style has been edited and, therefore, contains parameters that are different from those in the style file from which it was derived, the style name used on the spreadsheet can be changed to avoid the possible confusion of having two different styles with the same name, one stored on disk, and one displayed on the spreadsheet. If the modified style parameters are likely to be used for other components, the set of parameters can be written to a new style file.

The style to be edited is selected by pointing at the style name o the spreadsheet and clicking the left mouse button. In FIG. 17, to edit **Std_10, the mouse is pointed at cell 73 to select this style. A pop-up menu similar to 63 in FIG. 14 then appears. When the pop-up menu appears, a user may point to Edit and click the mouse button to superimpose the editing dialog box, 76 in FIG. 18, on the spreadsheet.

Each field in the style editing dialog box represents a build parameter.

The purpose of each field and its associated build parameter in the editing dialog box is described in the following paragraphs.

Style: The style field 77 contains the name of the current style. If changes are to be made to the current style, this name is usually not changed. However, if a new style is to be created and the current one retained, the style name must be changed to a name that does not already exist in the current style directory.

To change the style name, a user points to the box that contains the current style name, box 77 in the Figure, and clicks the left mouse button. An editing cursor appears at the right of the file name. By typing the first character of the new name, the old name is erased from the screen and the new first character is displayed. Subsequent characters appear on the screen as they are typed. The Backspace key can be used to delete any characters typed in error. A user terminates typing the new name by pressing the Enter key. The editing cursor then moves to the recoat style name 78.

Figure 18:
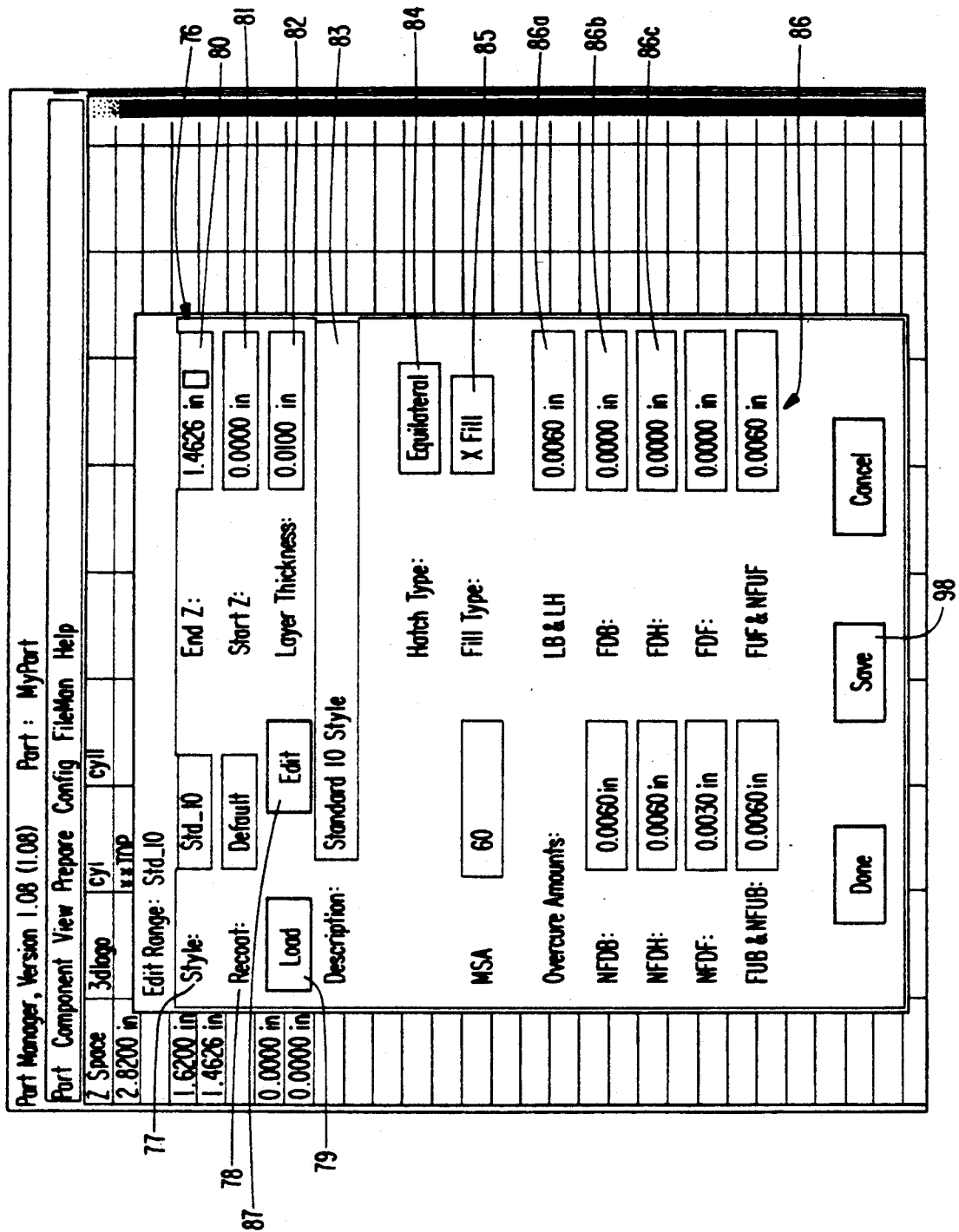

Recoat: A recoat style is associated with every style file (and therefore with every style on a spreadsheet). The editing dialog box initially shows the name of a recoat style associated with the current style. In FIG. 18, dialog box 76 shows a Default recoating style associated with the Std_10 style. If the recoat style is to remain unchanged, nothing needs to be done with the recoat field.

If a different recoat style is to be used, and that recoat file already exists, a user points to the Load button 79 under the Recoat field and clicks the mouse button. A dialog box appears showing the names of available recoat styles, which is analogous to box 68 in FIG. 15. A user points to the name of the recoat style o be used and Clicks the mouse button. After confirming that the correct recoat style has been chosen by checking the recoat style name in the field under the list of recoat styles, a user then points to Done and clicks the mouse button.

A new recoat style can be created by editing an existing one. This is explained subsequently.

End Z: The value initially shown in the End Z field 80 is that of the top of the current range. This value may be changed by pointing to the value, clicking the mouse button, and typing the new value.

Start Z: The value initially shown in the Start Z field 81 is that of the bottom of the current range. The value may be changed in the same manner as the End Z value 80, described earlier.

Layer Thickness: The value initially shown in the Layer Thickness field 82 is that of the current layer thickness. The value may be changed in the same manner as the end value 80. Layer thicknesses are normally in the range from 0.005 to 0.020 inches (0.13 to 0.51 millimeters).

Description: The text in the Description field 83 is a short description of the style. Any description provided for in the current style is initially shown. The description may be edited to suit the new style. There is space for up to 53 characters.

MSA: This field initially shows the current minimum surface angle. The value may be changed in the same manner as the end value 80. The acceptable MSA value depends on the layer thickness and beam width. Typical MSA values are:

| Layer Thickness | MSA |
| --- | --- |
| 0.020 inches | 60 |
| 0.010 inches | 50 |
| 0.050 inches | 43 |

Hatch Type: The hatch type defined by the current style is initially displayed in the hatch type field 84. To change the hatch type, a user points to the word that defines the current hatch type, and then presses and holds down the left mouse button. The user next drags down and then releases the mouse button when the desired hatch type is highlighted. Available hatch types are Equilateral, Box, Diagonal, and Custom. The first three of these hatch types are predefined and require no further input. The Equilateral hatch type is defined to be where the hatch lines trace onto equilateral triangles on the surface, the Box hatch type where they trace onto boxes, and the Diagonal type, where they trace out diagonal lines. These hatch types are described in more detail in U.S. patent application Ser. No. 331,644, referenced earlier. When a Custom hatch type is selected, a dialog box appears to allow entry of hatch spacing and angles.

Fill Type: The fill type defined by the current style is initially displayed in the fill field type 85. To change the fill type, a user points to the word that defines the current fill type, and then presses and holds down the left mouse button. The user then drags down and releases the mouse button when the desired fill type is displayed. Available fill types are X Fill, Y Fill, and X & Y Fill. They are described in more detail in U.S. patent application Ser. No. 331,644, referenced earlier. After one of these is selected, a dialog box appears to allow entry of fill spacing.

Overcure Amounts: Nine fields 86 show the overcure values defined in the current style. An overcure value can be defined for each vector type. Successive fields are indicated as 86a, 86b, 86c, etc. Any or all of these overcure values may be changed in the same manner as the End Z value above. The overcure fields are:

LB & LH—Layer border and layer hatch
NFDB—Near-flat downward-facing border
NFDH—Near-flat downward-facing hatch
NFDF—Near-flat downward-facing fill
FUB & NFUB—Flat upward-facing border and near-flat upward facing border
FDB—Flat downward-facing border
FDH—Flat downward-facing hatch
FDF—Flat downward-facing fill
FUF & NFUF—Flat upward-facing fill and near-flat upward-facing fill The format of a sample style file is shown below:

---
Sample Style File
---
Name = "Default"
Version = 1.1
startZ = 3.86243
endZ = 5.325
layerThick = 0.02
Notes = "Default Style"
XHatchType = "Equilateral"
NumHatch = 3
HatchAngles = (60, 120, 0, 90)
HatchSpaces = (0.05, 0.05, 0.05, 0.05)
FillType = "FillX"
NumFill = 1
FillAngles = (0, 90, 0, 0)
FillSpaces = (0.003, 0.003, 0.003, 0.003)
MSA = 60
ocLB_LH = 0.006
ocNFDB = 0.006
ocNFDH = 0.006
ocNFDF = 0.003
ocFDB = 0
ocFDH = 0
ocFDF = 0
ocFUB_NFUB = 0.006
ocFUF_NFUF = 0.006
Units = "in"
RecoatStyle = "Default"
---

Each of the fields are self-explanatory and corresponds to one of the fields discussed above, with certain exceptions which are discussed here. The Notes field corresponds to the Description field, the Units field indicates the units of the numerical values (inches) in the file, NumHatch indicates that 3 hatch lines are required to form the Equilateral hatch type, Hatchangles indicates that these lines are placed at 60, 120, and 0 degrees, respectively, to the horizontal, and Hatchspaces indicates these lines are spaced at 0.05 inches. The NumFill field indicates that one fill line is used to generate fill, FillAngles indicates this is positioned at an angle of 0 degrees, and FillSpaces indicates the lines are to be spaced by 0.003 in.

Recoat Styles: As previously mentioned, a recoat style file is associated with every style file. The recoat style file defines parameters that control the recoat process that occurs before each layer of a part is built.

When editing a style, it is possible to retain the existing recoat style displayed in the style file, choose another existing recoat style, or create a new recoat style by editing an existing one. The first two possibilities have already been explained. The following paragraphs deal with editing a recoat style.

Figure 19:
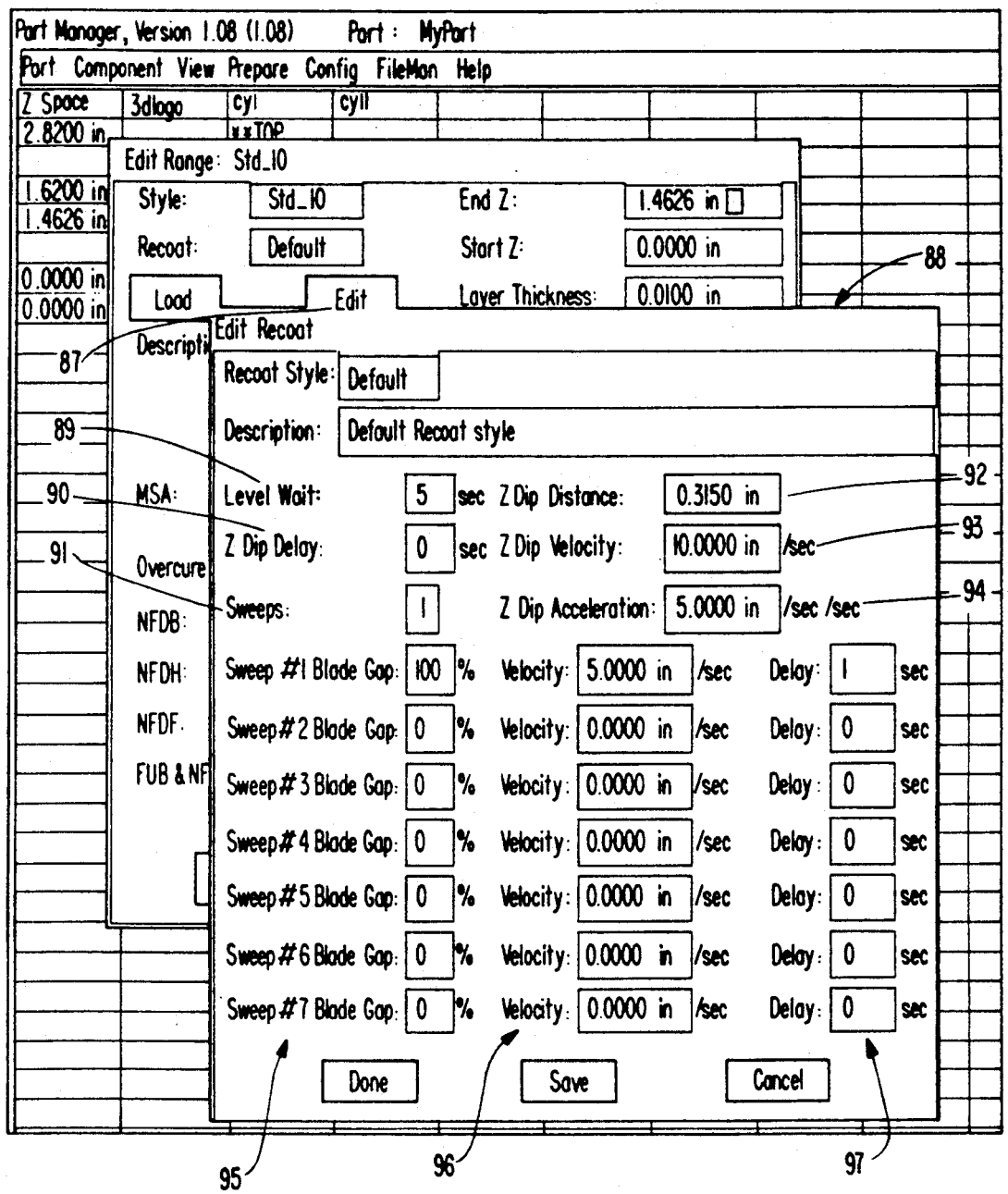

To begin editing a recoat style, a user points to the Edit button 87 on the style editing dialog box and clicks the left mouse button. A recoat style editing dialog box 88 is superimposed over the previous dialog box, as shown in FIG. 19.

Each field in box 88 is associated with a recoating parameter. The purpose of each field is described in the following paragraphs.

Level Wait: The value initially shown in the field 89 is the wait time in seconds (since the last layer was built) allowed for the surface of the liquid resin in the vat to reach the correct level before the recoating process begins. This value can be changed in the same manner as the values in the style dialog box.

Z Dip Delay: The value initially shown in the field 90 is the time in seconds allowed for the surface of the liquid resin to stabilize after the last sweep of the recoater blade but before the laser begins to create the next layer. This value can be changed in the same manner as the values in the style dialog box.

Sweeps: The value initially shown in the field 91 represents the number of blade sweeps that will occur for each layer. This value can be changed in the same manner as the values in the style dialog box. This value can range from 0 (no sweeps) through 7.

Z Dip Distance: The value initially shown in the field 92 is the distance below the surface of the liquid resin that the part is dipped by the elevator to cause fresh resin to flow rapidly over the previous layer. This value is stated in the dimensions defined in the associated style file, and can be changed in the same manner as the values in the style dialog box.

Z Dip Velocity: The value initially shown in the field 93 is the velocity at which the elevator moves the part during the recoating process. This value is stated in the dimensions defined in the associated style file, and can be changed in the same manner as the values in the style dialog box.

Z Dip Acceleration: The value initially shown in the field 94 is the acceleration of the elevator when it changes velocity during the recoating process. This value is stated in the dimensions defined in the associated style file, and can be changed in the same manner as the values in the style dialog box.

Blade Gap, Velocity, and Delay: A recoat style can define up to seven sweeps, each with a separately defined blade gap, velocity, and delay. A field is provided for each of these parameters for each sweep. The fields for the blade gaps, velocities, and delays are identified by reference numerals 95, 96, and 97, respectively. The blade gap is the distance between the bottom of the blade and the previous layer, the blade velocity is self-explanatory, and the delay is the delay after a sweep before the next sweep, if any. Values shown initially are the sweep parameters of the current recoat style. As discussed earlier, any of these parameters may be changed in the same manner as values in the style dialog box.

A sample recoat style is illustrated below:

| Sample Recoat Style File |
| --- |
| Name = "Default" |
| Version = 1 |
| Notes = "Default Recoat Style" |
| ZDip = 0.75 |
| ZDipVel = 1 |
| ZDipAccel = 1 |
| levelWait = 15 |
| numSweeps = 1 |
| bladeGap1 = 100 |
| bladeVel1 = 3 |
| sweepDelay1 = 0 |
| travelVel1 = 4 |

The fields in this file are self-explanatory, and match the fields discussed above, with certain exceptions, noted as follows. The Notes field corresponds to the Description field above, and the travelVel1 field is the velocity of the blade in the areas of the vat before the part being built is encountered. When the part being built is encountered, the bladeVel1 field defines the blade velocity. Recoating is discussed in more detail in U.S. patent application Ser. Nos. 265,039 and 249,399, and in International PCT patent application Ser. No. PCT/US89/04096 referenced earlier.

Saving Style Parameters

To write a new style to a file, a user points to the Save button (98 in FIG. 18) on the style editing dialog box and clicks the mouse button. The file is saved with the name currently displayed. If a file with that name already exists in the current directory, a dialog box appears, giving the user the opportunity of overwriting the existing file or cancelling. After cancelling, the user can choose another file name to avoid destroying the existing file.

When a component is first added into a spreadsheet, it has one range of layers which extends from the bottom to the top layer of the component. Turning to FIG. 12, for example, when the component 3dlogo was added to the spreadsheet, only one range, from 0.000 in. to 1.4626 in., was created. In many cases, though, it is desirable to divide the layers of the component into many ranges, so that each range can be associated with a different style (and recoating style) optimized to suit that section of the component.

Figure 20:
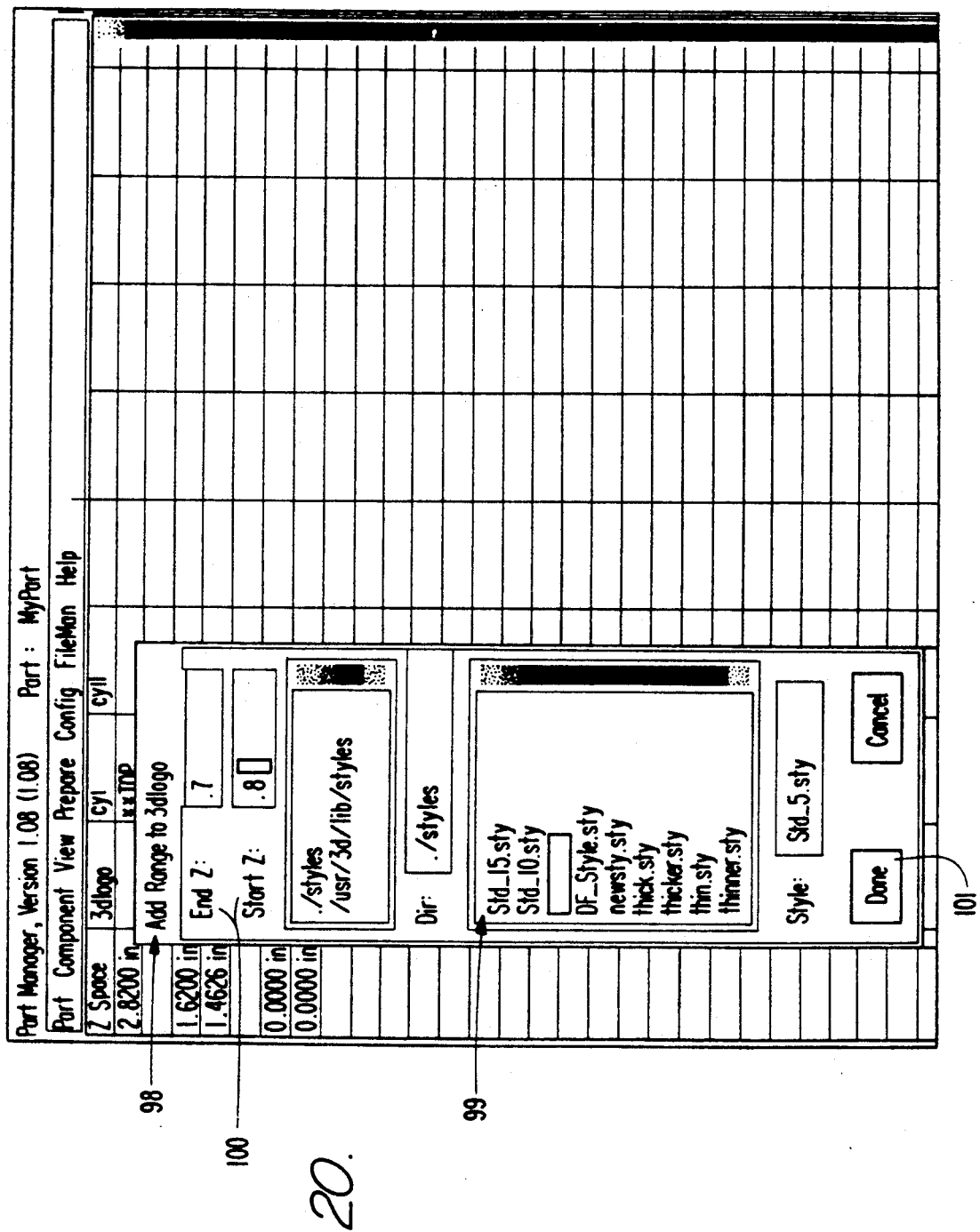

To introduce a new range into a component, a user points into the column that represents that component and clicks the left mouse button. The range pop-up menu, 63 in FIG. 14, appears. The user may then point to Add, click the mouse button, and the Add Range dialog box appears. In FIG. 20, the Add Range dialog box is identified with reference numeral 98.

In this dialog box, a user may point to the name of the style to be used for the new range in a list 99 of available styles, and then click the mouse button. In the example, the name of the style of the new range then becomes Std__10. Also, in this dialog box, a user may change the End Z and Start Z fields 100 to correspond to the ending and starting positions of the new range. In this example, the new range starts at 0.7000 inches and ends at 0.8000 inches.

Figure 21:
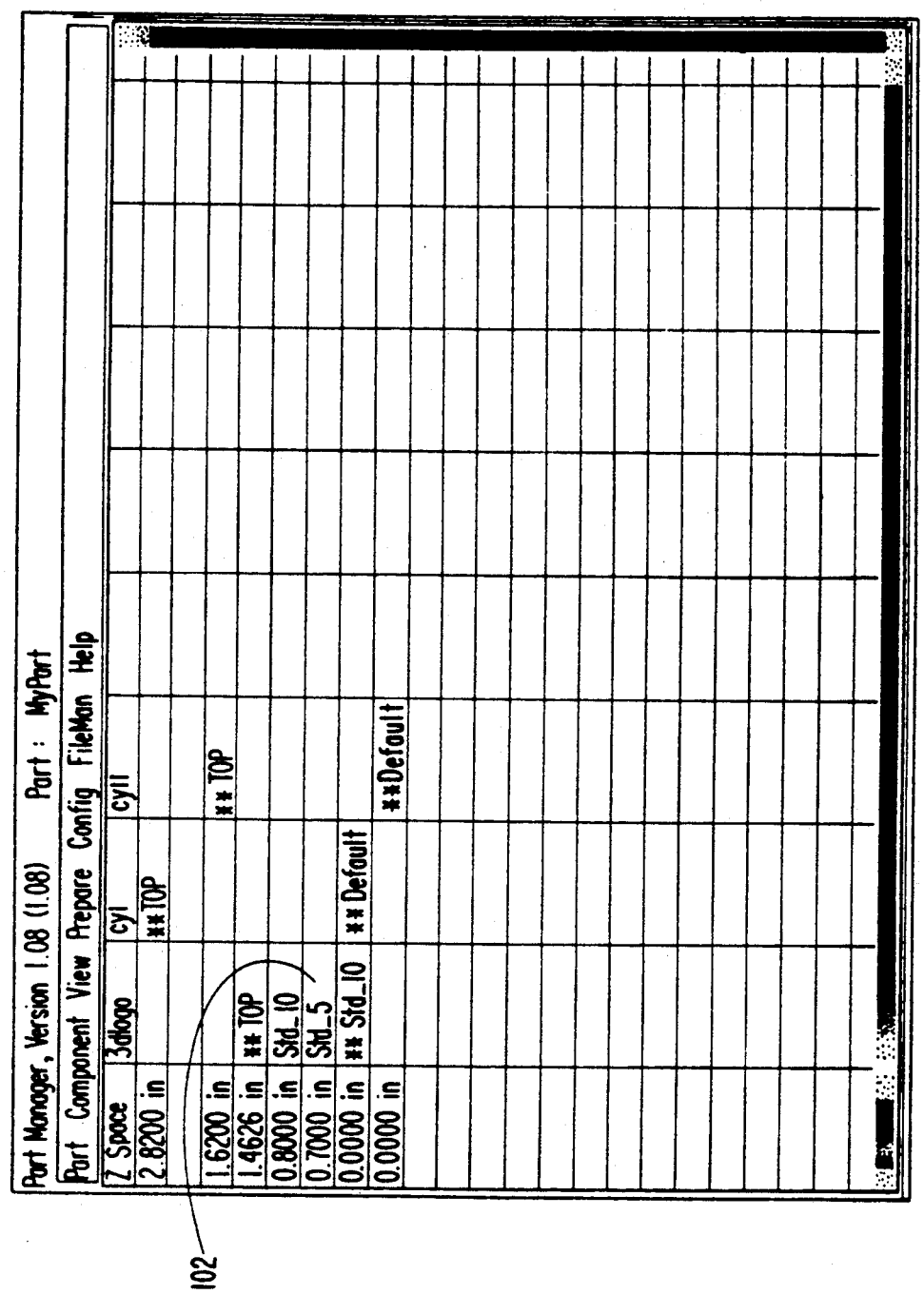

With these changes made to the dialog box, the user may point to the Done button 101 and click the mouse button. The dialog box disappears and the spreadsheet shows the added range. In the example, before adding the new range, the entire 3dlogo component, starting at 0.0000 inches and ending at 1.4626 inches, used the style Std__10. After adding the new range, the Std__10 style is replaced by the Std__5 style covering the range of layers from 0.7000 to 0.8000 inches. In FIG. 21, the style in cell 102, previously Std__10, has been changed to Std__5 to reflect the change.

Although only one range has been added in this example, in practice, as many additional ranges as needed can be added. Each new range allows the previously defined style in that range to be replaced.

Additional Functions

When a user first begins executing Part Manager, a dialog box provides the opportunity to create a new part, open an existing part, or request help. This is illustrated in FIG. 10.

To open an existing part so that its structure can be seen, and perhaps modified, on a spreadsheet, the user points to the Open button 54 and clicks the left mouse button. The workstation responds by displaying a dialog box which lists existing part files, i.e., those with names having a .prt extension. FIG. 9 shows such a dialog box.

Figure 22:
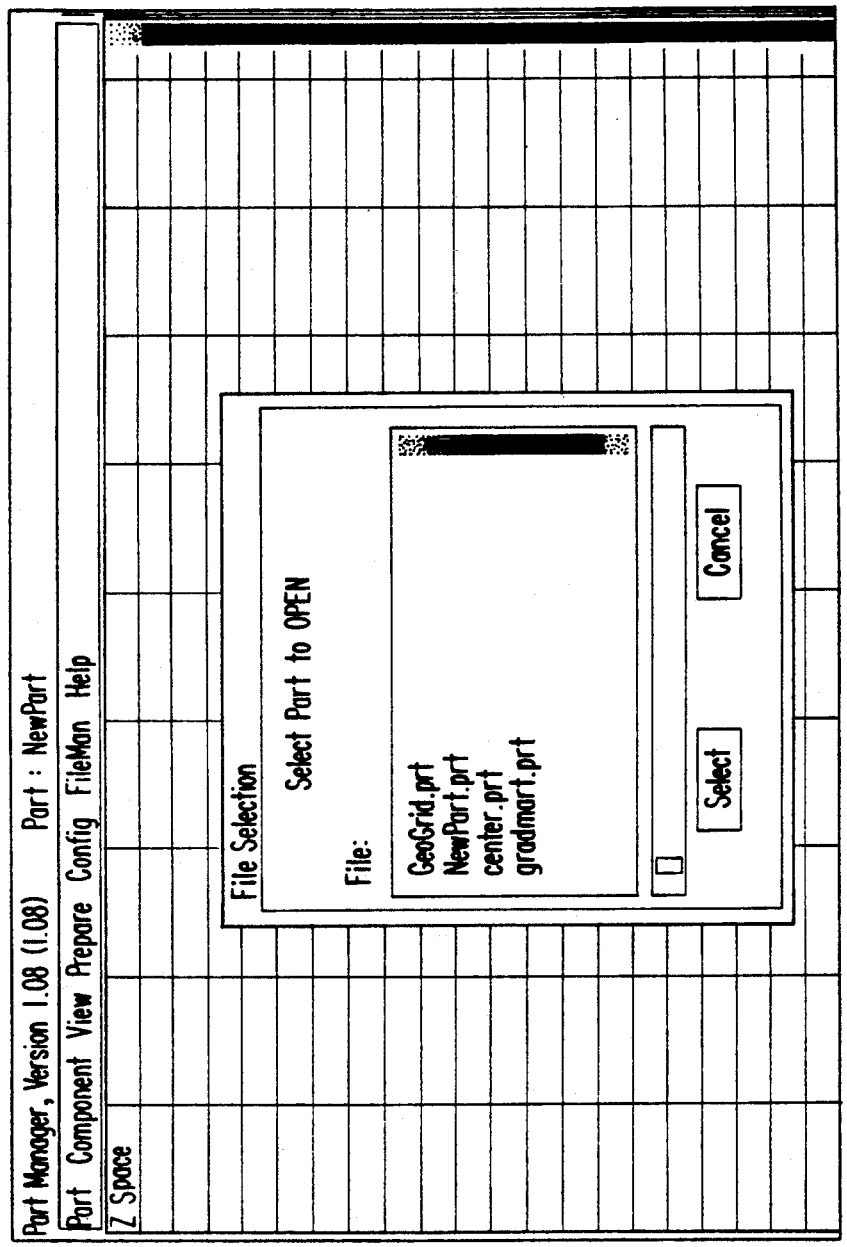

The dialog box is similar to the one that shows component file names, which is illustrated in FIG. 11. FIG. 22 shows a dialog box illustrating part file names. The same methods as described earlier for component files are used to see more part file names than can be displayed at one time, to select a part, or to cancel without selecting a part. One difference, however, is that whereas multiple components can be selected, only one part can be selected at a time.

Figure 23:
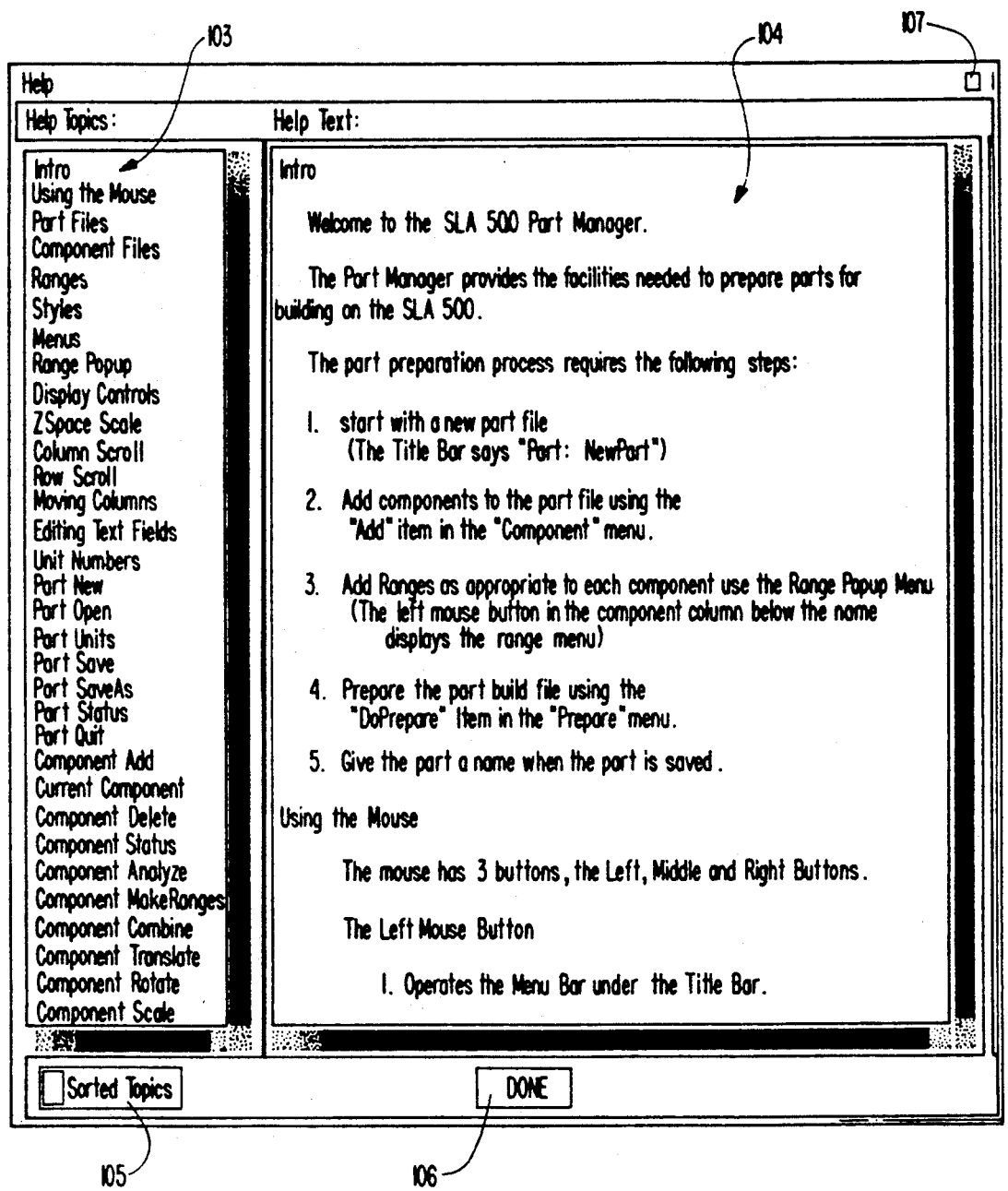

Additional functions are possible by selecting an item from the menu displayed at the top of the screen (identified with numeral 46 in FIG. 8). A key function is the Help function. Help is accessed from the main screen by pointing to the word Help at the right end of the menu bar and clicking the left mouse button. In some cases, it is possible to access Help from a dialog box. In this case, it is accessed from the dialog box by pointing to the Help button and clicking the left mouse button. When this occurs, a Help screen is displayed. FIG. 23 illustrates the Help screen.

The Help screen, which is superimposed on the already existing screen, consists of a list 103 of topics on the left and information 104 about those topics on the right. The information is arranged in the order a typical user might want to find it. A quick way to see information on a particular topic is to point to the topic in the index on the left, and then click the left mouse button.

Initially, the list of topics on the left is arranged in the same order as the more detailed information on the right. The list on the left can be converted to alphabetical order by pointing to the Sorted Topics box 105 at the bottom left of the screen and clicking the mouse button.

There are two ways to remove the Help screen and return to the previous display. One way is to point to the Done button 106 at the bottom of the Help screen and click the left mouse button, and the other way is to point to the window-close box 107 in the top right corner of the Help screen and click the right mouse button.

Managing Component Files

Turning back to FIG. 10, assuming a user has opted to open a new part file (by pressing the New button), the new part is created by adding components onto a spreadsheet. If the user has decided instead to modify an existing part file (by pressing the Open button), the existing part can be modified by adding, deleting, or changing components on a spreadsheet. The Component menu provides access to these functions.

Figure 24:
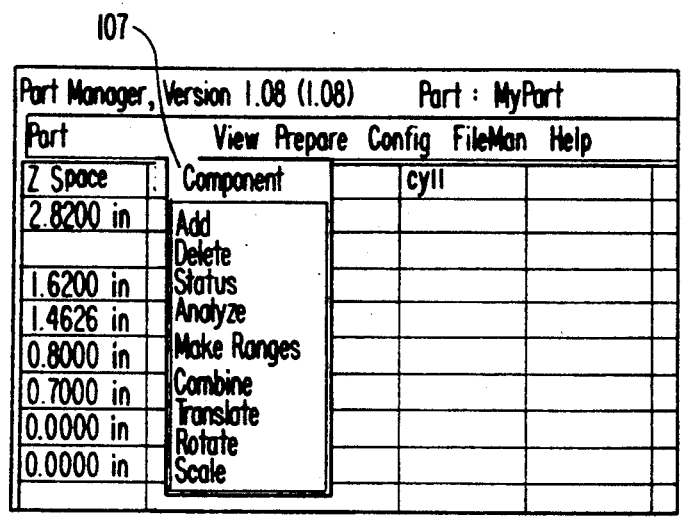

To access the Component menu, the user points to the word Component in the menu bar across the top of the spreadsheet (the top menu bar is item 47 in FIG. 8), presses the left mouse button and holds it down until the Component menu appears. The Component menu 107 is illustrated in FIG. 24. To select one of the functions on the menu, the user pulls down on the mouse until the desired menu item is highlighted, and then releases the mouse button to access that item.

The following paragraphs describe each of the Component menu items separately.

Add: Selecting Add from the menu superimposes the Component Add dialog box over the spreadsheet as illustrated in FIGS. 11 and 12. This dialog box is used to add components to a part as described earlier.

Delete: To delete a component from a part, a user points to the column of the spreadsheet that corresponds to that component and clicks the left mouse button. Then the user pulls down the Component menu until Delete is highlighted. A dialog box then appears with two buttons. The user points to the Delete button and clicks the mouse button to delete the component. Alternatively, the user may point to the Cancel button and click the mouse button to escape without deleting a component.

Figure 25:
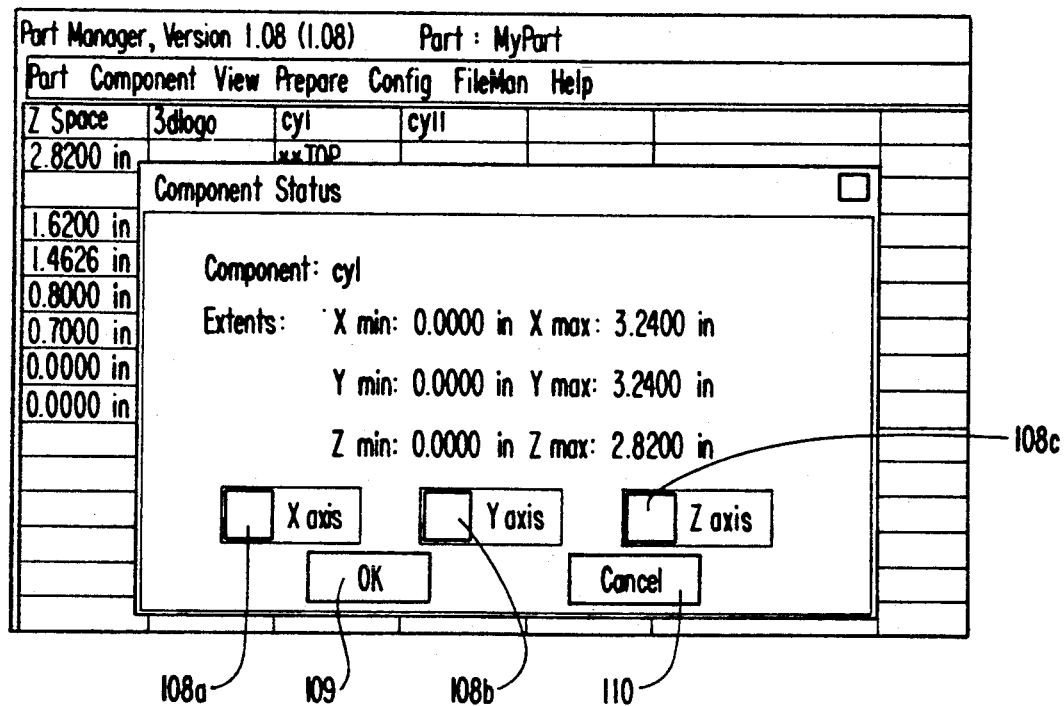

Status: The status of a component may be displayed by clicking on the spreadsheet column that represents the part, then accessing Status on the Component menu. The status of the component is then displayed as illustrated in FIG. 25. As illustrated, the displayed status shows the extents of the part in the X, Y, and Z directions.

When the status is first displayed, one of the three Slice-axis buttons, 108a, 108b, and 108c, is illuminated to show the currently selected slice axis. The currently selected slice axis is the axis along which the part will be sliced into layers. The slice axis can be changed by pointing to the appropriate button and clicking the mouse button.

If the slice axis is changed, the change may be accepted by pointing to the OK button 109 and clicking the mouse button. Alternatively, to revert to the status before any changes were made, a user may click on the Cancel button 110.

Combine: The component files produced by some CAD systems do not individually represent components with closed surfaces. However, a requirement imposed by Part Manager is that the component files should represent portions of parts having closed surfaces. To achieve this, sometimes the component files may have to be combined in order to obtain a combined component with a closed surface. If imported CAD files do represent components with closed surfaces, it is not necessary to combine files.

Figure 26:
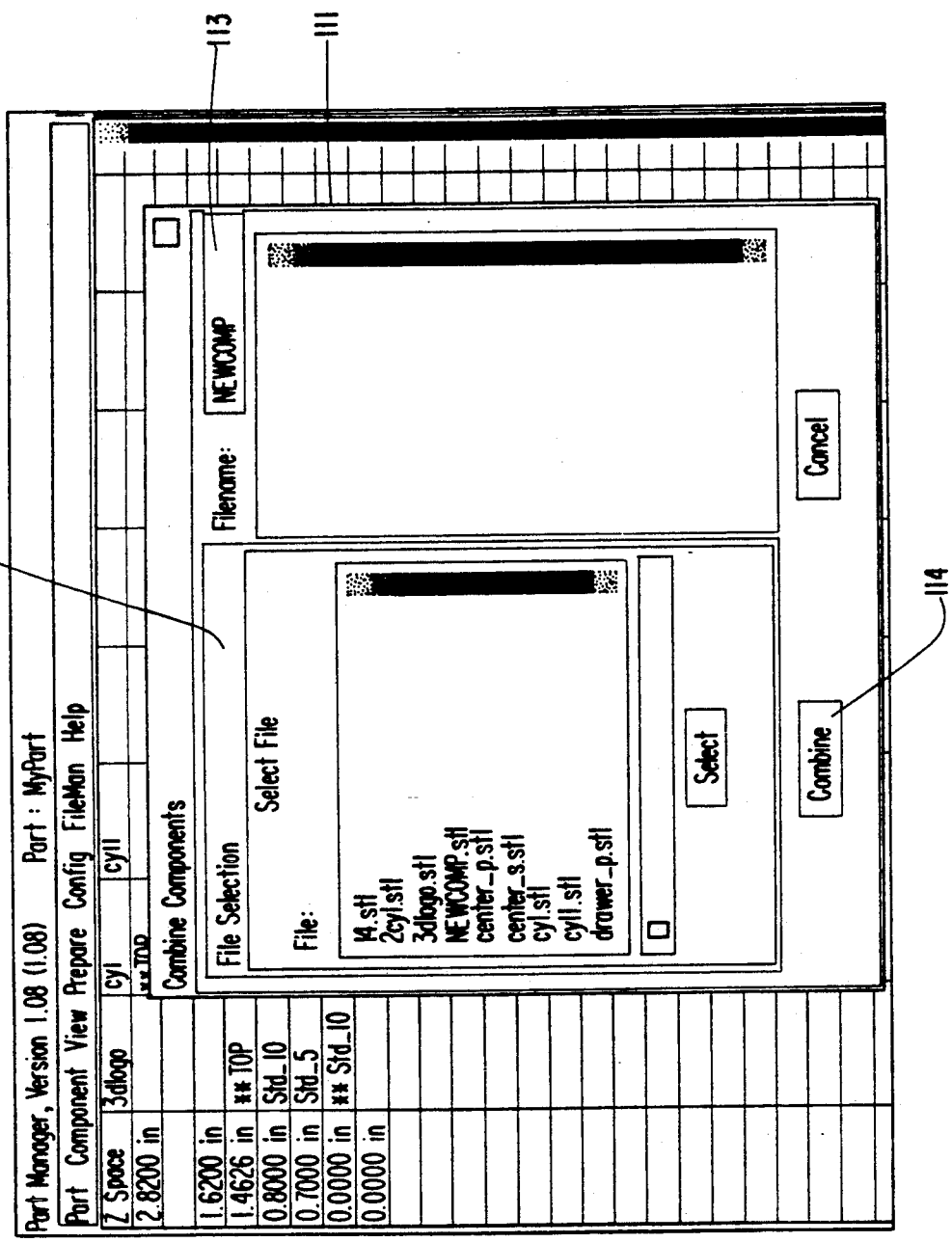

If it is necessary to combine files, a user selects Combine from the Component menu. At this point, as shown in FIG. 26, Combine Components dialog box 111 appears, Which is overlayed by Select File window 112. Next, the user selects the files to be combined from the Select File window 112. After all the files have been selected, the user chooses a name for the combined file, and edits the name in the filename field 113 so that the selected name appears. Finally, the user clicks on the Combine button 114 in order to combine the files.

Translate: Translation is the operation of moving components from one place to another in the vat. Translation is sometimes necessary to orient the part properly in order to eliminate trapped volumes of liquid resin, to place flat surfaces onto horizontal XY planes, to reduce the number of unsupported surfaces, etc. Individual components can be moved or all the components of a part can be moved together. The component or components can be moved by specified distances in the X, Y and Z directions. Alternatively, they can be moved to the center of the vat or to the origin point if the origin is different from the center.

Figure 27:
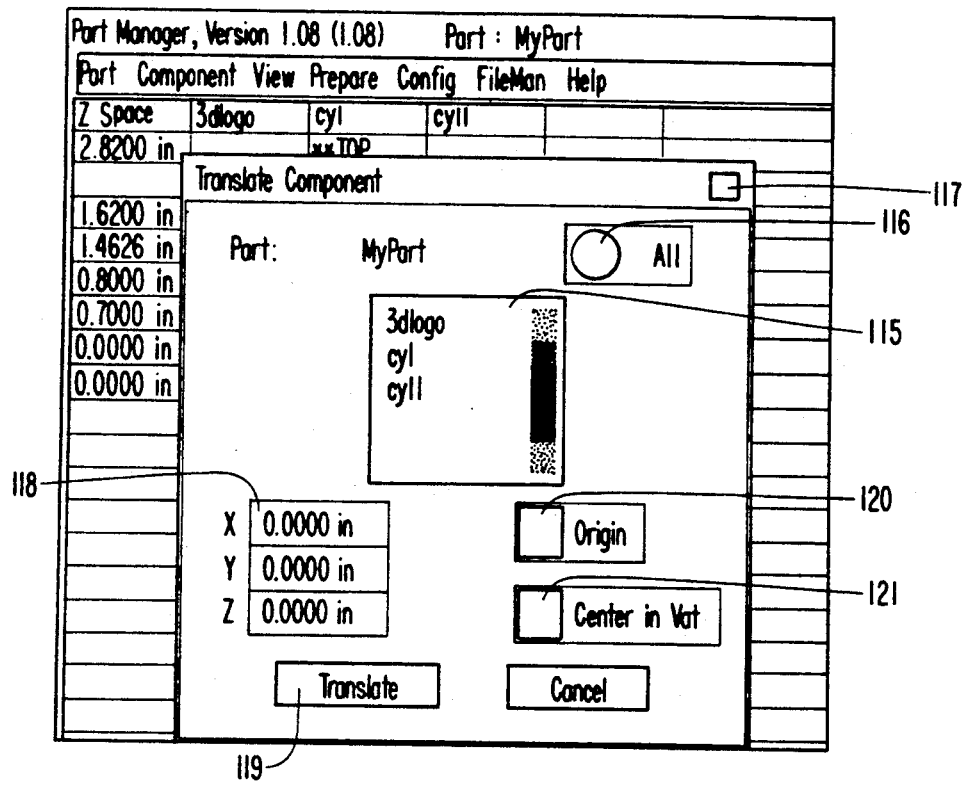

To move components, a user selects Translate from the Component menu. The Translate Component dialog box then appears on the screen as illustrated in FIG. 27. The panel 115 in the center of the dialog box shows the names of the components on the current spreadsheet.

The All button 116 at the top right provides the ability to choose between moving an individual component or moving all the components of a part together. Initially, the center of the button is green and the word Part, followed by the current part name, is at the top left of the dialog box. This indicates that the entire part, consisting of all the components on the current spreadsheet, is selected.

To select an individual component to be moved, a user points to the button 117 at the top right of the dialog box and clicks the mouse. The center of the button changes to red and the word Component appears at the top left of the dialog box. To select an individual component, the user points to the component name in the center panel 115 and clicks the left mouse button. The selected component name changes from black to red, and the component name appears at the top center of the dialog box.

To move a component or part a specific distance in the X direction, the user points to the field to the right of X in the bottom left half 118 of the dialog box, and then clicks the left mouse button until an editing cursor appears to the right of the current value. The user then types new digits representing the distance to move. Positive numbers represent movement to the right, negative numbers represent movement to the left.

For movement in the Y and Z directions, the user changes the value in the Y and Z fields as required. When the correct numbers are displayed, the user clicks on the Translate button 119 at the bottom of the spreadsheet and the desired movement then occurs.

If desired, the movement can be confirmed by using the Status function, which has been described previously, to show the new position of a component or part.

Instead of specifying specific distances for the component or part to move, it is possible to click on the Origin button 120 to move the component or part to the origin of the axes, or to click on the Center In Vat button 121 to move the component or part to the center of the vat.

Rotate: The Rotate function is similar to the Translate function. Whereas the latter moves a part or component linearly, the former rotates a part or component around the X, Y, or Z axis.

Figure 28:
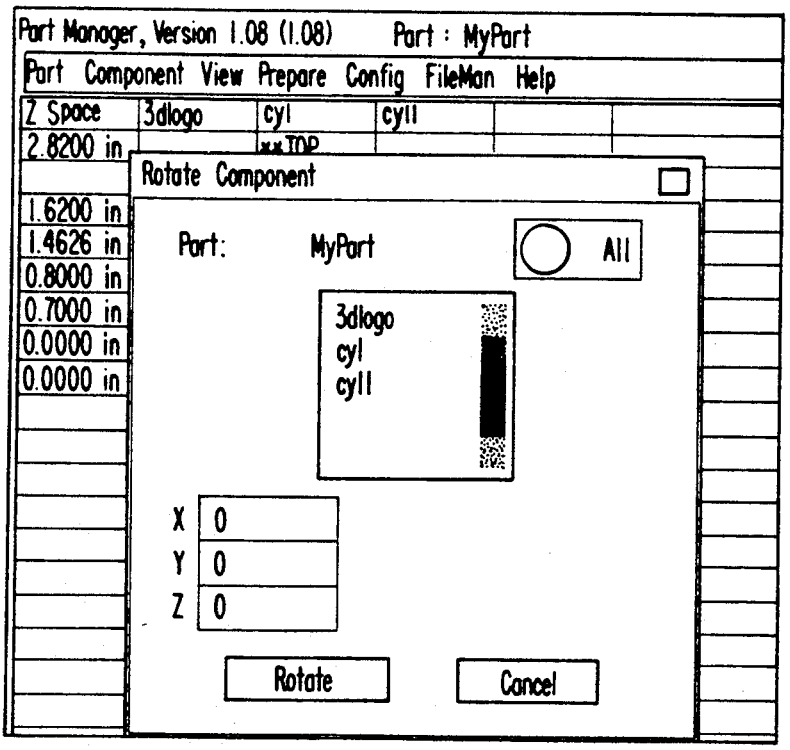

The Rotate dialog box (FIG. 28) is similar to the Translate dialog box, except that rotation values in the X, Y or Z dimensions are specified in degrees, instead of a unit such as inches for specifying linear distances.

Scale: The Scale function is similar to the Translate and Rotate functions. Using Scale, it is possible to select a component of a part and then scale (magnify or reduce) it either uniformly in all dimensions, or with separately specified factors in the X, Y, and Z dimensions.

Figure 29:
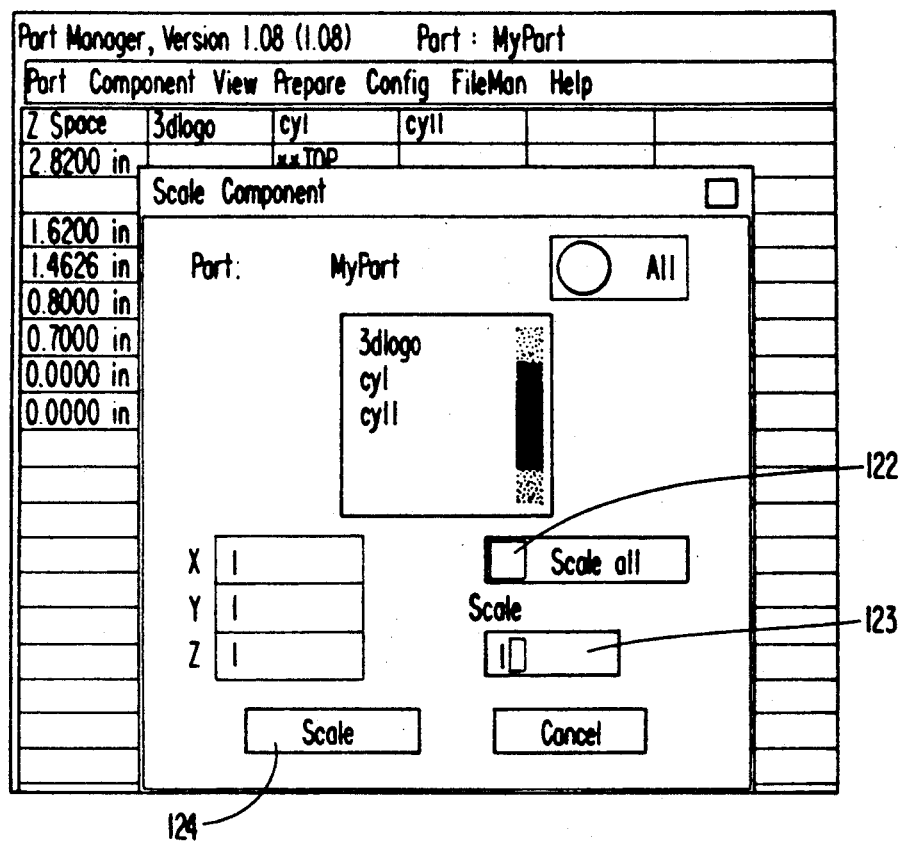

The top part of the Scale dialog box (FIG. 29) is similar to the top parts of the Translate and Rotate dialog boxes.

A button 122 labeled Scale All in the lower half of the Scale dialog box is initially set to scale the component or part equally in all directions. The field 123 below the button contains the initial scale value of 1 with an editing cursor to its right. To change the scale factor, a user replaces the 1 with the required value.

To be able to scale a component or part by different factors in the X, Y, and Z directions, the user clicks on the Scale All button. The editing cursor disappears from the field below the button, and appears in the X field. The cursor can be moved to the Y field or Z field by pointing at the field and clicking the mouse button. The user then selects the appropriate field or fields and changes the initial values to the required values.

When scaling is complete, the user clicks on the scale button at the bottom of the dialog box.

Scaling can be used to convert a right-handed CAD/CAM file to a left-handed file as required by Part Manager. To convert from a right-handed CAD/CAM file to a left-handed format, a user can scale by −1 in Z only.

Managing Part Files

Figure 30:
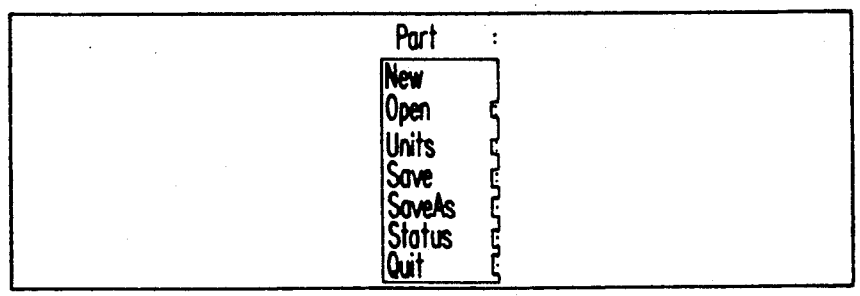

The Part item in the main menu at the top of the screen (FIG. 8) provides access to functions that deal with part files. These functions are accessed by pointing to Part and clicking the mouse button. At this point, the Part menu, illustrated in FIG. 30, is displayed. Each of the Part menu functions is explained in the paragraphs below.

New: The first item on the Part menu is New. When this item is selected, indicating that a new Part file is to be entered, an empty spreadsheet is displayed.

Open: The second item is Open. When this item is selected, indicating that an existing part file is to be opened, a dialog box opens showing a list of part files in the current directory (See FIG. 9). After a part file to be opened is selected, the spreadsheet shows the components of that part.

Units: The Units menu item allows specification of the units in which CAD/CAM data is defined and also the units in which Part Manager displays values. When this item is selected, a dialog box appears to allow the choice of in (inches), mil (thousandths of an inch), mm (millimeters), cm (centimeters), m (meters), or ft (feet) for both CAD/CAM and Part Manager units. This is important because a user may wish to use different units in Part Manager than those used on the CAD/CAM system.

Save: The Save menu item saves the current part in the current directory, using the current name.

Save As: The Save As menu item also saves the current part in the current directory, but provides an opportunity to use a file name other than the current one.

Figure 31:
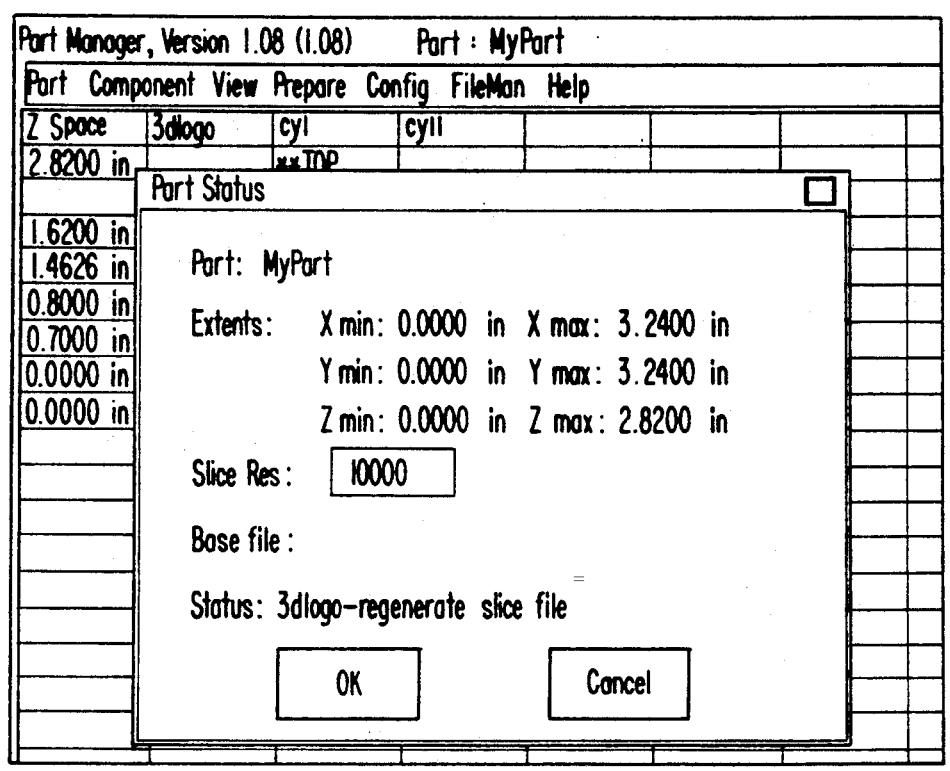

Status: The Status menu item (FIG. 31) shows the extent of the overall size of the part and other relevant information such as the readiness of the file for sending to the control computer for building the part. The part extents take account of the slice axis of the components.

Quit: The quit menu item is used to leave the Part Manager program. If any files have been modified but not saved, the user is given the opportunity to save modified files or abandon them.

The format of a part file can be summarized as follows:

1. Part file version number
2. part data
   part extents
   units
   build parameters
   base parameters
   last spread sheet display position and scale
3. base style data
4. base recoat style data
5. multiple copy offsets
6. number of components
7. for each component
   a. component data
      stl file name
      description
      extents
      slice axis
   b. number of styles
   c. for each style
      sli style data
      recoat style data A sample part file, according to the above format, is as follows:

```
Part cyl, partfile Version 1.090
Description:
Extents:
   X:    0.0000,    3.2400
   Y:    0.0000,    3.2400
   Z:    1.0000,    3.8200
Slice Resolution = 8000.000000
CAD data units ar 'in'
Build Parameters:
   X Scale = 1.000000, Y Scale = 1.000000, Z Scale = 1.000000
   Overcure factor = 1.000000
   Speed factor = 0.500000
   Num copies = 0, minDist = 0.500000
   Beam Comp  0
Component cyl
Extents:
   X:    0.0000,    3.2400
   Y:    0.0000,    3.2400
   Z:    1.0000,    3.8200
sliceAxis = Z axis
Style: Default, 1.000 to 3.820, 1Thick = 0.020
   Desc:  Default Style
     hatchType = 0, numHatch = 3
     0: hAngle =  60.00, hSpace = 0.05,
     1: hAngle = 120.00, hSpace = 0.05,
     2: hAngle =   0.00, hSpace = 0.05,
   fillType = 0, numFill = 1
     0: fAngle = 80.00, fSpace = 0.00,
     1: fAngle = 90.00, fSpace = 0.00,
     2: fAngle =  0.00, fSpace = 0.00,
   Overcures:
     ocLB_LH = 0.0060
     ocNFDB = 0.0060
     ocNFDH = 0.0060
     ocNFDF = 0.0030
     ocFDB = 0.0000
     ocFDH = 0.0000
     ocFDF = 0.0000
     ocFUB_NFUB = 0.0060
     ocFUF_NFUF = 0.0060
Recoat Style: Default
   Desc: Default Recoat style
     zDip = 0.750, zDipVel = 1.000, zDipAccel = 1.000,
     Post Dip Delay = 0.00
     numSweeps = 1
     #0 = { bladeGap = 100.00, velocity = 3.00, delay = 0.00 }
     z Level Wait = 15.00
```

Most of the above fields have already been discussed, or self-explanatory. An exception is Slice Resolution which indicates the units in which the .sli files for the components are expressed. In the example above, 8000 slice units=1 in.

Preparing Parts For Building

Figure 32:
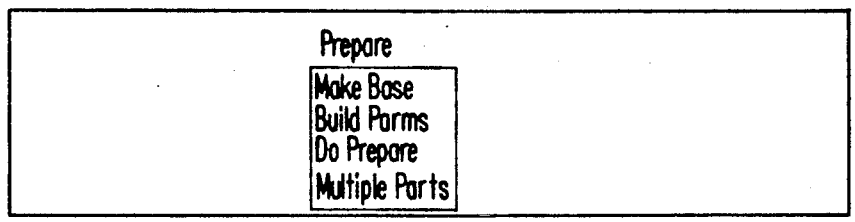
Figure 33:
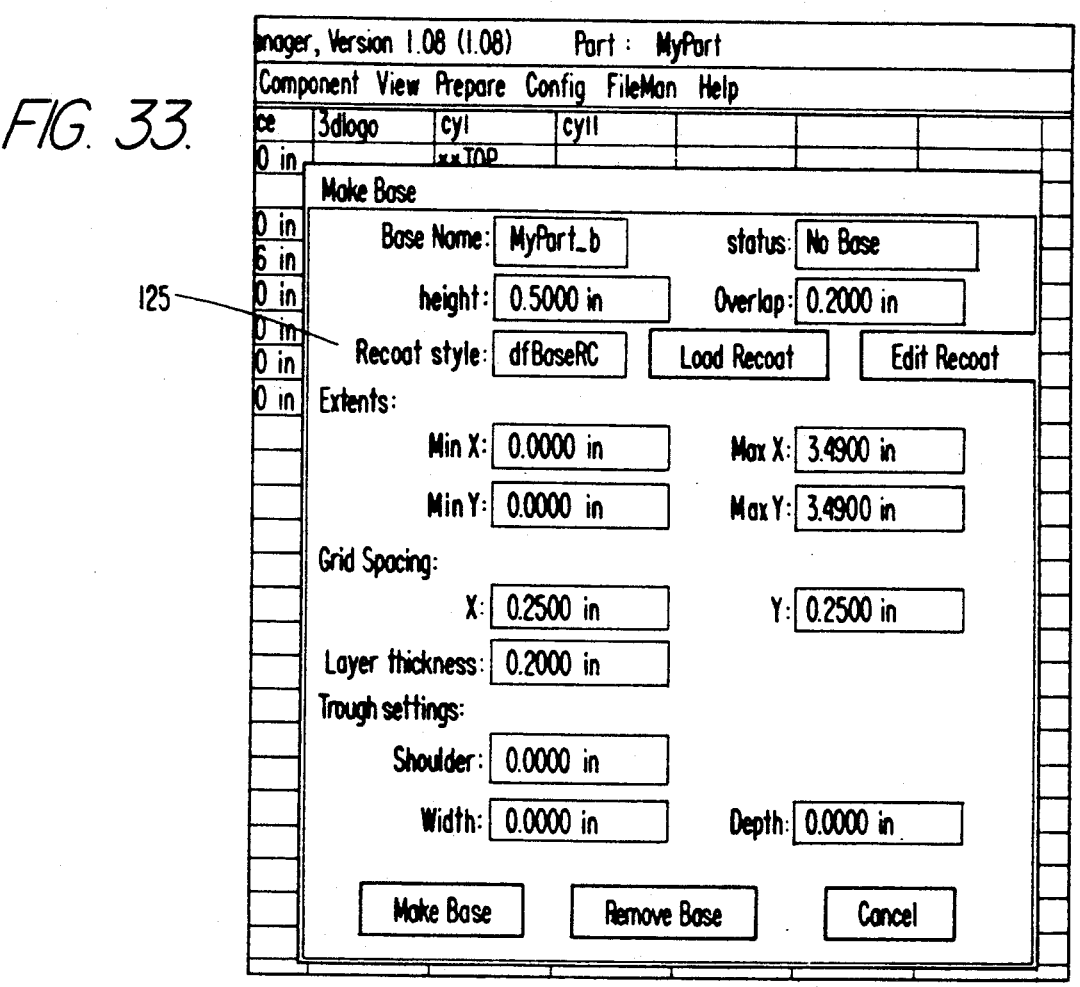

The Prepare item on the menu bar (FIG. 8) at the top of the screen can be selected in order to further prepare a part file for part building. When the Prepare item is selected, the Prepare menu (see FIG. 32) is displayed, which lists the functions which must be performed to prepare the part. Each of these functions is discussed in the following paragraphs:

Make Base: The Make Base menu item displays the dialog box illustrated in FIG. 33. This item allows the user to generate a base for the part to be built. A base is not to be confused with part supports. A base is provided below the main portion of a part to space it from the platform and to allow the part to be removed from the platform easily after building. Supports, on the other hand, are selectively added to those portions of the part susceptible to curl and other distortions. For a coffee cup, for example, a support might be necessary to fix the handle of the cup as it is being built until it can be adhered to the main body of the cup. A base will space the main body of the cup from the platform.

The dialog box displays a number of files, each having default parameters which can be left as is, or changed by the user.

A recoat style must be associated with the base, just as it is with the rest of the part. The default recoat style associated with the base is displayed in field 125. If a recoat style other than the default style is required, it can be loaded from a file if the style already exists, or an existing recoat style can be edited. The descriptions above regarding the editing of style files and recoat style files, applies to loading and editing base recoat style files. Other fields which are displayed, and which can be edited, include the height of the base, the extent of overlap with the part, the extents of the base, the grid spacing for the base in the X and Y directions, the base layer thickness, and the trough settings. After any of these fields are edited, to accept the displayed parameters, the user points and clicks on the Make Base button. To remove a previously accepted base, the user points to and clicks on the Remove Base button.

Figure 34:
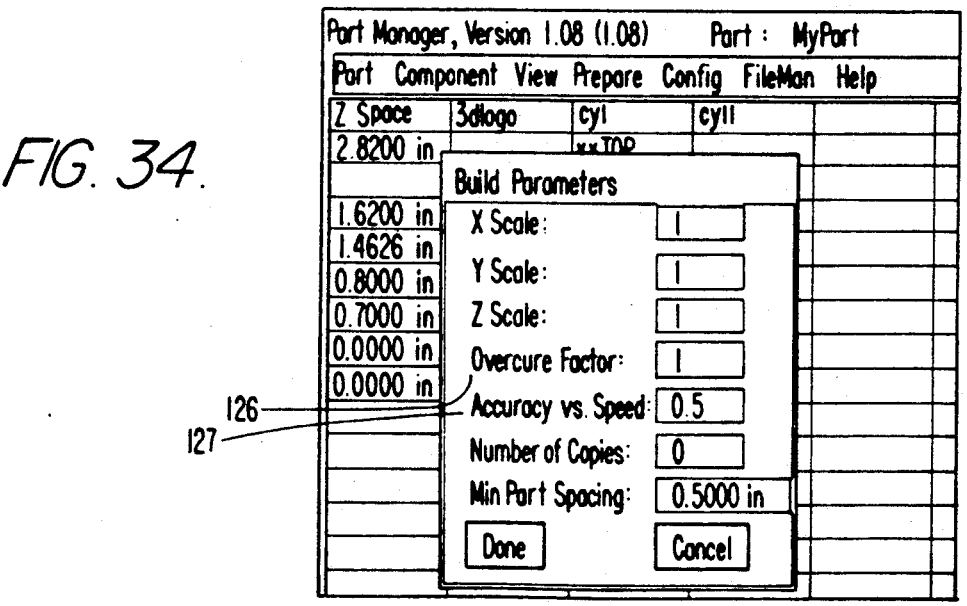

Build Parms: The Build Parms menu item displays a dialog box (FIG. 34) which allows the user to scale the part in either the X, Y, or Z directions to compensate for shrinkage, adjust the overcure factor, specify a desired preference between accuracy and speed, state the number of copies of the part to be built, and, in the case of multiple parts, specify the minimum spacing between parts. This is accomplished by editing the respective field items associated with each of these parameters.

Most of the field items are self-explanatory. The overcure factor field, 126, provides a way of globally scaling the overcure parameters specified for all the vector types in all the style files with the one factor. The accuracy vs. speed field 127 provides the desired tradeoff between speed and accuracy on a scale of 0.0 to 1.0. A tradeoff may be necessary in the case where the accuracy of positioning the dynamic mirrors decreases with the mirror velocity.

Do Prepare: Do Prepare initiates the process of slicing the part file, and it also subsequently creates the build file.

If the part has not already been saved to a file, a dialog box appears which gives a reminder that the part file must be saved. The normal response to this is to click on the Save button. The next screen provides an opportunity to accept a default part name or to type a new part name. If the chosen name already exists in the current directory, there is a choice between overwriting the old file or choosing a different part name.

After the part name is accepted, a dialog box presents a list of the components that are to be sliced and offers the choice of requesting low, medium, or high priority. This choice is offered because slicing is a processor-intensive activity that can occupy the workstation for a considerable amount of time in the case of complex parts. By choosing a low priority for slicing, the workstation can be used for other purposes while slicing occurs. In contrast, choosing high priority for slicing minimizes the time required to complete slicing, but provides little opportunity to use the workstation for other purposes.

After one of these choices is selected, the slicing process starts. A window opens automatically on the screen to allow the process to be monitored. An Abort button at the bottom of the window provides a means of escaping if the slicing process appears to have problems.

A separate message appears on the screen as slicing each component starts. After all components have been sliced, a message indicates that converging is starting. In the converging step, the Part Manager merges all the slice files with the associated style information, resolves any conflicts amongst the styles, and then creates the build file with this data. Finally, a window (illustrated in FIG. 35) indicates that converging is complete and offers a choice of message files. A message file is created for each component in the part.

Any message file can be selected by pointing and clicking on its name. A displayed message file for a component (FIG. 36) shows the number of triangles of each type loaded from the component file, and also shows warning messages which refer to possible problems. If there are more warning messages than can be displayed on the screen, a scroll bar can be used to scroll to hidden messages. Slicing is discussed in detail in U.S. patent application Ser. No. 331,644, referenced earlier.

Do Prepare also creates a build file and writes it into the current directory. The build file is subsequently accessed by the control computer during the part-building process.

The format of a build file can be summarized as follows:

1. Global section
2. Global component section(s)
3. Layer section(s)
   a. Layer section 0
      1) Component 0 section
        Block 1
        Block 2
        :
        Block n
      2) Component 1 section
        Block 1
        Block 2
        :
        Block m
      :
   b. Layer section 1
      1) Component 0 section
        Block 1
        Block 2
        :
        Block p

```
   2) Component 1 section
      Block 1
      Block 2
        :
      Block q
        :
      End
```

As indicated, the file comprises a global section for the part as a whole, a global section for each component, and then a section for each layer. Within each layer section, a subsection is provided for each component, and within a component, each vector block.

A sample build file format is illustrated as follows:

```
Sample BFF file
BFF File: cyl.bff
Header: 'BFF File:  ./cyl.bff'
GLOBAL Section:
Attributes for GLOBAL Section
#1  TOMILS = 1000.000000 <Float 4>
#2  UNAME = 'in' [2] <str>
#3  TITLE = 'cyl' [3] <str>
#4  CDATE = 'Mon Oct 23 17:52:30 1989' [24] <str>
#5  MINBHCD = 0.020000 <Float4>
#6  MAXBHCD = 0.026000 <Float4>
#7  MINFCD = 0.020000 <Float4>
#8  MAXFCD = 0.026000 <Float4>
#9  OCFAC = 1.000000 <Float4>
#12 XSCALE = 1.000000 <Float4>
#13 YSCALE = 1.000000 <Float4>
#14 ZSCALE = 1.000000 <Float4>
#15 SPEEDF = 0.500000 <Float4>
#16 NCOMPS = 1 <Int2>
#17 PMINX = 0.000000 <Float4>
#18 PMAXX = 3.240000 <Float4>
#19 PMINY = 0.000000 <Float4>
#20 PMAXY = 3.240000 <Float4>
#21 PMINZ = 1.000000 <Float4>
#22 PMAXZ = 3.820000 <Float4>
#23 NPCOPY = 1 <Int2>
#24 PROTO = 0.000000 <Float4>
#34 PZSCALE0 = 1.000000 <Float4>
#44 PXSCALE0 = 1.000000 <Float4>
#54 PYSCALE0 = 1.000000 <Float4>
#64 PXOFF0 = 0.000000 <Float4>
#74 PYOFF0 = 0.000000 <Float4>
GLOBAL Component Section 0 [0]
Attributes for Global Component Section
#84  CNAME = 'cyl' [3] <str>
#85  CNUM = 0 <Int2>
#86  CMINX = 0.000000 <Float4>
#87  CMAXX = 3.240000 <Float4>
#88  CMINY = 0.000000 <Float4>
#89  CMAXY = 3.240000 <Float4>
#90  CMINZ = 1.000000 <Float4>
#91  CMAXZ = 3.820000 <Float4>
#92  NCCOPY = 1 <Int2>
#93  CROT0 = 0.000000 <Float4>
#103 CZSCALE0 = 1.000000 <Float4>
#113 CXSCALE0 = 1.000000 <Float4>
#123 CYSCALE0 = 1.000000 <Float4>
#133 CXOFF0 = 0.000000 <Float4>
#143 CYOFF0 = 0.000000 <Float4>
Layer Section: [1.000000]
Attributes for Layer Section
#153 LTHICK = 0.020000 <Float4>
#154 ZWAIT = 15.000000 <Float4>
#155 ZDIP = 0.750000 <Float4>
#156 ZVEL = 1.000000 <Float4>
#157 ZACCEL = 1.000000 <Float4>
#158 PDDELAY = 0.000000 <Float4>
#159 NSWEEPS = 1 <Int2>
#160 STVEL1 = 4.000000 <Float4>
#167 SSPOS1 = 0.000000 <Float4>
#174 SEPOS1 = 0.000000 <Float4>
#181 BVEL1 = 3.000000 <Float4>
#188 BGAP1 = 100.000000 <Float4>
#195 PSDELAY1 = 0.000000 <Float4>
Component Section: 0
Attributes for Component Section
#84  CNAME = 'cyl' [3] <str>
#85  CNUM = 0 <int2>
#86  CMINX = 0.000000 <Float4>
#87  CMAXX = 3.240000 <Float4>
#88  CMINY = 0.000000 <Float4>
#89  CMAXY = 3.240000 <Float4>
#90  CMINZ = 1.000000 <Float4>
#91  CMAXZ = 3.820000 <Float4>
#92  NCCOPY = 1 <Int2>
#93  CROT0 = 0.000000 <Float4>
#103 CZSCALE0 = 1.000000 <Float4>
#113 CXSCALE0 = 1.000000 <Float4>
#123 CYSCALE0 = 1.000000 <Float4>
#133 CXOFF0 = 0.000000 <Float4>
#143 CYOFF0 = 0.000000 <Float4>
#202 NUMH = 3 <Int2>
#203 HANG1 = 60.000000 <Float4>
#204 HANG2 = 120.000000 <Float4>
#205 HANG3 = 0.000000 <Float4>
#207 HSAPCE1 = 0.050000 <Float4>
#208 HSPACE2 =2 0.50000 <Float4>
#209 HSPACE3 = 0.50000 <Float4>
#211 HSTEP = 0.000000 <Float4>
#212 BCD = 0.026000 <Float4>
#213 HCD = 0.026000 <Float4>
#214 UPHCD = 0.026000 <Float4>
#215 DNHCD = 0.026000 <Float4>
#218 XFSPACE = 0.003000 <Float4>
#219 YFSPACE = 0.000000 <Float4>
#220 FCD = 0.023000 <Float4>
#221 UPFCD = 0.0.026000 <Float4>
#222 DNFCD = 0.020000 <Float4>
Block Section:
Block Type: LB
Block in Vector Format, 120 Vectors
   1.504000,    0.516125    1.620000,0.510000
   1.620000,    0.510000    1.736000,0.516125
   1.736000,    0.516125    1.850750,0.534250
   1.850750,    0.534250    1.963000,0.564375
   1.963000,    0.564375    2.071500,0.606000
   2.071500,    0.606000    2.175000, 0.658750
   2.175000,    0.658750    2.272500,0.722000
   2.272500,    0.722000    2.362750,0.795125
   2.362750,    0.795125    2.444875,0.877250
   2.444875,    0.877250    2.518000,0.967500
   2.518000,    0.967500    2.581250,1.065000
   2.581250,    1.065000    2.634000,1.168500
Block Section:
Block Type: FDB
Block in Vector Format, 120 Vectors
   2.352750,    0.806250    2.433750,0.887250
   2.433750,    0.887250    2.505875,0.976375
   2.505875,    0.976375    2.568250,1.072500
   2.568250,    1.072500    2.620375,1.174625
   2.620375,    1.174625    2.661375,1.281625
   2.661375,    1.281625    2.691125,1.392375
   2.691125,    1.392375    2.709000,1.505500
   2.709000,    1.505500    2.715000,1.620000
   2.715000,    1.620000    2.709000,1.734500
   2.709000,    1.734500    2.691125,1.847625
   2.691125,    1.847625    2.661375,1.958375
```

Fields #1–#74 above comprise the global section, while field #84–#143 comprise the global section for component 0, the only component in the example. Fields #153–#195 comprise the layer section, the only layer in the example. The layer section defined the recoating parameters for the layer. Fields #202–#222 define the component-specific build parameters. (Note that the global component fields #84–#143 are duplicated in the component section. This is so that each component section can be executed directly by the control computer independently of the rest of the build file.) After the component specific parameters, the vectors are listed by vector type. A description of the fields in the global section is as follows:

| FIELD | DESCRIPTION |
|---|---|
| TOMILS | the number of mils in each unit (see UNAME below) |
| UNAME | the units in which the data is expressed |
| TITLE | part title |
| CDATE | creation date |
| MINBHCD | minimum hatch cure depth, all components, all layers |
| MAXBHCD | maximum hatch cure depth, all components, all layers |
| MINFCD | minimum fill cure depth, all components, all layers |
| MAXFCD | maximum fill cure depth, all components, all layers |
| OFFAC | overcure factor |
| XSCALE, YSCALE, ZSCALE | global scale factors, typically to compensate for shrinkage |
| SPEEDF | speed vs. accuracy tradeoff; typically used to select one of range of laser power settings, and corresponding mirror velocities |
| NCOMPS | number of components |
| PMINX, PMAXX, PMINY, PMAXY | extents of part |
| NPCOPY | number of part copies |
| PROT0, PZSCALE0, PXSCALE0, PYSCALE0, PXOFF0, PYOFF0 | rotation scale, and offset for each copy |

A description of the fields in each global component section is as follows:

| CNAME | component name |
|---|---|
| CNUM | component number |
| CMINX, CMAXX, CMINY, CMAXY, CMINZ, CMAXZ | component extents |
| NCCOPY | number of component copies |
| CROT0, CZSCALE0, CXSCALE0, CYSCALE0, CXOFF0, CXOFF0 | rotation, scale, offset for eact copy |

A description of the global fields in the layer section will now be described:

| LTHICK | layer thickness |
|---|---|
| ZWAIT | level wait after sweeping |
| ZDIP | amount of platform dip |
| ZVEL | elevator velocity |
| ZACCEL | elevator acceleration |
| PDDELAY | post-dip delay |
| NSWEEPS | number of recoater sweeps |
| STVEL1 | blade set-up velocity until SSP0S1 (see below) |
| SSPOS1 | starting sweep position |
| SEPOS1 | ending sweep position |
| BVEL1 | blade velocity |
| BGAP1 | blade gap |
| PSDELAY1 | post sweep delay |

Finally, the component-specific fields in the layer section (other than the global components fields described previously) will now be described:

| NUMH | number of hatch lines |
|---|---|
| HANG1, HANG2, HANG3 | angles for each of the hatch lines specified by NUMH |
| HSPACE1, HSPACE2, HSPACE3 | spacing for each of the hatch lines specified by NUMH |
| HSTEP | angle by which to slightly displace hatch vectors on adjacent layers |
| BCD | border cure depth |
| HCD | hatch cure depth |
| UPHCD | upward facing hatch cure depth |
| DNHCD | downward facing hatch cure depth |
| XFSPACE, YFSPACE | spacing for X and Y fill, respectively |
| FCD | fill cure depth |
| UPFCD | upward facing fill cure depth |
| DNFCD | downward facing fill cure depth |

As discussed earlier, in combining the individual sliced component files into the build file, Part Manager will sometimes need to resolve conflicts between the recoating parameters associated with different components which fall on the same layer. To accomplish this, at present, Part Manager will make the following choices amongst all the components:

| RECOATING PARAMETERS | SELECTION METHOD AMONGST ALL COMPONENTS |
|---|---|
| ZDIP | maximum |
| ZVEL | minimum |
| ZACCEL | minimum |
| PDDELAY | maximum |
| ZWAIT | maximum |
| NSWEEPS | maximum |
| BVEL | component with max number of sweeps; if tie, take minimum amongst these |
| BGAP | component with max number of sweeps; if tie, take maximum amongst these |
| PSDELAY | component with max number of sweeps; if tie, take max amongst these |

For example, according to the above table, for a particular layer, Part Manager will select the maximum value for ZDIP in the recoating styles from all the components on that layer. As another example, Part Manager will also set NSWEEPS equal to the maximum value for all the components on the layer, and will then set BVAL for each sweep to the values specified for that component.

The particular resolution described above for each parameter is designed to take the safest approach possible amongst possible resolutions. For example, for the first five parameters relating to the elevator, choosing the maximum wait times, and dip distance, while choosing the minimum velocity and acceleration, are the safest approaches. Regarding the next four parameters relating to the recoater, choosing the parameters associated with the component having the maximum number of sweeps is the safest course. If there is a tie, then resolving conflicts in favor of the maximum delay and blade gap, and the minimum velocity, is the safest approach.

Beam Width Compensation

Part Manager also performs beam width compensation on the border vectors which end up in the build file. The purpose of beam width compensation is to correct for the finite radius of the laser beam when a boundary in a given layer is traced. Part Manager first determines a beam width compensation amount, typically the cure radius, determined either by user input, or automatically from the beam profilers. For each layer, Part Manager first collects all the polygons having a particular border type, such as layer, flat up and down, and near flat up and down. For each vertex of a polygon, Part Manager offsets the polygon vertex along an interior bisector of the original vertex by a distance d equal to the distance to the center of a circle of radius r which is tangent to the two lines making up the original vertex. A vector joining the original vertex to the displaced vertex and having the length d is referred to as the displacement vector. After all vertices of a polygon have been displaced, Part Manager then redetermines the border vectors associated with the displaced vertices and places these in the build file. Some exceptional cases will now be described:

1) If d exceeds sqrt(2)×r then it is reduced to sqrt(2)×r

2) If the displacement vector, when doubled and placed end over end, crosses a border of an original polygon, the displaced vector is reduced in length until the doubled vector just touches the border vector.

3) If two displacement vectors from different vertices ever cross, they are reduced in length to their intersection point.

4) If a displacement vector crosses a redrawn border of a compensated polygon, the redrawn border is retracted (by reducing the length of its corresponding displacement vectors) until it just touches the intrusive displacement vector, and the redrawn border is as parallel as possible to the original border.

After the displacement vectors have been adjusted, the borders are redrawn by connecting the displaced vertices, and then sent to the build file. More information about beam compensation can be obtained from U.S. patent application Ser. No. 331,644 referenced earlier.

The Config Menu

Figure 37:
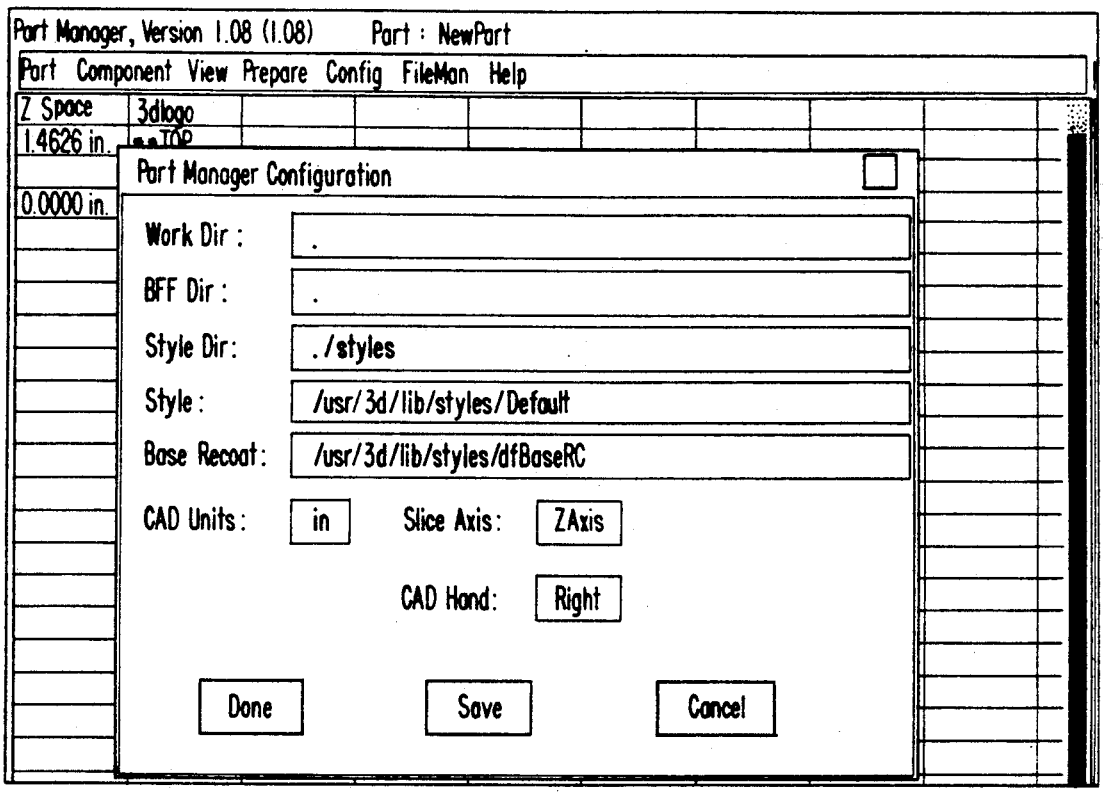

The Config menu (FIG. 37) provides a means to establish default conditions. Each field in the menu represents a default condition, and the contents of the fields can be set or changed by typing the new contents. Each of the fields is explained below:

Work Dir: The work directory contains component and part files, as well as intermediate files. This field contains the default work directory.

Bff Dir: Build files created by Part Manager are written into this directory. This field specifies the default .bff directory.

Style Dir: This directory contains style files. This field contains the default style directory.

Style: This field contains the default style with which components are initialized when they are added to a spreadsheet.

CAD Units: This field allows the default CAD units to be stated as in(inches), mill(thousandths of an inch), mm(millimeters), cm(centimeters), m(meters), or ft(feet).

Slice Axis: This field specifies the default slicing axis.

CAD Hand: This field allows the default orientation of the CAD system to be stated as right-handed or left-handed.

Figure 38:
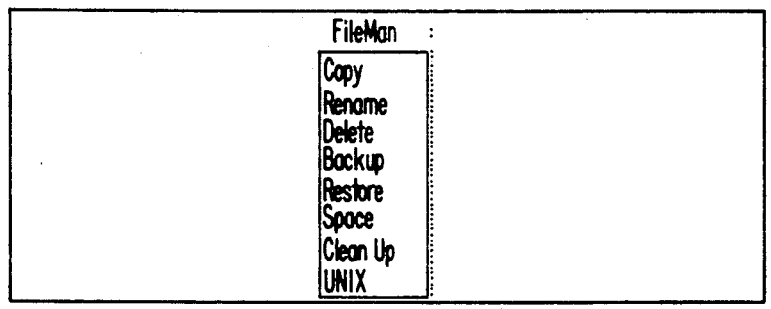

The Fileman Menu: The FileMan (file management) menu (FIG. 38) provides various file management facilities. Each of the items on the menu is described in the following paragraphs.

1) Copy: Copy provides the ability to copy files. Clicking on Copy results in a dialog box which can be used to specify the appropriate directories and files.

The top part of the dialog box is used to select the directory that contains the file to be copied. The center part of the screen lists the files in the selected directory.

To select a file to be copied, the user clicks on the file name. The name changes from black to red and the file name appears in the box under the list of file names. Then the user clicks on the Select button to confirm the choice, and an editing cursor appears in the box near the bottom of the dialog box. The user uses this box to type the name of the copy of the file. One or many files can be selected.

Finally, the user clicks on the Copy button to copy the file.

In addition to copying individual files, it is also possible to select all the files in a directory to be copied by clicking the All button.

2) Rename: The Rename file management utility is used to change the names of individual files. A dialog box similar to the Copy dialog box is used to select a directory and file, and to type the new name for the file.

3) Delete: The Delete file management utility is used to delete individual files or multiple files. A dialog box similar to the Copy dialog box is used to select a directory and the file to be deleted.

4) Backup: The Backup file management utility is used to backup files onto a tape cartridge. A dialog box similar to the Copy dialog box is used to select a directory and the files to be backed up. As the backup progresses, the names of the backed up files are displayed on the screen.

5) Restore: The Restore file management utility is used to restore files to the disk that have previously been backed up onto a tape cartridge. Clicking on Restore causes a message to be displayed, reminding the user to insert a tape cartridge on which files have been backed up into the cartridge transport. Files are automatically restored into their original directories.

6) Space: The Space file management utility displays the amount of unused disk space.

7) Cleanup: The Cleanup file management utility deletes intermediate files produced by Part Manager. It can also be used to delete other files identified by name.

8) Unix: Unix provides access to IRIS windows.

Viewing Components and Parts

The View function, which is accessed from the main menu, provides a means to display components and parts on the workstation monitor and to view them from any angle and with varying amounts of magnification.

When working with View, it is helpful to maintain a clear distinction between what is being viewed and what is doing the viewing. In the following paragraphs, a component or part being viewed is referred to as the object. The viewing device is referred to as the camera.

The first step in using View is to place a blank viewing window onto the screen. Then, the object to be viewed is brought onto the screen by accessing the appropriate component, slice, or build file (having the files types .stl, .sli, or .bff, respectively). Thus, the Part Manager allows any of these file types to be displayed.

When the object is first brought onto the screen, it is oriented as defined in the file and is shown viewed from the front. The object can be viewed from different angles and at different distances by changing the position of the object, by changing the position of the camera, or by changing the positions of the object and the camera.

Figure 39:
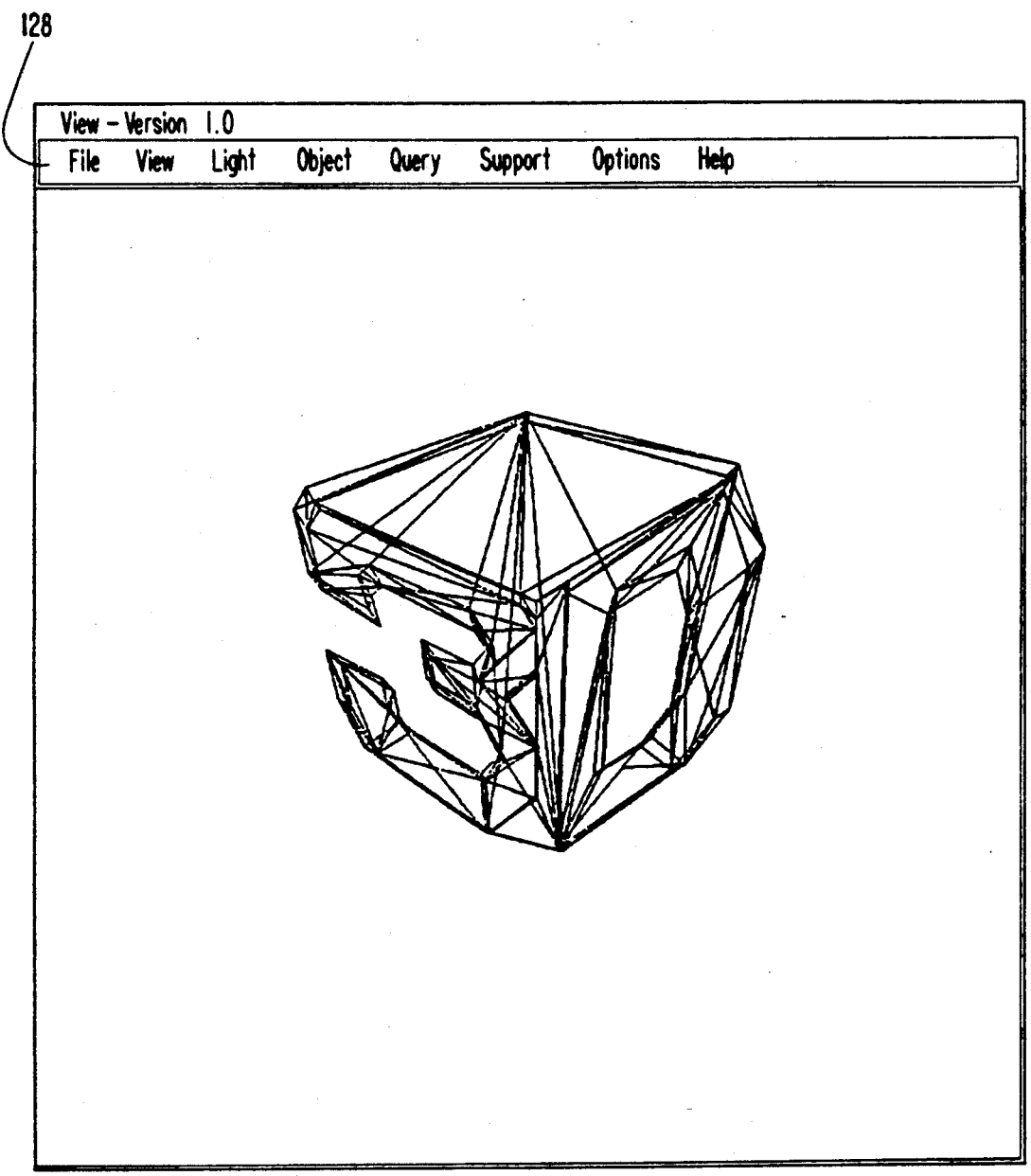

To access View, a user points to the word View on the main menu and clicks the mouse button. After several seconds, the spreadsheet disappears from the screen and is replaced with a blank view window with a horizontal menu across the top (FIG. 39).

The view menu is identified with numeral 128. In addition, in the View window, a wire frame representation of the object is displayed.

The functions of each of the menu items are described below.

File: File contains the following functions:

1) New: Creates a new view window which is superimposed on the already-existing one.

2) Load: Displays a dropdown menu from which a component of a part to be viewed is selected. The menu provides access to component (.stl) files, slice (.sli) files, and build (.bff) files.

3) Save: Saves the file currently being viewed, using its current file name.

4) Save As: Saves the file currently being viewed after giving the user the opportunity to assign a file name.

5) Clear: Clears the view screen.

6) Quit: Removes the view screen and redisplays the previous spreadsheet.

View: View contains the following functions:

1) Zoom: Magnifies a part of the viewed image.

2) Change: Transforms the current camera position. See the subsequent description of the Change dialog box for details.

3) Reset: Restores any transformation made for viewing only to the initial state.

4) Select: Selects a perspective, front, top, or left view.

5) Load: Loads a file containing predefined viewing conditions.

6) Save: Saves the current viewing condition as a file.

7) Copy: Copies a file containing viewing conditions.

Light: Light contains functions that control the illumination under which the viewed object is seen.

Object: Object contains functions that affect how the object is viewed. These functions are as follows:

1) Select: Selects an object by name.

2) DrawMode: Provides options that determine how the component or part is drawn on the screen i.e., wire frame representations.

3) Orient: Changes the orientation of the object. See the description of the Change dialog box below for more information.

4) Layers: Selects a specific range of layers for viewing. See the description of the change dialog box below for more information.

Changing View Orientation

Figure 40:
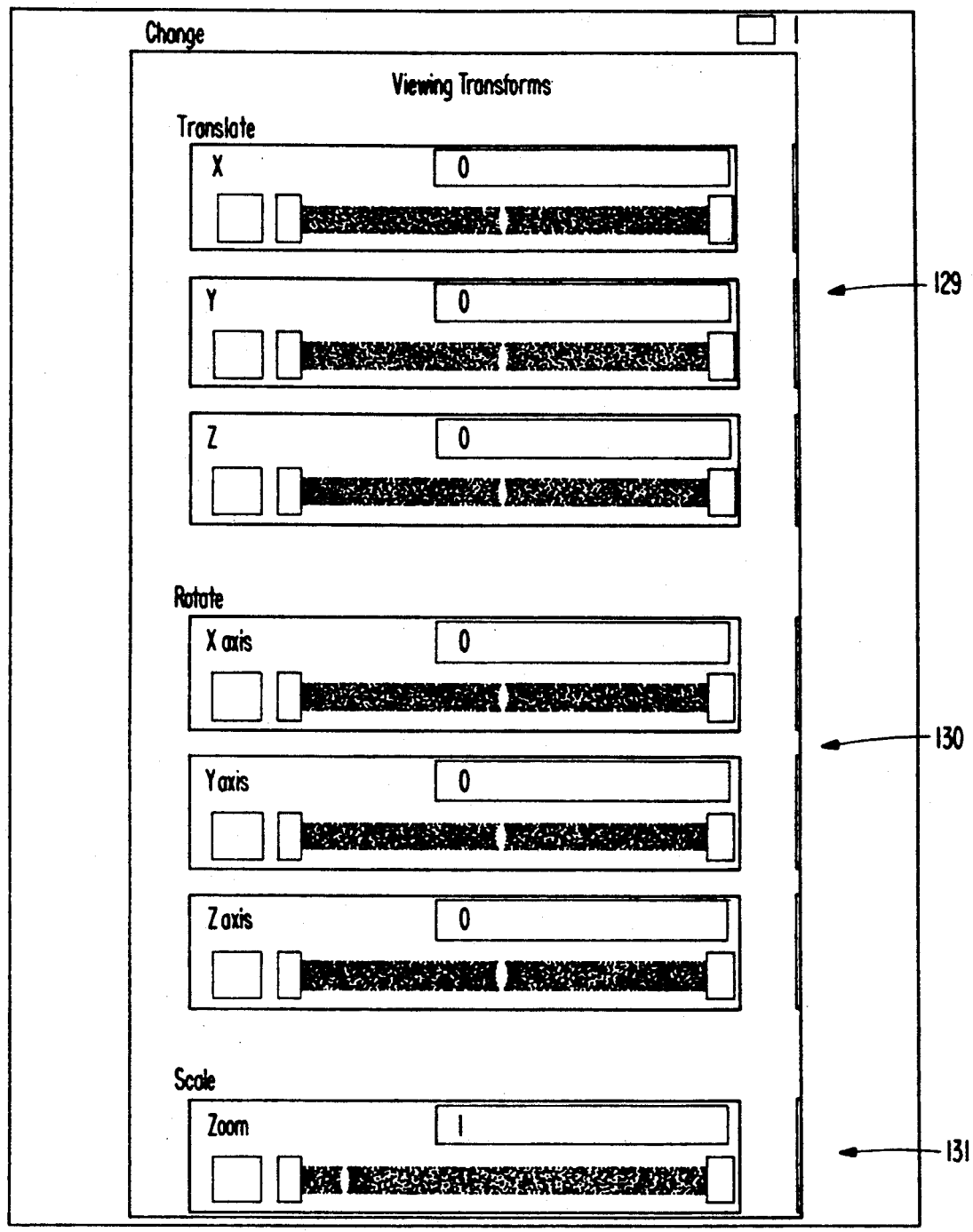

In the View menu, Change changes the camera position. In the Object menu, Orient changes the orientation of the object. Both functions provide a dialog box illustrated in FIG. 40.

The top section 129 of the dialog box is used to translate (move) the camera position along the X,Y, and Z axes. The middle section 130 rotates the camera about the axes. The bottom section 131 moves the camera closer to, or further away from, the object.

Each of the move fields is represented by a scale with a pointer to show the current state. In addition, the current state is shown numerically over the scale.

The state of each field can be changed numerically or graphically. To change a state numerically, a user points to the number that represents the current state of the movement to be changed and clicks the mouse button. A white editing cursor appears adjacent to the number. The user types the new number and presses the Enter key. The field immediately assumes the new value and the pointer moves to show that value graphically.

The state of a field is changed graphically in the same manner as scroll bars are used to change the area of the screen in view. One way is to point at the pointer on the scale, press down the mouse button, and drag the pointer to a new position. Another way is to point on the rectangle at the right or left end of the scale and then hold down the mouse button. The pointer moves toward the activated rectangle.

There is a red square at the left end of each scale. The inner part of the square is changed to green by pointing at it and clicking the mouse button. When the square is green, the camera moves continuously while one of the pointers is moving. When the square is red, the camera moves only after the pointer has been moved to a new position and the mouse button has been released. The green mode facilitates seeing the result of moving the camera, whereas the red mode moves the camera more rapidly from one position to another.

The previous paragraphs described the use of the dialog box that controls the camera position. A similar dialog box controls the object position.

Figure 41:
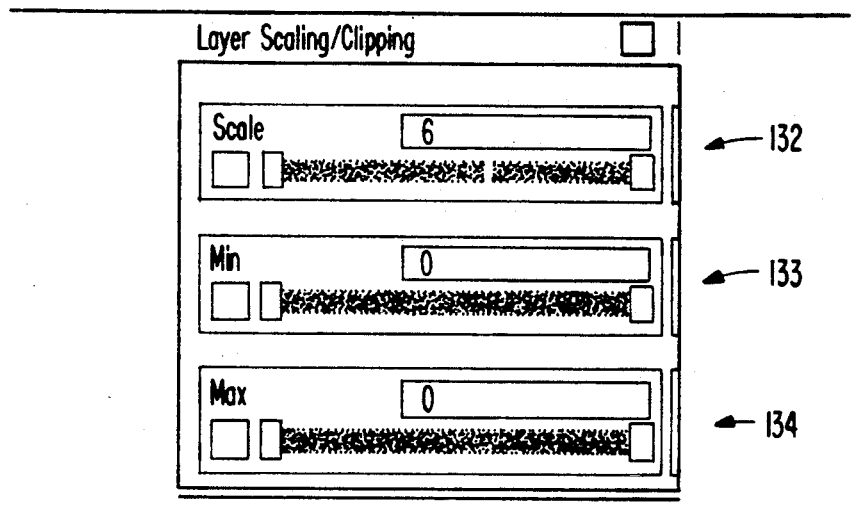

The Object menu contains a Layers item used to select a range of layers to be viewed. Selecting this item displays a dialog box (FIG. 41) that has three indicators, similar to those used to control the camera and object position. These indicators are controlled in the manner just described. The top box 132, marked Scale, is used to adjust the spacing between layers in the display. The other two indicators, marked Min and Max, items 133 and 134, respectively, select the range of layers to be displayed.

The above provided a description of Part Manager. A key aspect of Part Manager is the spreadsheet orientation, which provides a convenient way for a user to organize and keep track of the data required to build a part, especially large or complex parts. The spreadsheet also allows a user to break up a large or complex part into components, which can be managed separately. Other benefits of Part Manager is that it is easy to use, especially by a novice user, and it also does not require a user to have intimate knowledge of implementation details and build parameters. Many of these parameters can be specified in a library of style and recoat style files, and then subsequently associated by a novice user with individual components by the spreadsheet.

Figure 42:
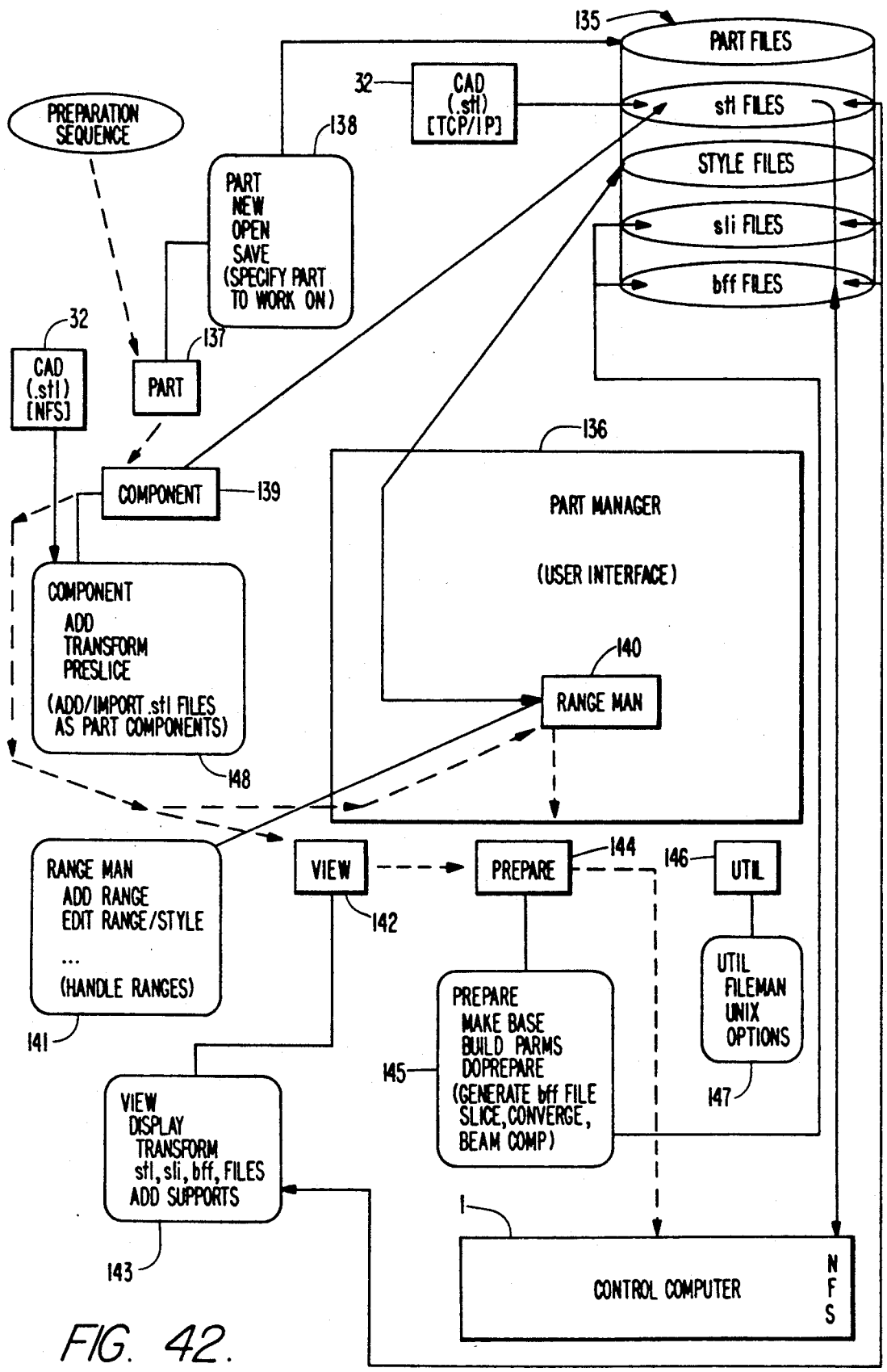
FIG. 42 is a diagram showing the order in which different tasks are typically performed in Part Manager.

An overview of the sequence in which the functions of Part Manager are typically brought into play is illustrated in FIG. 42. Part Manager begins operation after the .stl files have been provided by CAD/CAM system 32.

In step 136, the user enters Part Manager and in step 137, specifies a part to work on. As indicated by item 138, the user is given the option of beginning work on a new part, or resuming work on an existing part. In step 139, the user specifies the components associated with the part. As indicated, each component is associated with its own .stl file, and each of these files is then associated with the part file for that part. As indicated by item 148, a user may also choose to transform the component files, or Preslice them, according to which Part Manager checks to make sure that the triangles completely bound the component represented, etc. Next, in step 140, the user specifies range information for each component. As indicated by item 141, this includes adding ranges to a component, and then specifying style and recoat style files for each range.

In step 142, the user views the part, and, as indicated by item 143, optionally moves it around in space or scales it, and then indicates where supports should be built.

In step 144, the user performs the final steps before building, which, as indicated by item 145, include the substeps of adding a base to the part, specifying some global build parameters, and then slicing the part. This produces the build file. In step 146, the user may perform certain file management tasks, and this may involve utilizing some of the functions identified in item 147. Lastly, the build file, once generated, is passed to control computer 251 for part building. The file formats for each of the above files have already been discussed.

DESCRIPTION OF CFAB

Once the build file is transferred to the control computer, part fabrication software known as CFAB, which runs on that computer, can begin execution. As with Part Manager, CFAB interacts with a user by means of menus.

Once the user instructs CFAB to begin part fabrication, CFAB then coordinates activities with the DSPs to begin this process.

Overall Distribution of Tasks

Figure 43A:
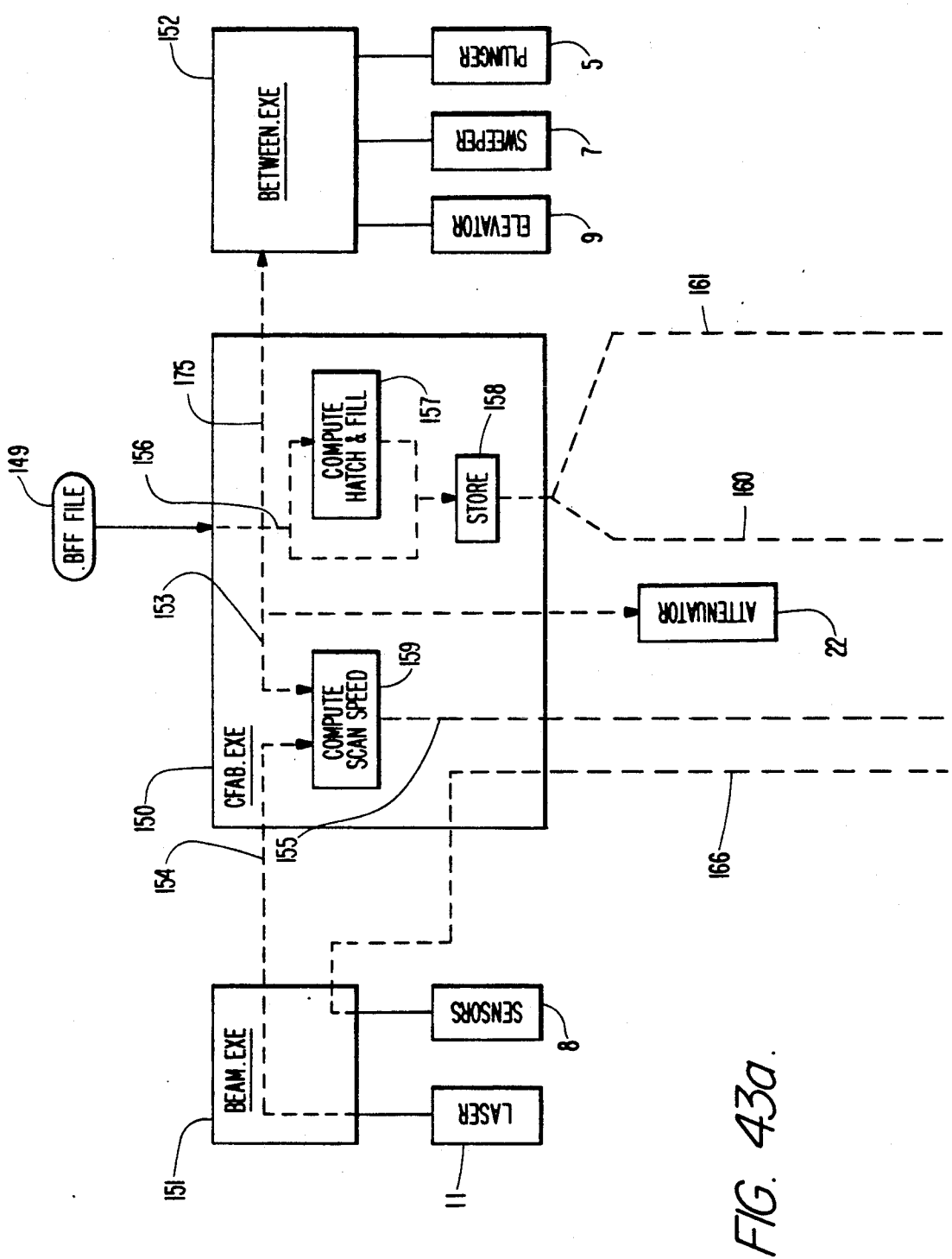
FIG. 43 is detailed diagram showing the flow of data, and distribution of tasks, within the control computer configuration.
Figure 43B:
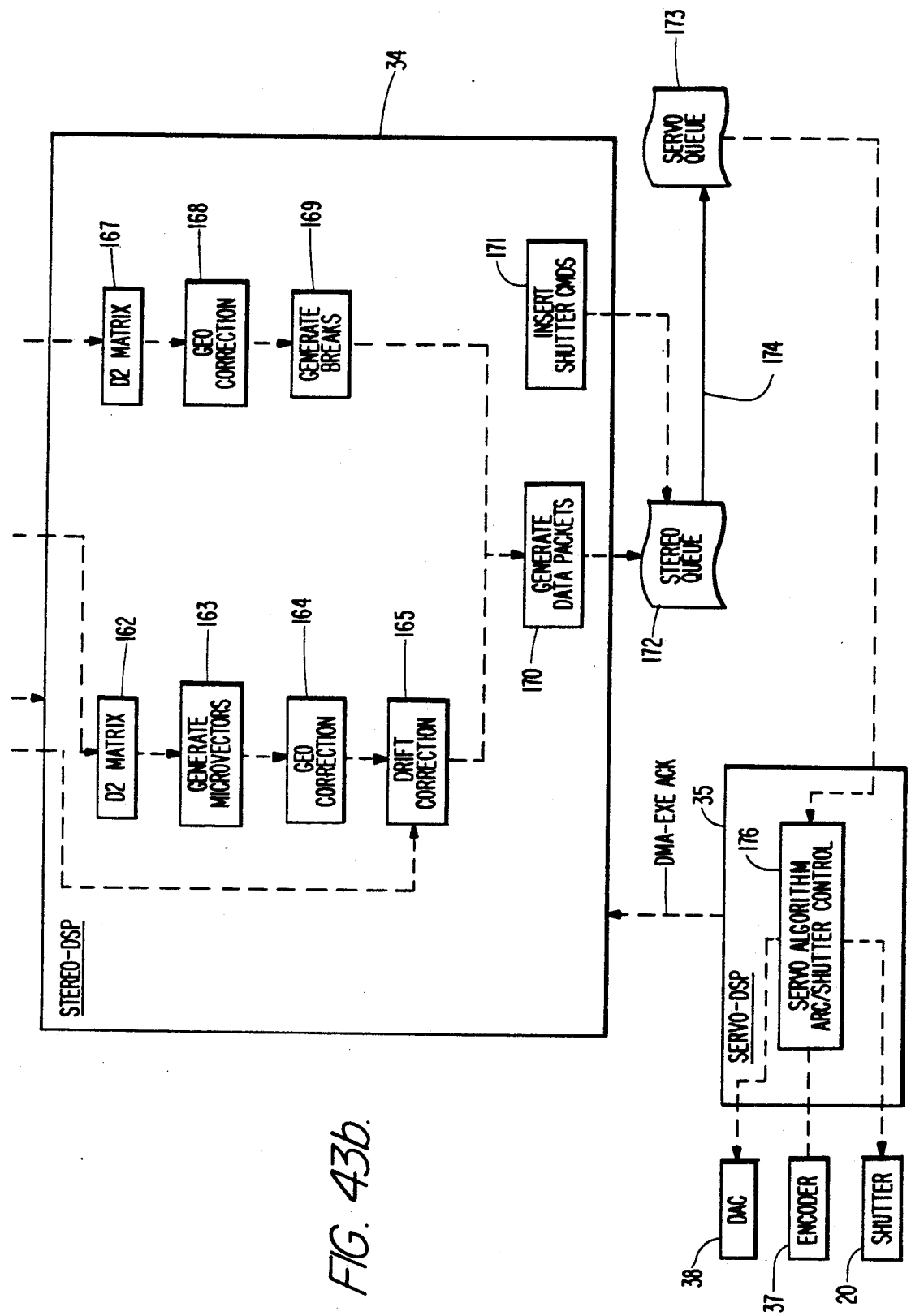

FIG. 43 illustrates the overall distribution of tasks amongst the control computer and the two DSPs. The programs which execute on the control computer are BEAM.EXE, CFAB.EXE, and BETWEEN.EXE, identified with numerals 151, 150, and 152, respectively. Together, these programs are responsible for controlling and monitoring the operation of laser 11, beam sensors 8, elevator 9, sweeper or recoater blade 7, plunger 5, and attenuator 22. In addition, the control computer is responsible for generating hatch and fill vectors, which task is identified by numeral 157.

Stereo-DSP 34 is responsible for performing the tasks of geometric and drift correction to the vectors. These and related tasks are identified with numerals 162-165, 167-169.

Servo-DSP 35 is responsible for controlling shutter 20, and for controlling and monitoring the position of the dynamic mirrors. Control of the mirrors is accomplished by issuing positioning commands to the mirrors by means of Digital-to-Analog Converter (DAC) 38. Monitoring of the position of the mirrors is accomplished by receiving successively updated information about the current position of the mirrors by means of encoder 37.

The tasks performed by each of these processors will now be explained in detail. As indicated in FIG. 43, .bff file 149 drives the entire process. The file is received by the CFAB program, which extracts data from the file. Those build parameters relating to control of the elevator, the sweeper, and the plunger, which are identified with numeral 175, are passed to the BETWEEN.EXE program, which uses these parameters to control the respective devices.

The boundary vectors, identified with numeral 156, are extracted, and then used to compute hatch and fill vectors "on the fly" as indicated in step 157.

Hatch and Fill Vector Generation

Figure 44:
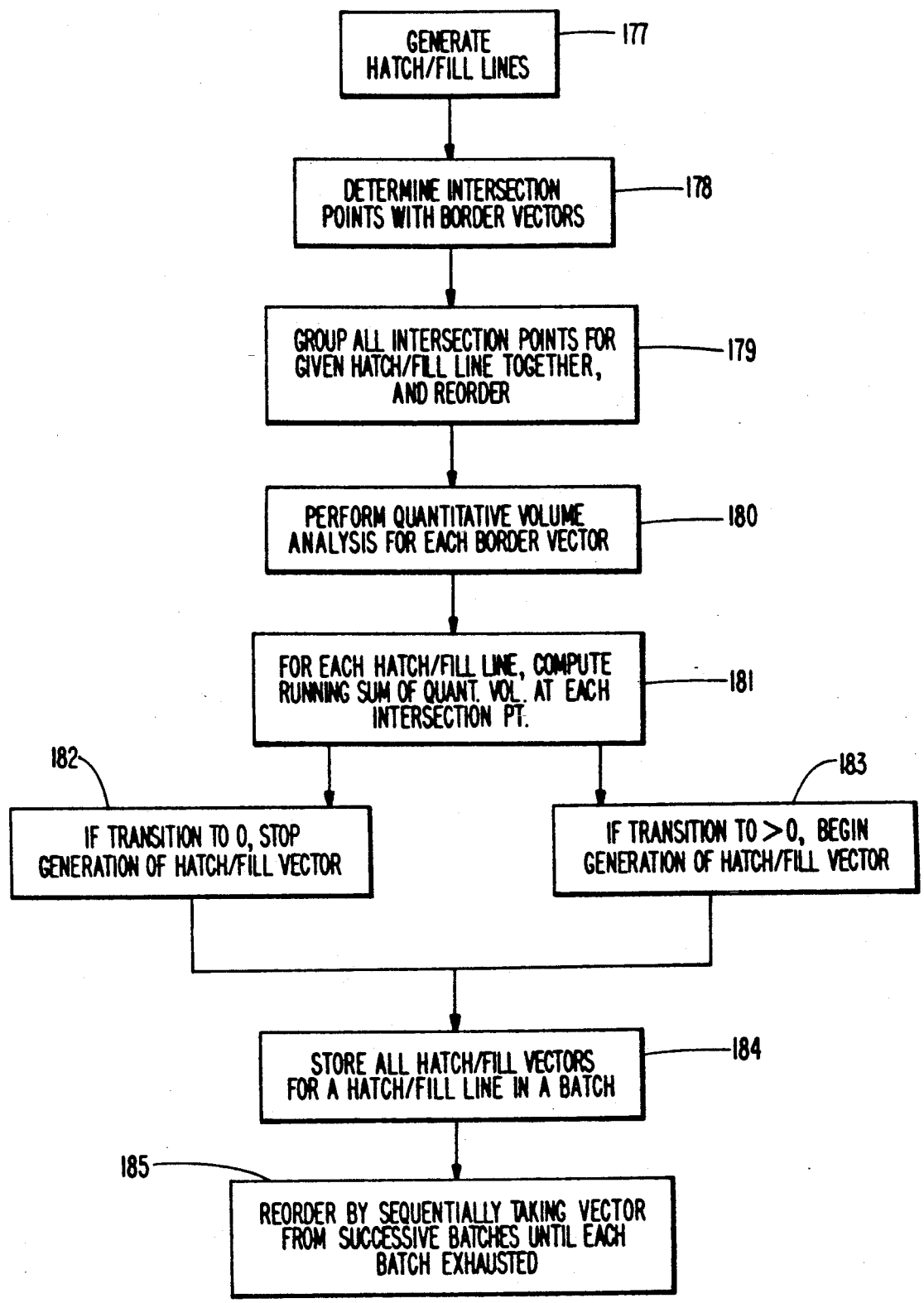
FIG. 44 is a flowchart of the hatch and fill vector generation algorithm which is performed by the control computer on the fly.
Figure 45:
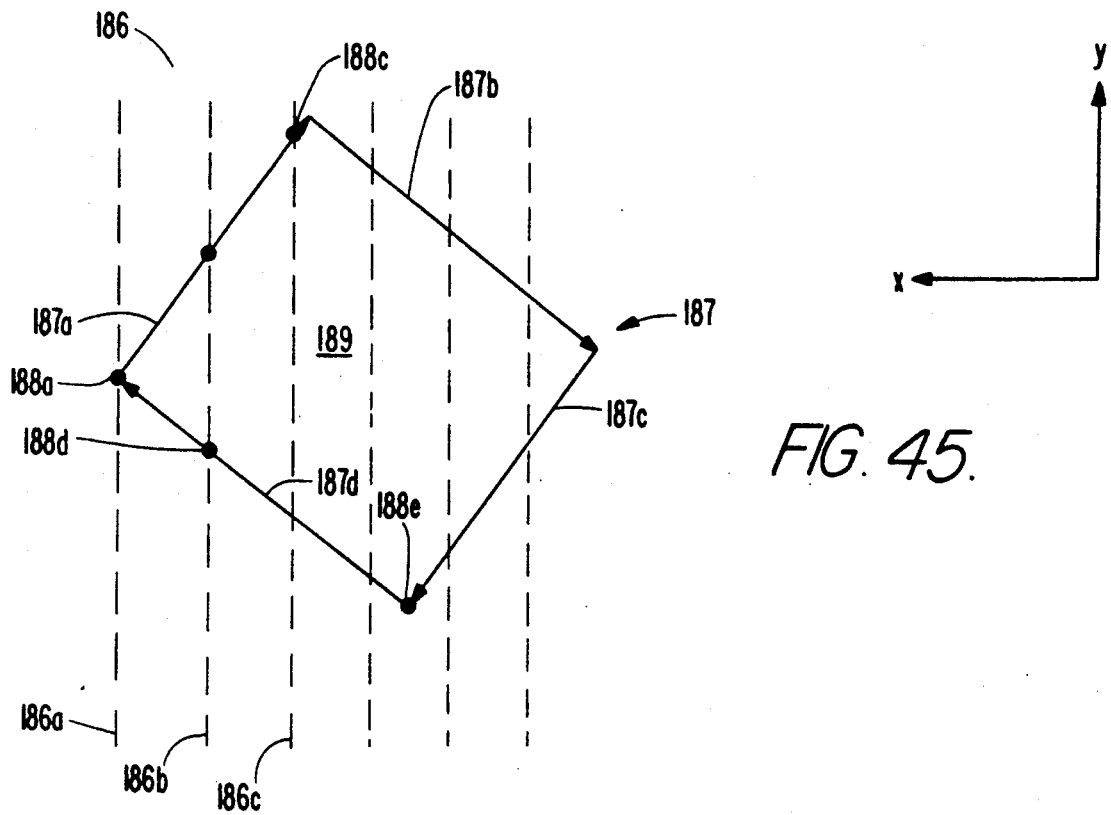
FIGS. 45-49 are diagrams which illustrate more fully the operation of the hatch/fill vector generation algorithm.

The algorithm for computing the hatch and fill vectors is shown in flow chart form in FIG. 44. As illustrated, in step 177, the algorithm first computes hatch or fill intersection lines. These lines are computed from the information provided in the .bff file describing the hatch or fill vector types and spacing. These lines are then superimposed over the border vectors of a layer to begin the process of generating hatch or fill vectors for that layer. A key requirement (for reasons to be discussed subsequently) is that the lines be parallel to one coordinate, typically the Y coordinate, of the X,Y coordinate space of the layer. In FIG. 45, for example, the hatch/fill lines are placed parallel to the Y axis. FIG. 45 shows spaced hatch/fill lines 186 superimposed on border vectors 187 for a particular layer. Successive hatch-/fill lines are identified with numerals 186a, 186b, and 186c, etc. Successive border vectors are identified with numerals 187a, 187b, and 187c, etc. The spacing and direction of the hatch/fill lines is determined from data taken from the .bff file.

In step 178 of FIG. 44, the next step is to determine the intersection points between the hatch/fill lines and the border vectors. For ease of data storage, all the intersection points for a given border vector are linked together, as opposed to grouping the intersection points by the corresponding hatch/fill line. In FIG. 45, for example, intersection points 188a, 188b, and 188c are associated with border vector 187a.

Next, in step 179 of FIG. 44, the intersection points are regrouped so that all the intersection points for a particular hatch/fill line are grouped together. The points are then reordered along the direction of the hatch/fill line. In FIG. 45, for example, intersection points 188b and 188d are associated together, and then reordered so that point 188d appears first and 188b appears next (it is assumed that the direction of hatch-/fill line 186b is towards the top of the page).

Then, in step 180 of FIG. 44, quantitative volume analysis is performed on the border vectors. In quantitative volume analysis, the direction of each border vector is compared with the direction of the hatch/fill lines to determine if the border vector is increasing or decreasing. This determination can be made on the basis of the coordinate which is perpendicular to the direction of the hatch/fill lines, i.e., the X coordinate in FIG. 45. The perpendicular (X) coordinate of the end of the border vector is determined and compared with the X coordinate of the intersection point. If greater, the border vector is assumed to be increasing; if less, then decreasing. A quantitative volume number is then assigned to each border Vector based on this comparison.

In making this comparison, it is assumed that all border vectors follow the "left-hand rule," according to which it is assured that the direction of successive border vectors span the interior of a layer in the clockwise direction. In FIG. 45, for example, successive border vectors 187a, 187b, 187c, etc. span the interior 189 of the layer in a clockwise direction.

If the border vector is increasing, the vector is assigned the number $+2$; if decreasing, it is assigned the number $-2$. Thus, in FIG. 45, border vectors 187d and 187c are assigned a quantitative volume number of $+2$, while vectors 187a and 187b are assigned a qualitative volume number of $-2$. The endpoints of each increasing vector are assigned the number $+1$; the endpoints of each decreasing vector are assigned $-1$. A parallel border vector and its endpoints will be assigned the number 0.

Next, in FIG. 44, for each hatch/fill line, a running sum of the quantitative volume numbers of the intersection points is computed as follows: the running sum is first set to 0, and then each intersection point is considered in turn, and for each point, the quantitative volume number at that point added to the running sum.

At each step of the way, the running sum is evaluated. In step 183, if the running sum makes a transition from 0 to a positive number, the generation of a hatch/fill vector is begun, and the current intersection point is noted as the beginning of the vector. In step 182, if the running sum makes a transition from a positive number to 0, the generation of the hatch/fill vector is ended, and the current intersection point noted as the ending point of the vector. If the running sum was non-zero and positive, and continues as non-zero and positive, the generation of an already-begun hatch/fill vector is continued. If the running sum was zero, and continues zero, the non-generation of a hatch/fill vector is likewise continued. Note that for reasons that will become apparent, the running sum can never fall below 0.

In FIG. 45, when intersection point 188d is encountered along hatch/fill line 186c, +2 is added to the running sum. At this point, the running sum makes a transition from 0 to +2, and the coordinates of the intersection point are noted as the beginning of a hatch/fill vector. Next, at intersection point 188b, a −2 is added to the running sum, which thereby makes a transition from +2 to 0. Therefore, the generation of the previously begun hatch vector is ended, and the coordinates of the intersection point are noted as the end of the vector.

Turning back to FIG. 44, in step 184, all redundant endpoints are eliminated, and all the hatch/fill vectors for each hatch/fill line are then stored together in a batch, in the order in which they were generated. Then, in step 185, the vectors are reordered in the order they will be drawn.

The vectors are reordered to minimize the jumping of the laser beam over areas on the resin surface which are not intended to be cured. This is especially crucial with the use of a more powerful laser. This reordering is accomplished by sequentially taking a vector from the top of each batch, adding it to a list to be drawn, and then going on to a successive batch. After all the batches have been considered, they are considered again, but this time, in reverse order. A list of the vectors will be created in the order taken from the batches, and in the order they will be drawn. The direction of the vectors is then adjusted so that successive vectors point in alternating directions.

Figure 46:
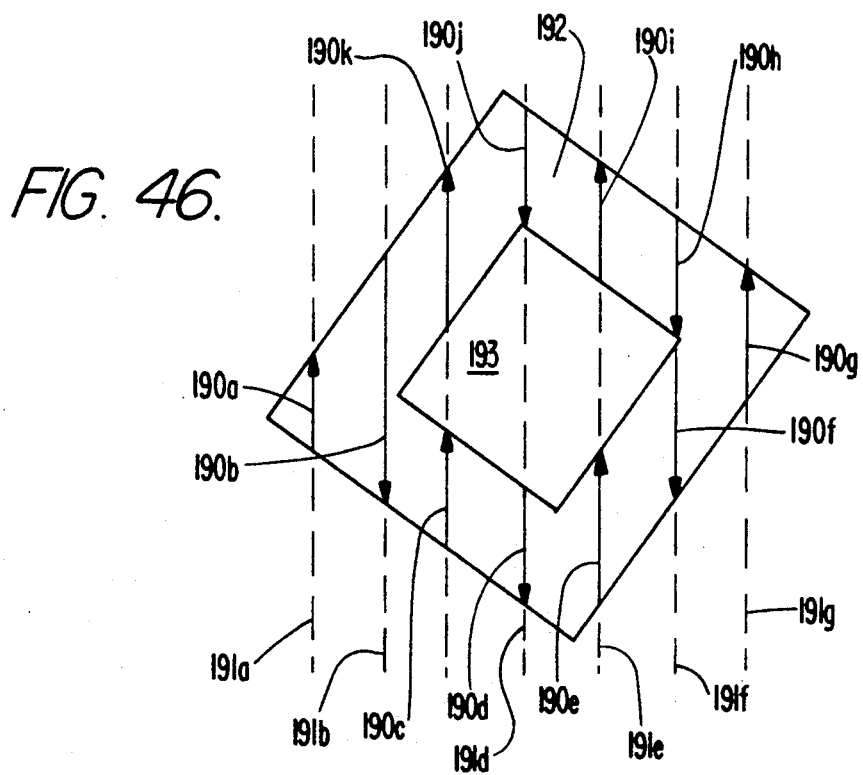

The reordering of the vectors is explained in more detail with the use of FIG. 46. FIG. 46 shows the hatch vectors, identified with numerals 190a-190k, which are generated when hatch lines 191a-191g are superimposed over the border vectors for a layer, which layer comprises a solid square-shaped ring surrounding a hollow portion. The solid portion of the ring is shaded and is identified with numeral reference 192. The hollow portion is identified with reference numeral 193.

According to the algorithm in FIG. 44, in step 184, the hatch vectors will be placed in an ordered batch associated with each hatch line as follows:

| Hatch Line | Ordered Batch | Direction |
|---|---|---|
| 191a | 190a | up |
| 191b | 190b | up |
| 191c | 190c, 190k | up |
| 191d | 190d, 190j | up |
| 191e | 190e, 190i | up |
| 191f | 190f, 190h | up |
| 191g | 190g | up |

Initially, all the vectors are pointing in the direction of the hatch lines, assumed to be towards the top of the page.

In step 185, the hatch vectors are placed in the order they will be drawn with the objective of minimizing jumping distances. To accomplish this, a vector is removed from the top of successive batches and added to a list. Batches 191a-191g are first sequentially considered in order, and then, since more vectors remain, the batches are successively considered again, but in reverse order this time. After the second pass, no more vectors remain in the batches. Successive vectors in the list are then considered, and their directions adjusted such that successive vectors point in alternating directions. After this has been accomplished, the ordered list of the vectors of FIG. 46 appears as follows:

| Vector | Direction |
|---|---|
| 190a | up |
| 190b | down |
| 190c | up |
| 190d | down |
| 190e | up |
| 190f | down |
| 190g | up |
| 190h | down |
| 190i | up |
| 190j | down |
| 190k | up |

As a result of the above, the laser beam is never required to traverse hollow area 193.

A key aspect of the subject invention is the ability of the algorithm of FIG. 44 to accurately detect when a hatch/fill line has entered or has exited a solid portion of a layer. This algorithm accomplishes this using the running sum of quantitative volume numbers associated with the line. If the running sum is greater than zero, it is assumed that the line has entered, and not yet exited, a solid portion. If the running sum is zero, it is assumed that the line has not entered, or has entered but since exited, a solid portion.

The algorithm easily handles the cases where a hatch line has intersected a vertex point where two boundary vectors intersect such as points 188a or 188e in FIG. 45. With respect to point 188a, the intersection of line 186a with the point does not, and should not, begin the generation of a hatch or fill vector, since the line immediately enters, but then immediately exits, the solid portion of the layer. This will be the result here since the intersection of the line with the point is treated as the simultaneous intersection of the line with boundary vectors 187a and 187d. Therefore, +1 will be added for vector 187d, and −1 will simultaneously be added for vector 187a. Thus, the running sum will remain at 0.

With respect to point 188e, a line which intersects this point will cause +2 to be added to the running sum: +1 for vector 187d, and +1 for vector 187c. Thus, a hatch- /fill vector will begin to be generated, as is appropriate, since a solid has been entered into at this point. Then, when the line exits the solid, somewhere along vector 187b, −2 will be subtracted from the running sum, setting it to 0, and the hatch/fill vector generation will cease.

Figure 47:
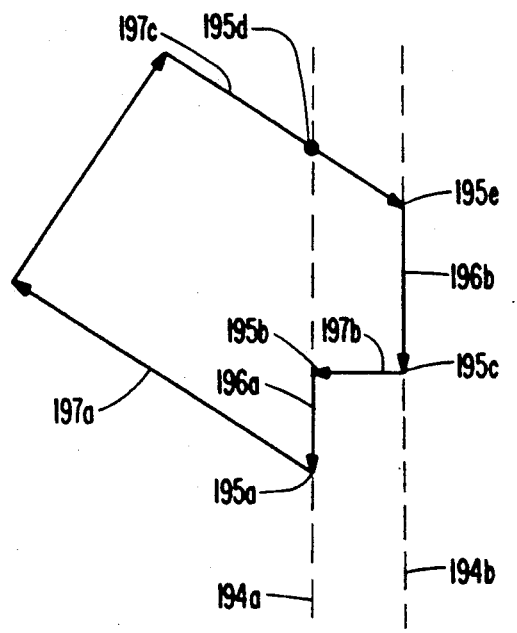

The algorithm also properly handles the case where a hatch/fill line intersects a border vector which is parallel to it. This situation is illustrated in FIG. 47, which shows hatch/fill lines 194a and 194b intersecting parallel border vectors 196a, and 196b, respectively. When line 194a intersects point 195a, +1 will be added to its running sum because of the intersection with an endpoint of vector 197a. At this point, hatch/fill vector generation will begin. Nothing will be added because of the intersection with 196a since this vector is parallel to the hatch/fill line. At point 195b, +1 will also be added to the running sum because of the intersection with the endpoint of vector 197b.

Hatch/fill vector generation will continue. Then, when the hatch/fill line exits the solid portion at point 195d, −2 will be added to the running sum, and hatch/fill vector generation will cease, as is appropriate.

Regarding line 194b, at point 195e, +1 will be added to the running sum from the intersection with the endpoint of line 197b, and vector 196b, being parallel with the hatch line, will not impact the running sum. Then, hatch/fill vector generation will begin. At point 195e, −1 will be added to the running sum because of the intersection with the endpoint of vector 197c, setting the running sum to 0. Thus, at this point, hatch/fill vector generation will cease, as is appropriate.

Figure 48:
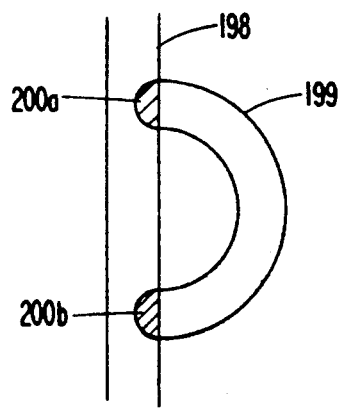

A key aspect of the subject invention is the ability of the algorithm to handle overlapping components, such as a teacup and a teacup handle, which overlap each other in certain areas, as illustrated in FIG. 48, which shows a side view of the teacup handle and a portion of the main body of the teacup. As illustrated, handle 199 intersects the side 198 of the main portion of the body of the teacup. The areas of intersection are identified with numerals 200a and 200b.

Figure 49:
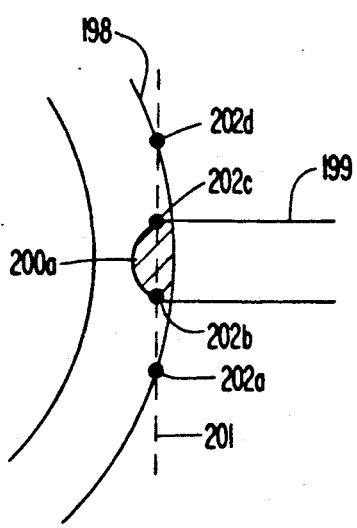

A problem that may occur with overlapping components can be illustrated with the aid of FIG. 49, which shows a top view of FIG. 48. Hatch/fill line 201 is shown intersecting the component layers at 202a, 202b 202c and 202d. The problem occurs at point 202c, when the hatch/fill line exits the overlapping portion 200a of the two components. At this point, a hatch/fill generation algorithm might be tricked into erroneously turning off hatch/fill vector generation even though generation should continue until point 200d is encountered.

The subject algorithm easily handles this problem. This is because hatch/fill generation will begin at point 202a, when +2 is added to the running sum, will continue at point 202b when another +2 is added to the running sum, and will still continue at point 202c when −2 is added to the sum. Hatch/fill vector generation will continue since, at this point, the running sum is still positive. Hatch/fill vector generation will cease at point 202d when −2 is added, and the running time is reset to 0.

Turning back to FIG. 43, after CFAB generates the hatch and fill vectors "on the fly", those vectors, along with the boundary vectors, are stored, as indicated by step 158. CFAB then takes these vectors, and breaks them up into move and jump commands. A move command is where the laser is directed to move along a linear path to a desired location, impinging upon and curing resin throughout this time period. A jump command is where the laser is directed to jump to a particular location without the laser curing any resin. The specific path followed by the laser in the jump command is not important.

CFAB also extracts cure depths 153 from the .bff file, which can differ by component, range within a component, and vector type within a range. The desired cure depths, in conjunction with laser power 154, as determined by the BEAM.EXE program, is used in step 159 to calculate scan speeds 155. The cure depths are also used by CFAB to control the attenuator. The attenuator is in a normally-off mode, but when a cure depth is too thin for the laser beam to cure unattenuated, the attenuator is turned on to block part of the laser beam and allow the appropriate cure depth to be provided.

Stereo-DSP

The stereo-DSP is responsible for processing the move and jump commands generated by CFAB. As mentioned previously, each move and jump command has as an argument the desired X,Y position of the laser. The processing of the move commands begins with step 162. The purpose of this step is to convert the argument of the move command, the desired X,Y position of the laser beam, from CAD/CAM units into vat calibration plate units. By converting into these units, the calibration table lookups that must subsequently be performed in the geometric correction step 164 will be made much faster. Vat calibration units are determined by the locations of the pinholes in the calibration plate. At present, the holes in the calibration plate are spaced in a grid in the X and Y directions, and successive holes along each axis are spaced in ¼ inch increments. In the future, it is expected that the holes will be spaced in ½ inch increments. At ½ inch spacing, an 83×83 hole grid is provided, while for ¼ inch spacing, a 41×41 inch grid is provided. With the ½ inch grid, the holes are presently numbered as if in a positive X-Y space, starting with (128,128) as the coordinates of the left bottom corner pinhole, and ending with (168,168) in the top right corner. A matrix known as the D2 matrix is used to make the conversion to the new coordinate system.

The D2 matrix is a 2 ×3 matrix which converts the coordinates through matrix multiplication. As is known, any transformation of coordinates (U,V) to coordinates (X,Y) of another coordinate system, including scaling, rotation, and shear, can be performed with the following matrix multiplication:

$$\begin{bmatrix} D2 \text{ Matrix} \\ 2 \times 3 \end{bmatrix} \begin{bmatrix} U \\ V \\ 1 \end{bmatrix} = \begin{bmatrix} X \\ Y \end{bmatrix}$$

The following D2 matrix, for example, can be used to convert a CAD/CAM coordinate system in terms of inches, to the vat calibration plate coordinate system in the case where ½ inch spacing is employed:

$$\begin{bmatrix} 2 & 0 & 128 \\ 0 & 2 & 128 \end{bmatrix}$$

To accomplish this transformation, in step 162, the desired X,Y position associated with the move command is transformed by the D2 matrix.

In step 163, the vector argument of the move command is broken up into microvectors in preparation for geometric correction in step 164, a step made necessary by the radial movement of the mirrors. In step 164, each microvector is individually corrected for this distortion. As explained in U.S. patent application Ser. Nos. 331,644 and 268,837, referenced earlier, it is necessary to break up each vector into microvectors first before performing geometric correction since the path of the laser should be as linear as possible, this being a move command. If the vector were not broken up into microvectors, then the movement of the laser beam could be non-linear, especially at the outer reaches of the vat. Microvectors help prevent that.

The length of a microvector advantageously is equal to the calibration plate spacing, but can be any number. If ¼ inch spacing, then the length of the microvector is advantageously ¼ inch. If ½ inch spacing, then the length of the microvector is advantageously ½ inch.

A tick is the servo control loop time, i.e., the time between successive DAC outputs. During each cycle, the encoder 37 first provides to the servo-DSP an update of the current mirror position, and in the latter part of the cycle, the servo-DSP typically provides the DAC with a mirror control command.

At present, a tick is defined to be 35 μS. The number of ticks for each microvector is therefore the number of ticks required to move the length of the microvector at the speed 155 provided by CFAB.

To accomplish geometric correction of the microvectors, the calibration plate is utilized. For each pinhole on the plate, the location of the centroid of the beam at each pinhole is detected using a sensor positioned at the pinhole, and stored into a look up table along with the corresponding radial position of the mirrors. The look-up table is then used to determine the radial position of the mirrors required to place the laser beam at a specific location on the resin surface. For desired beam locations which fall in between the pinholes, piecewise bilinear interpolation or the like could be employed to determine the appropriate corresponding radial position based on a consideration of the four immediately surrounding pinholes. Typically, the look-up table is computed periodically, every several months or so, and need not be computed every time the SLA is turned on. The angular position of the mirrors is advantageously expressed as a number in the range of 64K×64K, with an origin in the middle.

In step 165, the microvectors are corrected for drift of the dynamic mirrors. As described in U.S. patent application Ser. No. 268,907, referenced earlier, drift correction is designed to correct for the drift of the dynamic mirrors over time. It is accomplished with the aid of beam profilers 8, situated at opposite sides of the vat. When the geometric correction look-up table is computed, the dynamic mirrors are positioned until the laser beam is sensed by each profiler in turn. When the laser beam is so sensed, the corresponding position of the dynamic mirrors for each sensor is saved along with the look-up table. Then, during drift correction, the positioning of the mirrors for each profiler is again determined and then compared to the positions stored with the look-up table. This is used to compute a "gain" and an "offset" in both the X and Y directions. The gain is equal to the quotient of the original spacing between the profilers and the spacing now in both the X and Y directions. The offset is equal to the average over the two profilers of the difference between the original distance of the profilers from the vat center and the distance now, in both the X and Y directions. Drift correction is performed by multiplying the X and Y coordinates by the X and Y gains, respectively, and then adding the X and Y offsets, respectively. More details on drift correction is provided in U.S. patent application Ser. No. 268,907, referenced earlier.

The processing of the jump commands begins in step 167. As indicated, in step 167, the argument of the jump command is transformed by the D2 matrix in a manner described earlier, and in step 168, geometric correction is also performed in the same manner as described earlier, except that geometric correction is performed on the endpoints of vector, instead of on microvectors. It is not necessary to break the vector up into microvectors since, unlike the move command, the path of the laser is not important, the laser being turned off during a jump command.

In step 169, the number of ticks required to make the jump is computed. However, since the number of ticks required may exceed a maximum overflow value determined by field size limitations, it may be necessary to break the command up into smaller commands, particularly for jump commands at slow mirror speeds. In this instance, the number of ticks required may exceed the tick counter, and breaking up the commands into commands with smaller tick values will overcome this problem.

In step 170, data packets are generated from the jump and move commands. These data packets are the items which are passed to the servo-DSP for controlling the movement of the dynamic mirrors. In step 171, shutter commands are generated to either open an already-closed shutter at the onset of a move command, or to close an already-open shutter at the onset of a jump command.

Figure 50:
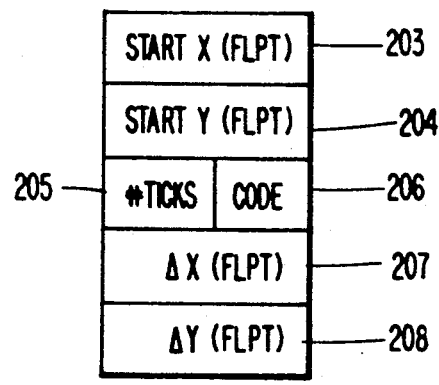
FIGS. 50-51 illustrate the format of the data packets which are passed between, the stereo and servo-DSPs.

The format of the data packets is shown in FIG. 50. As shown, each packet comprises fields 203–208, where fields 203 and 204 define the assumed starting X and Y locations of the mirrors. Field 205 defines the number of ticks the laser jump or move is to take, and field 206 defines the command code. Fields 207 and 208 define the desired incremental movement of the laser in both the X and Y directions, respectively, relative to the assumed starting position. The incremental movement of the laser divided by the number of ticks is the scan speed. At present, command codes are recognized for the following commands:

MOVE
JUMP
MOVE & SHCLOSE
DELAY

The move and jump commands have already been defined, the MOVE & SHCLOSE command closes the shutter after the laser has been moved. As will be apparent farther on, the DELAY command is provided because it is sometimes necessary to have a "filler" command.

The data packets for the move and jump commands are then placed in stereo queue 172. Next, the sequence of the commands is analyzed, and any required shutter commands are interspersed amongst the shutter commands to take account of the finite time it takes for the shutter to respond. At present, the shutter requires about 600 μS after issuance of a command to close in order to actually close, and about 900 μS after issuance of an open command to actually open. Thus, the shutter commands must be interspersed amongst the jump and move commands so that the shutter will open or close at the appropriate time. Sometimes, this may require splitting up a move or a jump command. For example, to open the shutter after a jump may require breaking up the jump command into two commands, and inserting an open shutter command. To close the shutter after a move command may similarly require splitting up the move command.

The following example shows splitting up a 52 tick jump command into a 27 tick command and a 25 tick command. The open shutter command is then placed before the 25 tick command. The time required to perform the second jump command (25 ticks, approx. 900 µS) will be sufficient to give the shutter time to open:

```
JP:64.2/2951.7 #=27 d=0.024/-5.000
E=64.8/2816.7 SP:250.0 in/sec
COMMAND: OPEN SHUTTER (SPLIT)
JP:64.8/2816.7 #=25 d=0.024/-5.000
E=65.4/2691.7 SP:250.0 in/sec
```

Each of the JP commands above follows the format set forth in FIG. 50. The first two numbers are the X,Y starting coordinates, the next number is the number of ticks, and the next two numbers are the desired incremental X,Y movements. The rest of the numbers are derived from the others: the first two are the desired X,Y ending position, and the last is the desired scan speed.

Similarly, the following example shows splitting up a move command to give the shutter 17 ticks (approx. 600 µS) to close:

```
MV: 1908.6/2698.1 #=197 d=3.689/0.010
E=2635.4/2700.0 SP:/84.5
in/sec
COMMAND: CLOSE SHUTTER (SPLIT)
MV: 2635.4/2700.0 #=17 d=3.689/0.010
E=2698.1/2700.2 SP:184.5
in/sec
```

Each of the move commands above follow the same format as the jump commands discussed earlier.

Figure 51:
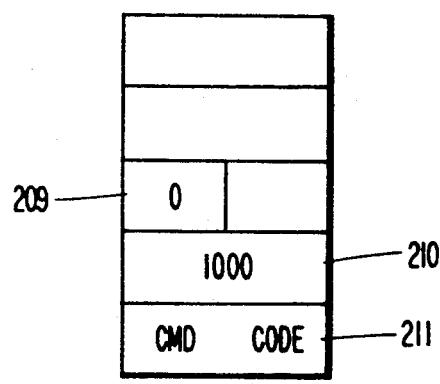

The format of the data packet which corresponds to a SHUTTER or DELAY command is illustrated in FIG. 51. As illustrated, the format is analogous to FIG. 50, except that field 209 is always set to 0, and field 216 is always set to 1000. This allows the servo-DSP to easily distinguish between jump or move commands, and other commands. Lastly, field 211 is used to indicate the type of command, which can include shutter open or close, or delay commands.

Once the shutter and delay commands have been inserted into the stereo-queue, the commands are then transferred to Servo queue 173 by means of DMA transfer 174. The commands in the servo queue are then parsed by servo-DSP in step 176, and forwarded either to shutter 20 for a shutter command, or to DAC 38 for a mirror (move or jump) command. (Note that in step 176, the servo-DSP also uses input from encoder 37 to determine the current mirror position, which it uses in formulating a command to the dynamic mirrors. This will be described in more detail subsequently.)

If the servo queue ever becomes empty, the servo-DSP may run out of commands. In this case, it will send the laser beam to a predetermined rest position outside of the vat. This is so that the shutter can be opened to prevent the laser from burning through the shutter, which could happen if the shutter is kept closed too long because of the use of a higher power laser. The delay command is used to fill up the servo queue in order to avoid the laser from having to move to the rest position. The command simply indicates the number of ticks the laser is to delay at the current position.

The servo-DSP operates on a 35 µS cycle. For each cycle, the DSP will first read the current position of the mirrors from the encoder, and then output an amplified error value to the DAC, based in part on the difference between the desired mirror position and the current mirror position. The error term is a proportional, integral, derivative (PID) term which is computed according to known principles set forth in, for example, "DISCRETE TIME CONTROL SYSTEMS," Katsuhiko Ogata, Prentice Hall, Inc., 1987, which is hereby fully incorporated by reference as though set forth in full. The encoders can provide a reading of the current mirror location at a resolution of 1 arc second, which corresponds to about 0.954 mils.

In step 176, the data packets are executed. Each packet requires the number of cycles to execute as specified in the tick count field. A counter is initialized to 0, and used to count up to this value.

At each cycle, the position, velocity and integration error are determined. In addition, for the last six cycles, an acceleration term is determined. Each is multiplied by a corresponding gain, and then combined to form the PID error term.

The position error for a cycle is the difference between the desired position and the current position. The current position is equal to the encoder reading. The desired position is determined by adding the $\Delta X$ and $\Delta Y$ values, items 207 and 208 in FIG. 50, to the starting X and starting Y values, items 203 and 204.

The velocity error is the difference between the desired velocity and the current velocity. The desired velocity in the X and Y direction is determined by dividing $\Delta X$ and $\Delta Y$, respectively, by the number of ticks. The current velocity is equal to the encoder reading from the current cycle minus the encoder reading from the previous cycle divided by 35 µS (1 tick).

Figure 52:
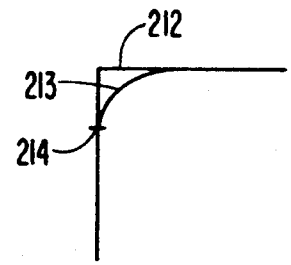
FIG. 52 illustrates the actual path of the beam tracing around a sharp corner.

The acceleration error term is only computed during the last 6 ticks of a command, and requires looking ahead to the next data packet. This term is computed by taking $\Delta X$ and $\Delta Y$ from the next packet, and subtracting $\Delta X$ and $\Delta Y$ from the current packet, and dividing by 6 ticks. If it appears that a corner is at hand, as illustrated in FIG. 52, the acceleration error term will help ensure that the path of the laser follows the corner as close as possible, with perhaps a slight overshoot.

The integration term is also used to help control overshoot, and provide for mirror stability. The integration term is necessary in the above equations to handle the situation where a constant position error causes a constant DAC output. The addition of the integration term causes a change in the DAC output value which gets the beam back on track. If this is insufficient, the shutter may be employed to block the laser during the overshoot. The integration term is equal to the net sum of all position errors to date.

At each cycle, once the position, velocity, and acceleration error terms, and integral terms have been computed, they are each multiplied by an appropriate gain term, and then sent to the DAC. As indicated in FIG. 52 it is desirable to make actual path 213 of the laser to be as close as possible to square corner 212. The gains are chosen to accomplish this.

Turning back to the stereo-DSP, note that the vectors used in the jump commands are not broken up into microvectors. As a result, the amount of error that can build up with these vectors can be on the order of 12-14 mils. Therefore, stereo-DSP will typically generate a packet at the end of each jump command to correct for any rounding error.

CFAB USER INTERACTION

Figure 53:
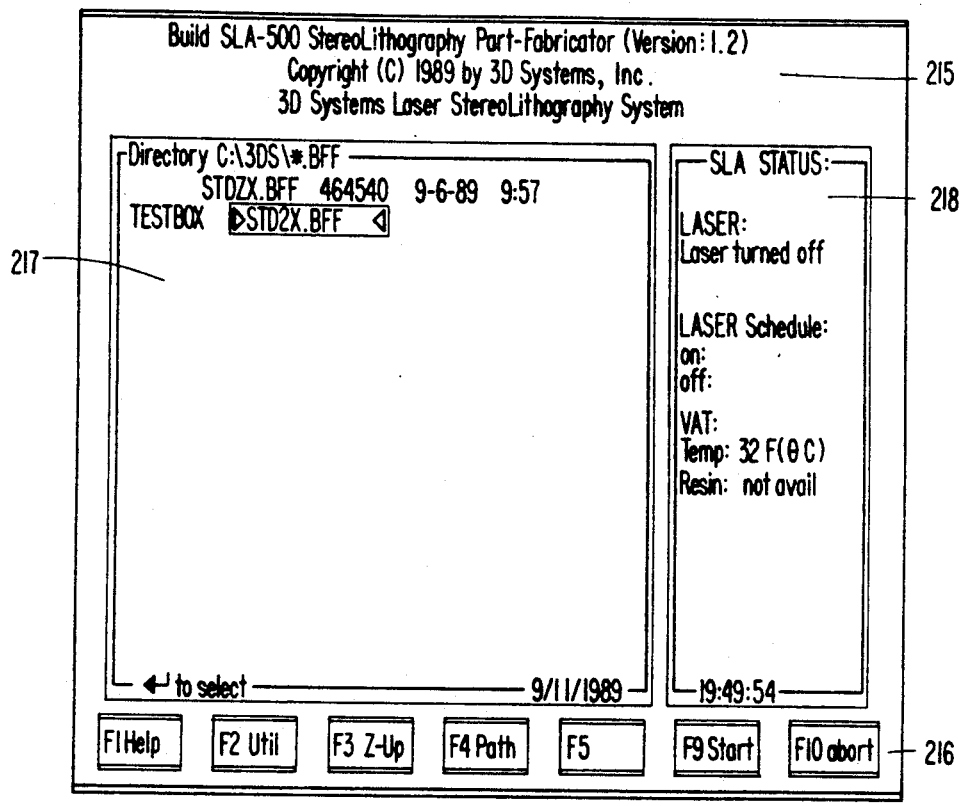

The next section will describe how CFAB interacts with the user. The control computer monitor displays the main screen (FIG. 53) when the system is first turned on. This screen consists of four regions:

- The top of the screen 215 identifies the program and its version number.
- The bottom of the screen 216 displays the program functions that can be initiated by pressing the function keys on the computer keyboard.
- The large region 217 at the left center of the screen displays a list of building files that are available in the current subdirectory, The PgDn and PgUp keys can be used to scroll the list to see names that are outside the display region.
- The region 218 at the right of the screen shows the current status of the laser and the vat temperature.

Figure 54:
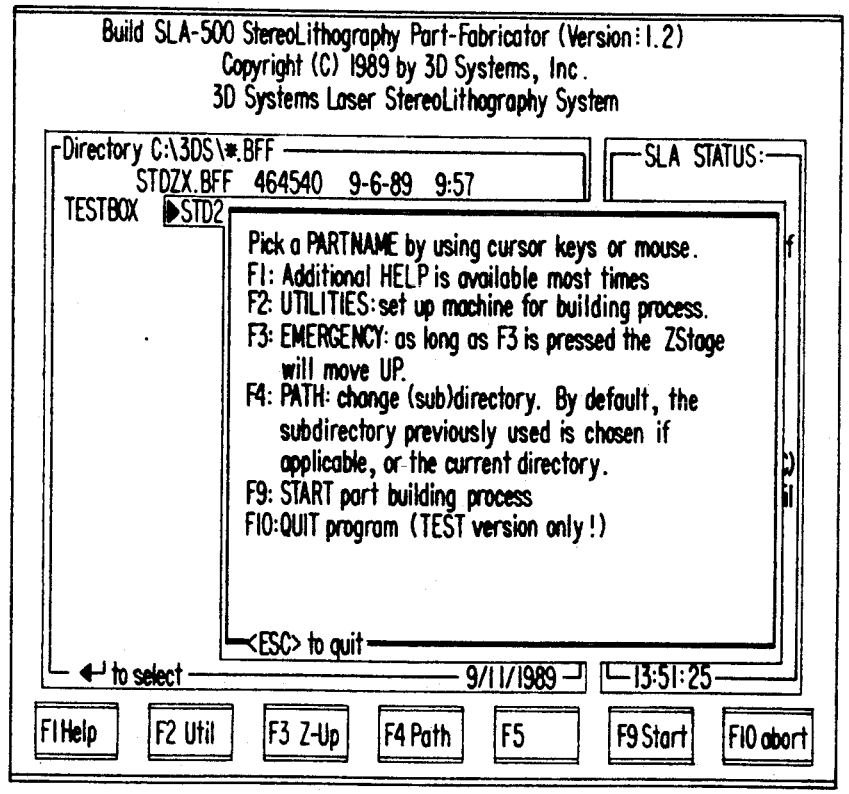

In addition, the current date and time are shown at the bottom of the screen. A help screen is superimposed on the main screen when the F1 key is pressed (FIG. 54).

As discussed earlier, the main function of CFAB is to control part building specified by data in a selected build (.bff) file. Other functions performed by CFAB also include:

- Turning the laser on and off, and also scheduling times at which the laser turns on and off under computer control.
- Initializing the SLA hardware.
- Adjusting the level of liquid resin in the vat.
- Setting and controlling the temperature of the liquid resin in the vat.
- Calibrating the system optics.
- Choosing a material file that stores the parameters of the resin in use.

With the main menu displayed, the cursor control keys on the computer keyboard can be used to select any one of the part names displayed on the center of the screen. In addition to being highlighted, the selected file name, together with the file size and the time and date at which it was last edited, appear across the top of the center portion of the screen. In the example (FIG. 53), the file STD2X.BFF is selected. File names in a different subdirectory can be accessed by pressing the F4 key and then typing the path name of the required directory.

Figure 55:
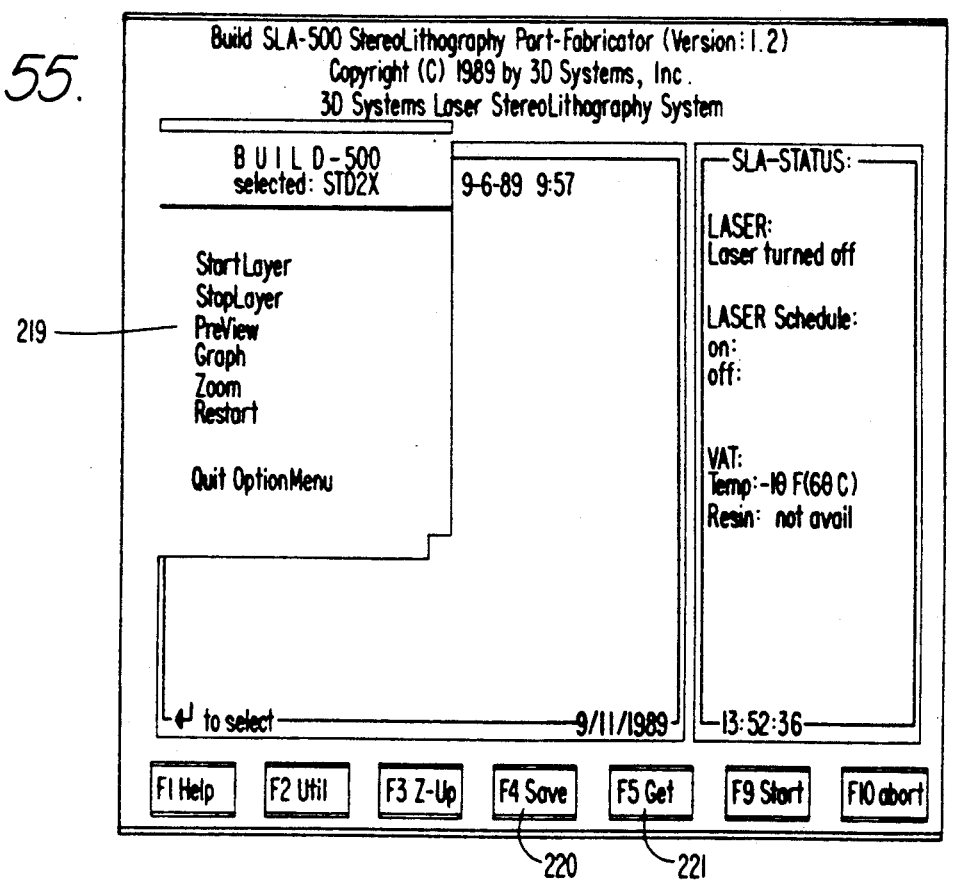

A popup menu 219 of build options is displayed when the Enter key is pressed (FIG. 55). The name of the part currently selected to be built is shown at the top of this menu. The cursor control keys can be used to highlight and select any of the menu items. Notice that the functions of the F4 and F5 keys are different from what they were previously in FIG. 53. With the build options popup menu displayed, the F4 key 220 is pressed to save the current build options, and the F5 key 221 is pressed to restore the previous build options.

Unless specified otherwise, all the layers of the part will be created during fabrication. However, the user can select the layer of the part at which the build process is to start and stop.

If the StartLayer line 222 on the popup menu is chosen by highlighting it and then pressing the Enter key (FIG. 56), another popup menu appears. The current start layer value is displayed and can be changed just by typing in a new value and pressing the Enter key. When the Enter key is pressed, the new start layer value 223 is displayed in the build options menu (FIG. 57).

Figure 58:
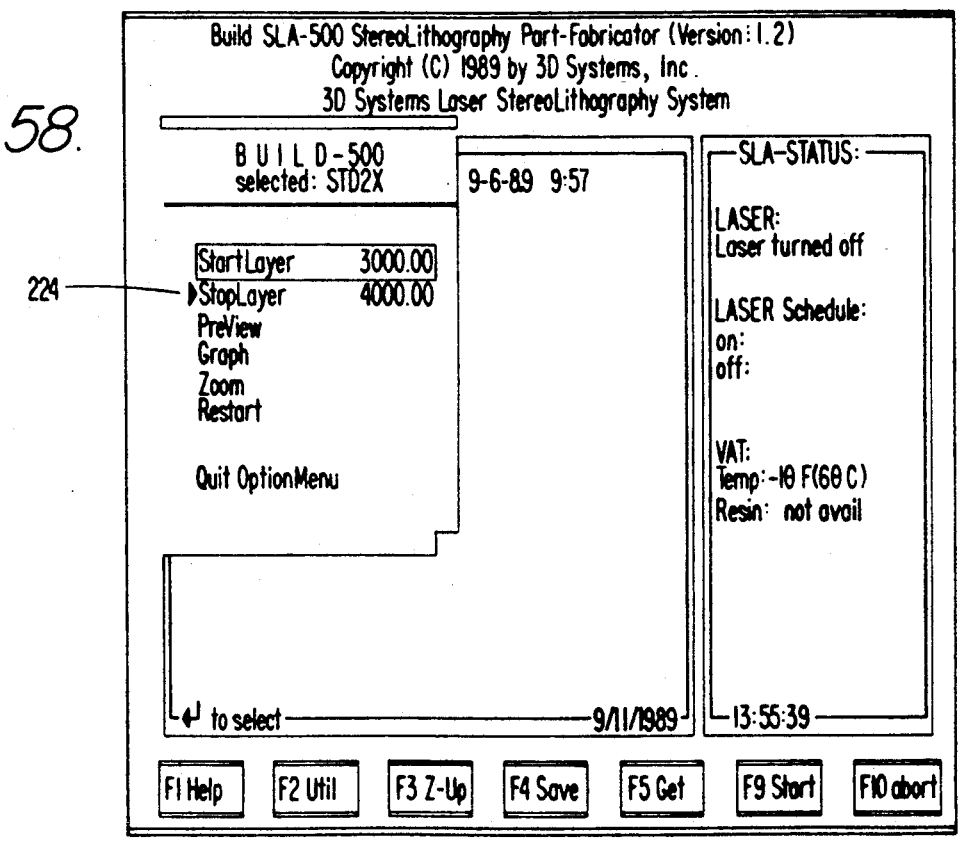

The stop layer value 224 can be changed and then displayed in the build options menu in a similar manner (FIG. 58).

Figure 59:
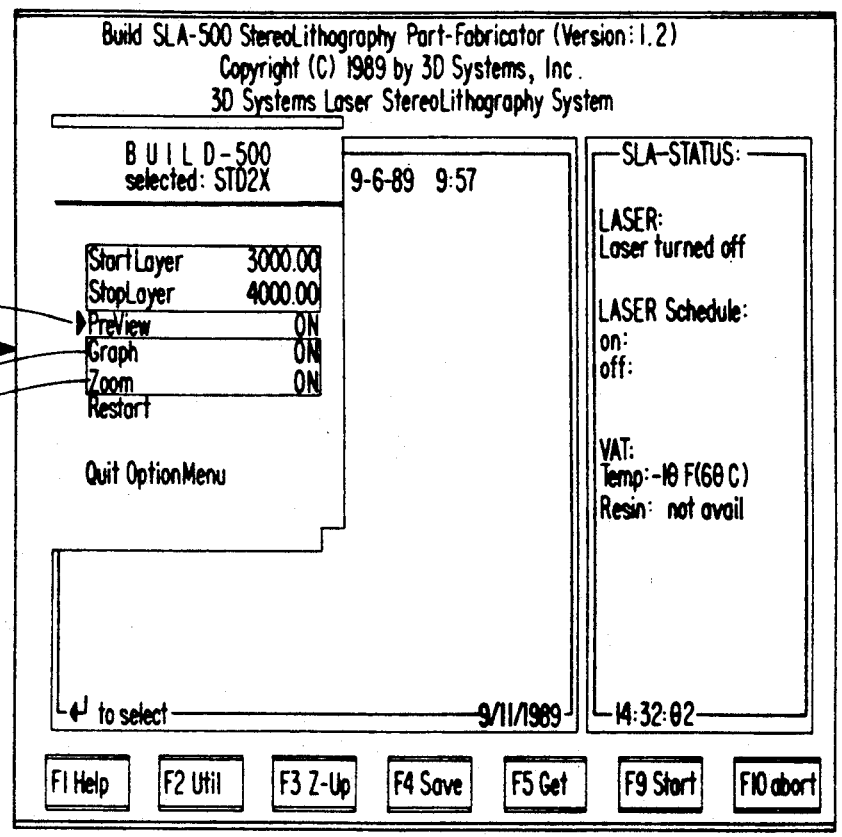

As seen in FIG. 59, the Preview, Graph, and Zoom menu items 22 determine the display shown by the monitor while a part is being built. If Graph is ON, the monitor will subsequently display simulation of the entire top of the vat while a part is being built. If, in addition, Zoom 227 is ON, the display is magnified to show the part being built in as much detail as possible, depending on the size of the part.

If Preview 228 is ON, the monitor subsequently displays a simulation of building the part without the build actually occurring.

Figure 60:
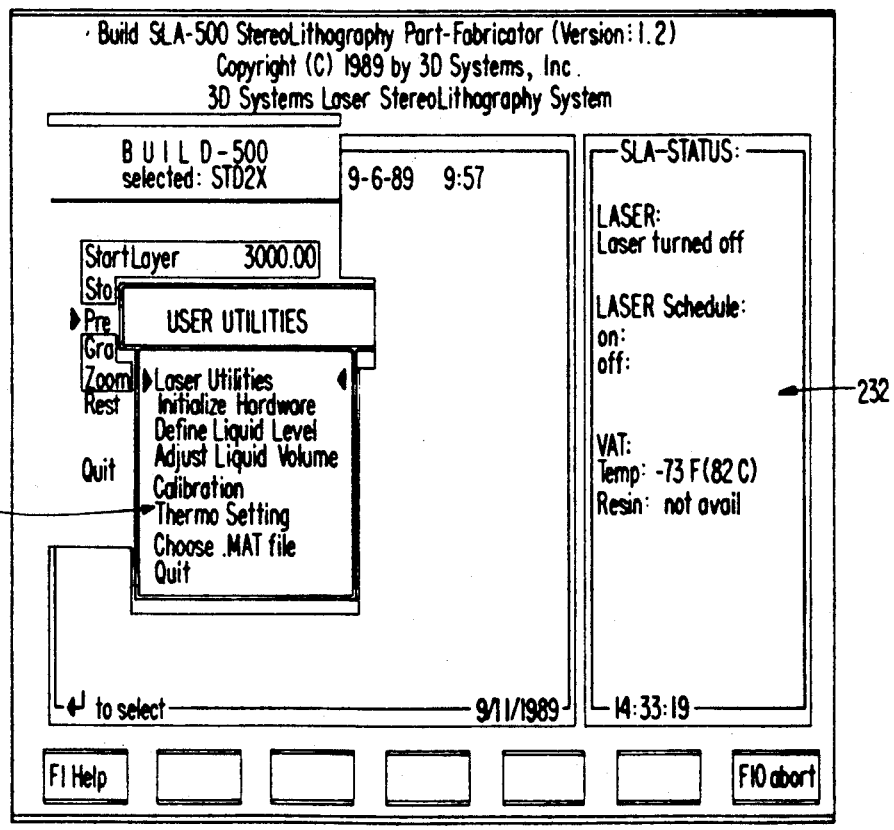

The user utilities are accessed by pressing the F2 key. When the F2 key is pressed, the list of utilities 229 shown in FIG. 60 is displayed.

Laser Utilities

Figure 61:
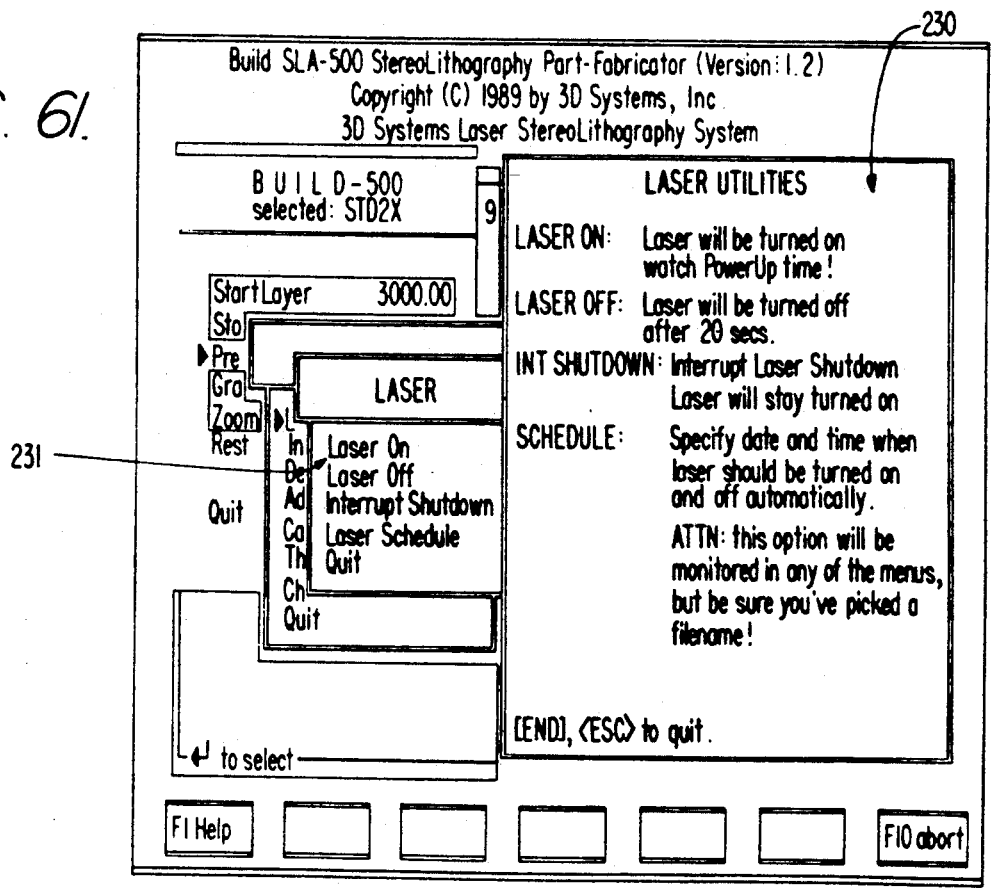

With the main screen displayed, the status of the laser can be seen on the right of the screen. In FIG. 60, the status is identified with numeral 232. As discussed earlier, the status can be changed by pressing the F2 key to display the user utilities popup menu, highlighting the Laser Utilities item, and pressing the Enter key. The laser control functions 231 are then displayed (FIG. 61)). To see a brief description of the laser control functions, a user may use the F1 key. FIG. 61 shows this description identified with numeral 230.

Figure 62:
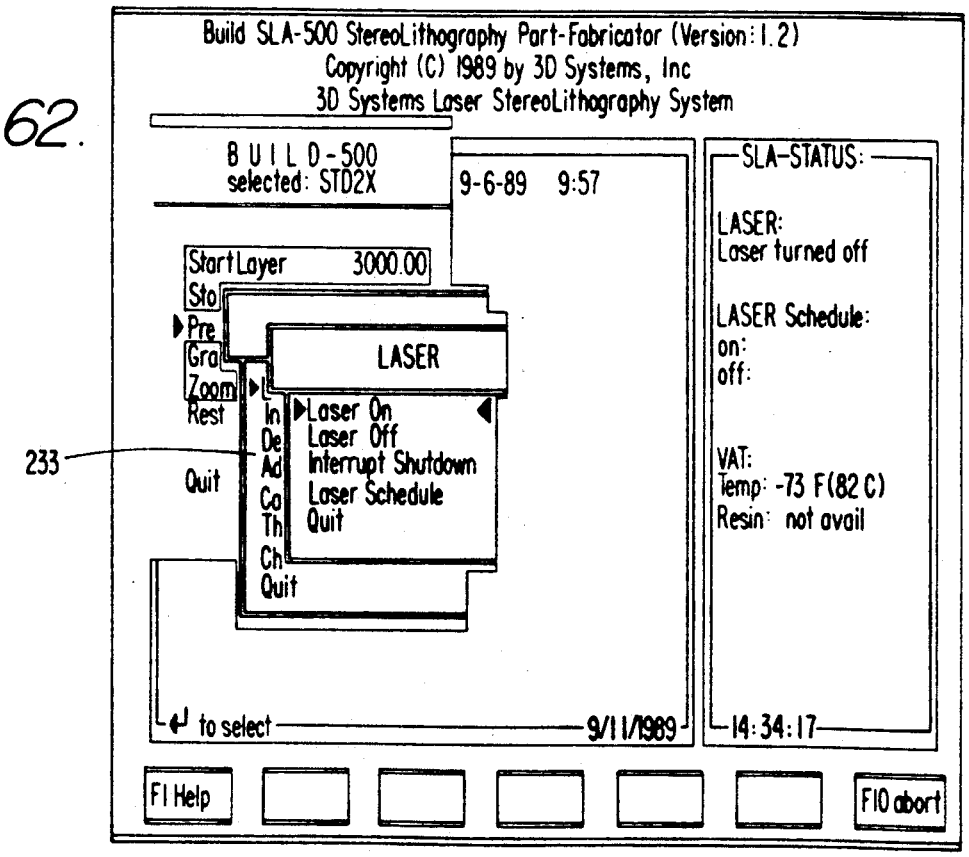

If the laser is off, it can be turned on by selecting the Laser On line on the menu (numeral 233 in FIG. 62) and pressing the Enter key.

The right side of the display changes to show that the power-up countdown is in progress, and the bottom right of the display showing the time remaining until the laser is turned on. When the countdown is complete, the right side of the display changes to show the laser is "ready for use." The monitor also shows the current power output from the laser.

The laser can be turned off by selecting the Laser Off line on the menu and pressing the Enter key. The right side of the display immediately changes to show the shutoff countdown is in progress and the time yet to elapse before turnoff occurs. It is possible to interrupt the laser shutdown by selecting Interrupt Shutdown and pressing the Enter key.

Figure 63:
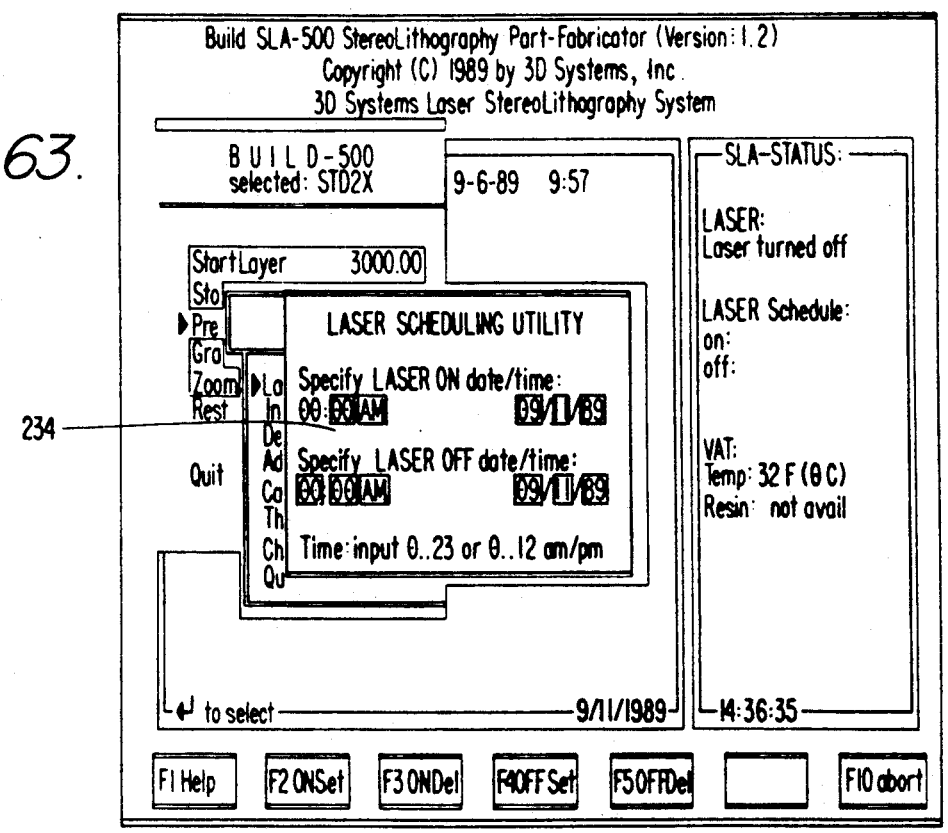

In addition to turning the laser on or off immediately, it is also possible to set scheduled times for the laser to turn on and off. This is done by selecting the Laser Schedule line on the menu and pressing the Enter key. A popup screen 234 shows the currently scheduled time for the laser to turn on and off (FIG. 63). The times on this screen can be changed just by typing over them.

After typing the required times, the on-time can be accepted by pressing the F2 key and the off-time can be accepted by pressing the F4 key. When either of these keys is pressed, the user is presented with the opportunity to overwrite existing times or not. The times can be deleted by pressing the F3 key to delete the on-time and the F5 key to delete the off-time.

Thermo Setting

Figure 64:
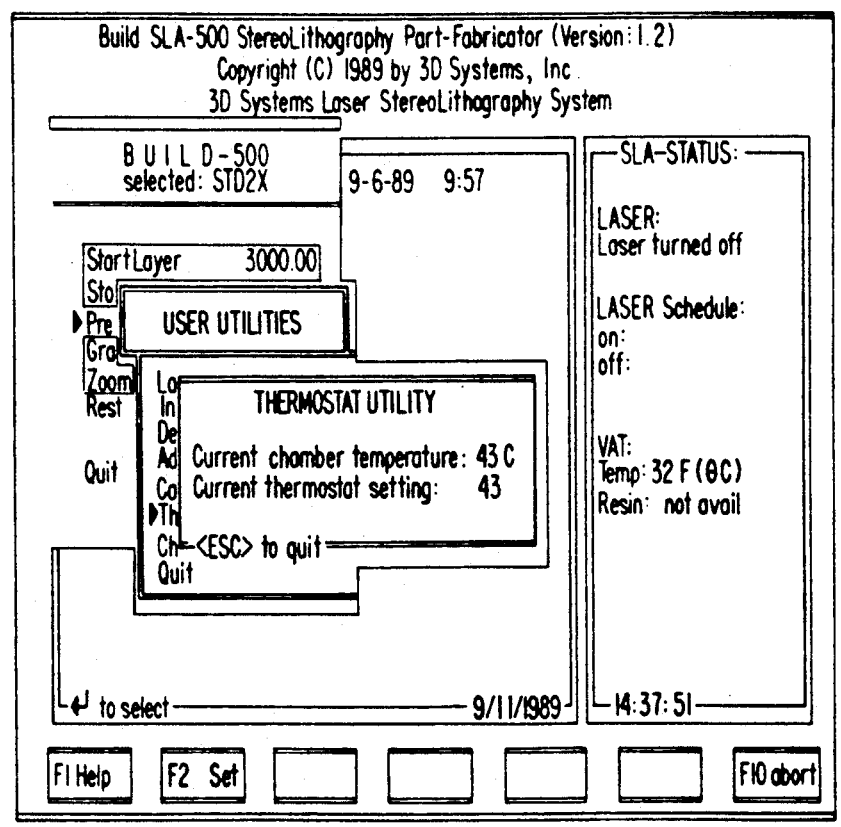

With the main screen displayed, pressing the F3 key or selecting the Thermo Setting function in FIG. 60 gives access to the chamber temperature control (FIG. 64). The temperature can be changed by typing over the current thermostat setting value, and then pressing the Enter key.

Maintenance Facilities

In addition to the user facilities described above, CFAB contains diagnostic and calibration routines used by maintenance technicians. Access to these routines is gained by pressing the F5 key, and then typing the required password.

Fabricating a Part

Figure 56:
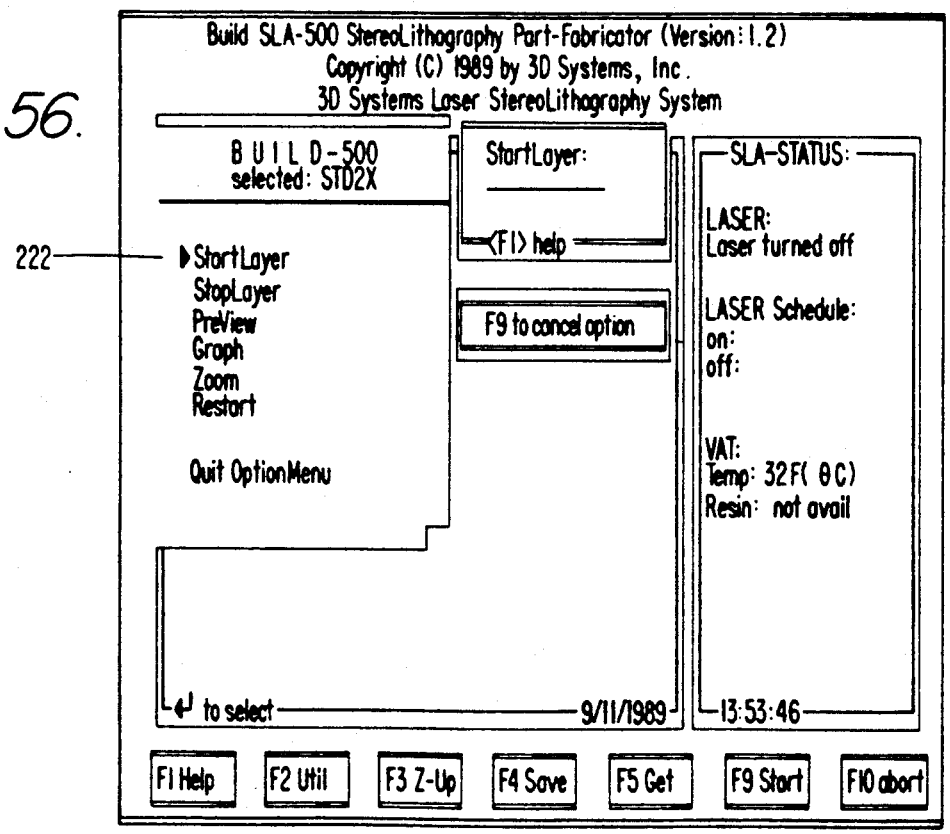
Figure 57:
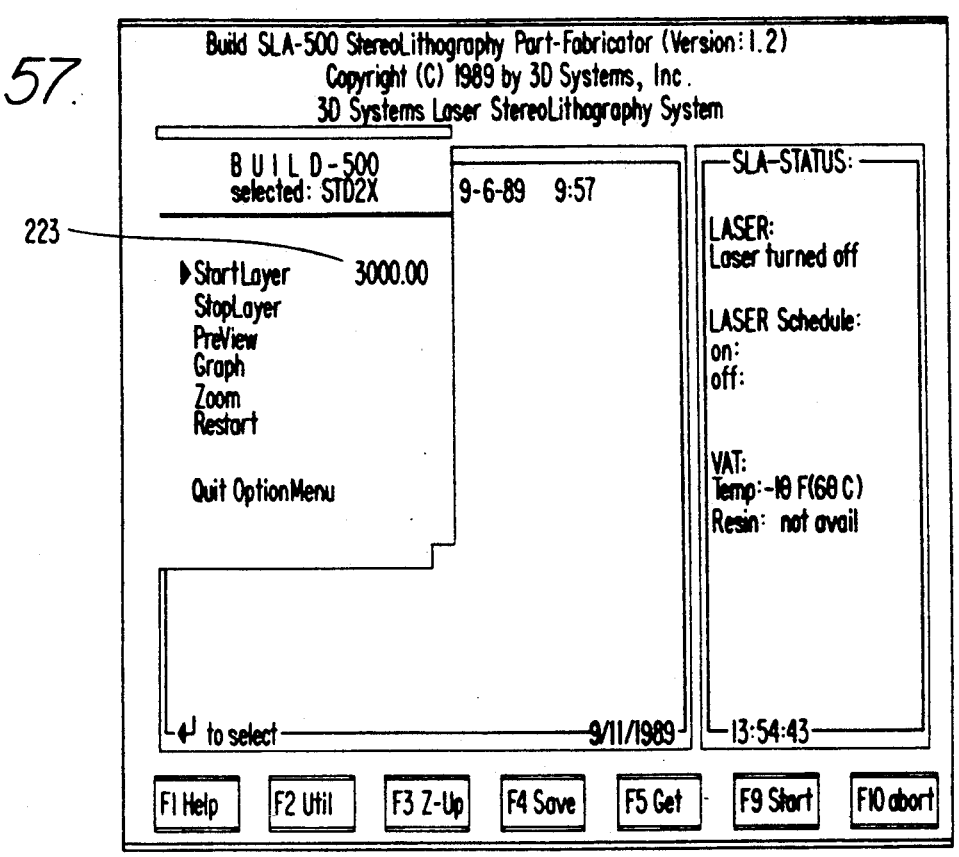

The process of making a part is started by pressing the F9 function key or by selecting the Quit Option Menu line in the Build Options menu (FIG. 56).

While a part is being built, the display changes to show the build conditions (FIG. 65).

This completes the description of the system. Accordingly, as is apparent from the above description, certain improvements in a method and apparatus of stereolithography have been described which increase the speed of and remove bottlenecks in part production, without sacrificing accuracy, especially for large or complex parts. One improvement is the use of a more powerful laser in conjunction with faster mirrors, wherein the laser output can be selectively blocked by means of a fast shutter, an attenuator, or the like, to prevent spurious curing of resin. Accuracy of the mirrors is maintained, even at the higher speeds, by a servo control system having gain parameters which represent an acceptable tradeoff between accuracy, speed, and stability.

Another improvement is the use of a spreadsheet conceptual model to simplify data management and subsequent part building.

A third improvement is the use of dedicated processors for real-time device management tasks, such as dynamic mirror control.

A fourth improvement is the generation of hatch and fill vectors on the fly, thereby eliminating prohibitively large or costly storage requirements, especially with the building of a large or complex part.

While embodiments and applications of this invention have been shown and described, it should be apparent to those skilled in the art that many more modifications are possible without departing from the inventive concepts herein. The invention, therefore, is not to be restricted, except in the spirit of the appended claims.

What is claimed is:

1. A stereolithography system for forming a three-dimensional object from a medium capable of selective physical transformation upon exposure to synergistic stimulation comprising:

a surface of said medium capable of selective physical transformation;

a means for generating a beam of synergistic stimulation, said beam following an optical path to the surface of said medium capable of selective physical transformation;

a servo-controlled dynamic mirror system placed along said optical path for directing said beam of synergistic stimulation to said medium surface, and for selectively positioning said beam across the surface of said medium capable of selective physical transformation to selectively form beam tracings of solidified material at said medium surface in the shape of a layer of said object, in response to the issuance of successive commands;

a dedicated processor means coupled to said dynamic mirror system for successively issuing said successive commands to said dynamic mirror system from stereolithography data descriptive of said beam tracings; and a general purpose processor means coupled to said dedicated processor means which receives external CAD/CAM data descriptive of the borders of layers of the three-dimensional object, and thereafter transforms that data into stereolithography data descriptive of the beam tracings of each layer including internal portions of a layer, and transfers that data to said dedicated processor for controlling said dynamic mirror system to direct said beam of synergistic stimulation to said medium surface.

2. A stereolithography method for forming a three-dimensional part from a medium capable of selective physical transformation upon exposure to synergistic stimulation comprising the steps of:

providing a spreadsheet model of a part having a grid format of cells at the intersection of spaced, parallel rows and columns;

associating external CAD/CAM files, each descriptive of the surface of a component of the part, with a selected one of the set of rows or columns of said spreadsheet model;

associating the nonselected one of the set of rows and columns of the spreadsheet model of said part with contiguous ranges of layers spaced along an axis;

providing a plurality of style files, each style file containing detailed stereolithography process data;

associating a selected one of said plurality of style files with each cell in said spreadsheet model, thereby associating the range of layers of the component of said part corresponding to the cell with said selected style file;

transforming each CAD/CAM file into a component file of stereolithography layer data descriptive of successive layers of the component of said part; and providing successive layers of the medium capable of physical transformation adjacent to previously provided and at least partially transformed layers of the medium;

building a layer of a component of the part by directing said synergistic stimulation to effect physical transformation of said medium by exposing the medium to tracings at the surface from the stereolithography layer data derived from the component file for that component and layer, the exposure determined by the stereolithography process data in the style file associated with the component and layer according to the spreadsheet model.

3. A method for stereolithographically forming a next layer of a three-dimensional object which is being formed on a layer by layer basis from a medium capable of physical transformation upon exposure to synergistic stimulation, comprising the steps of:

receiving surface data originating from a CAD system describing at least the nest layer of the three-dimensional object;

providing a surface of medium to be physically transformed by exposure to synergistic stimulation to form the next layer of the three-dimensional object;

processing the surface data to obtain data descriptive of internal regions of the next layer substantially at the same time as the internal data will be used to exposed the surface of medium to form the next layer of the three-dimensional object; and exposing the surface of the medium to synergistic stimulation to form at least the internal regions of the next layer according to the data derived in the processing step.

4. The method of claim 3, comprising the additional step of transforming the surface data originating from the CAD system into boundary data descriptive of the boundaries of the next layer of the three-dimensional object and processing the boundary data to obtain data descriptive of the internal regions of the next layer.

5. The method of claim 3 wherein the medium is a photopolymer.

6. The method of claim 3 wherein the data descriptive of internal regions of the next layer is computed and momentarily stored prior to exposing the surface to synergistic stimulation according to the data descriptive of internal regions.

7. A method for stereolithographically forming a next layer of a three-dimensional object which is being formed on a layer by layer basis from a medium capable of physical transformation upon exposure to synergistic stimulation, comprising the steps of:

a. receiving data originating from a CAD system describing at least the next layer of the three-dimensional object;

b. providing a surface of medium to be physically transformed by exposure to synergistic stimulation to form the next layer of the three-dimensional object;

c. processing the data to obtain modified data descriptive of at least a portion of the next layer;

d. exposing the surface of the medium to synergistic stimulation to form the next layer according to the data derived in step c; and e. using at least a first processor for controlling partly steps a, b, c, and d and using at least a second processor to control the remaining parts of steps a, b, c, and d which are not being controlled by the first processor, whereby faster object formation is achieved by substantially parallel processing of at least two parts of steps a, b, c, and d.

8. The method of claim 7 wherein step c comprises geometric correction of the data originating from a CAD system.

9. The method of claim 7 wherein step c comprises determination of internal data corresponding to at least some internal regions of the next layer.

10. The method of claim 7 wherein the at least first processor controls steps a, b, and c and the at least second processor controls step d.

11. The method of claim 7 wherein step d is performed using rotational scanning mirrors to direct a beam of synergistic stimulation controllably onto the surface of the medium.

12. The method of claim 11 wherein the at least first processor controls steps a, b, and part of step c and the at least second processor controls step d and a different part of step c.

13. The method of claim 12 wherein step c comprises geometric correction of data for forming the next layer and determination of internal data corresponding to at least some internal regions of the next layer, and wherein steps a, b and determination of internal data is controlled by a first processor and geometric correction is controlled by a second processor and step d is controlled by a third processor.

* * * * *